(12) United States Patent
Schmidt-Böcking et al.

(10) Patent No.: US 12,065,998 B2
(45) Date of Patent: Aug. 20, 2024

(54) METHOD FOR PROVISIONALLY USING AN AT LEAST PARTIALLY CONSTRUCTED LOWER RESERVOIR FOR AN UNDERWATER PUMPED-STORAGE POWER PLANT

(71) Applicants: Horst Schmidt-Böcking, Kelkheim (DE); Gerhard Luther, Saarbrücken (DE)

(72) Inventors: Horst Schmidt-Böcking, Kelkheim (DE); Gerhard Luther, Saarbrücken (DE)

( * ) Notice: Subject to any disclaimer, the term of this patent is extended or adjusted under 35 U.S.C. 154(b) by 186 days.

(21) Appl. No.: 17/625,875

(22) PCT Filed: Dec. 10, 2019

(86) PCT No.: PCT/EP2019/084491
§ 371 (c)(1),
(2) Date: Jun. 13, 2022

(87) PCT Pub. No.: WO2021/004650
PCT Pub. Date: Jan. 14, 2021

(65) Prior Publication Data
US 2023/0184204 A1      Jun. 15, 2023

(30) Foreign Application Priority Data
Jul. 10, 2019  (DE) .................... 10 2019 118 726.5

(51) Int. Cl.
*F03B 13/06* (2006.01)
*E02B 9/00* (2006.01)

(52) U.S. Cl.
CPC ............ *F03B 13/06* (2013.01); *E02B 9/00* (2013.01); *F05B 2240/40* (2013.01); *F05B 2260/42* (2013.01)

(58) Field of Classification Search
CPC ........ F03B 13/06; E02B 9/00; F05B 2240/40; F05B 2260/42
See application file for complete search history.

(56) References Cited

U.S. PATENT DOCUMENTS

2015/0361948 A1    12/2015  Schmidt-Boecking
2019/0186458 A1*   6/2019   Obermeyer ............. F03B 13/06

FOREIGN PATENT DOCUMENTS

CN    105927455 A    9/2016
CN    108643140 A    10/2018
(Continued)

OTHER PUBLICATIONS

Indian Examination Report, Application No. 202237006077, Applicant: Horst Schmidt-Bocking, Dated: Jun. 16, 2022.
(Continued)

*Primary Examiner* — Viet P Nguyen
(74) *Attorney, Agent, or Firm* — Reising Ethington P.C.

(57) ABSTRACT

A method for the preliminary use of a partially constructed lower reservoir for an underwater pumped-storage power plant is disclosed, wherein a partially constructed lower reservoir is provided which is located in a dry but flooded ground depression, and which, when the dry ground depression is flooded, can be operated in such a way that electrical energy is generated when water is admitted into the lower reservoir from the flooded ground depression and electrical energy is stored when water is pumped out of the lower reservoir into the flooded ground depression, wherein the partially constructed lower reservoir is connected to a preliminary upper reservoir via a penstock.

16 Claims, 22 Drawing Sheets

(56) References Cited

FOREIGN PATENT DOCUMENTS

| | | | |
|---|---|---|---|
| CN | 108867585 A | 11/2018 |
| CN | 109518665 A | 3/2019 |
| DE | 19513817 A1 | 10/1996 |
| DE | 102011013329 A1 | 9/2012 |
| DE | 102011106040 A1 | 12/2012 |
| DE | 102011118206 A1 | 5/2013 |
| DE | 102011118206 A1 | 6/2013 |
| DE | 10201400811 A1 | 5/2014 |
| DE | 102012110662 A1 | 5/2014 |
| DE | 102013019776 B3 | 1/2015 |
| DE | 102013020984 A1 | 6/2015 |
| DE | 202017002559 U1 | 7/2017 |
| DE | 102019118725 A1 | 1/2021 |
| DE | 102019118726 A1 | 1/2021 |
| JP | H1037840 A | 2/1998 |
| WO | 2012143360 A1 | 10/2012 |
| WO | 2013117329 A1 | 8/2013 |
| WO | 2021005016 A1 | 1/2021 |

OTHER PUBLICATIONS

Int. Search Report, Int. Serial No. PCT/EP2020/069028, Int. Filing Date: Jul. 6, 2020, Applicant: Schmidt-Bocking, Prof. Dr. Horst, Date: Sep. 4, 2020.

Int. Written Opinion, Int. Serial No. PCT/EP2020/069028, Int. Filing Date: Jul. 6, 2020, Applicant: Schmidt-Bocking, Prof. Dr. Horst, Date: Sep. 4, 2020.

German Office Action, Serial No. 10 2019 118 725.7, Owner: Luther, et al., Date: Feb. 10, 2020.

Kraftwerke Linth-Limmern AG, "Zukunft Wasserkraft—Linthal 2015", Apr. 30, 2013, XP055137793, URL:http://www.axpo.com/content/dam/axpo/switzerland/erleben/dokumente/130429_Axpo_Zukunft_Wasserkraft_5Aufl.pdf.

Int. Search Report. Int. Serial No. PCT/EP2019/084491, Int. Filing Date: Dec. 10, 2019, Applicant: Schmidt-Bocking, Prof. Dr. Horst, Date: Feb. 4, 2020.

Int. Written Opinion, Int. Serial No. PCT/EP2019/084491, Int. Filing Date: Dec. 10, 2019, Applicant: Schmidt-Bocking, Prof. Dr. Horst, Date: Feb. 4, 2020.

German Office Action, Serial No. 10 2019 118 726.5, Owner: Luther, et al., Date: Feb. 11, 2020.

English Translation of International Preliminary Report on Patentability, Int. Application No. PCT/EP2021/061424, Int. Filing Date: Apr. 30, 2021, Applicant: Horst Schmidt-Bocking, Date: Nov. 10, 2022.

Australian Office Action corresponding to Australian application 2020312166, dated Aug. 15, 2023, 5 pages.

PCT Written Opinion, PCT Serial No. PCT/EP2021/061424, PCT Filing Date: Apr. 30, 2021, Applicant: Prof. Dr. Schmidt-Böcking, Horst, Dated: Aug. 18, 2021.

PCT Search Report, PCT Serial No. PCT/EP2021/061424, PCT Filing Date: Apr. 30, 2021, Applicant: Prof. Dr. Schmidt-Böcking, Horst, Dated: Aug. 18, 2021.

German Office Action, Serial No. 102020111844.9, Applicant: Schmidt-Bocking, Dated: Mar. 4, 2021.

\* cited by examiner

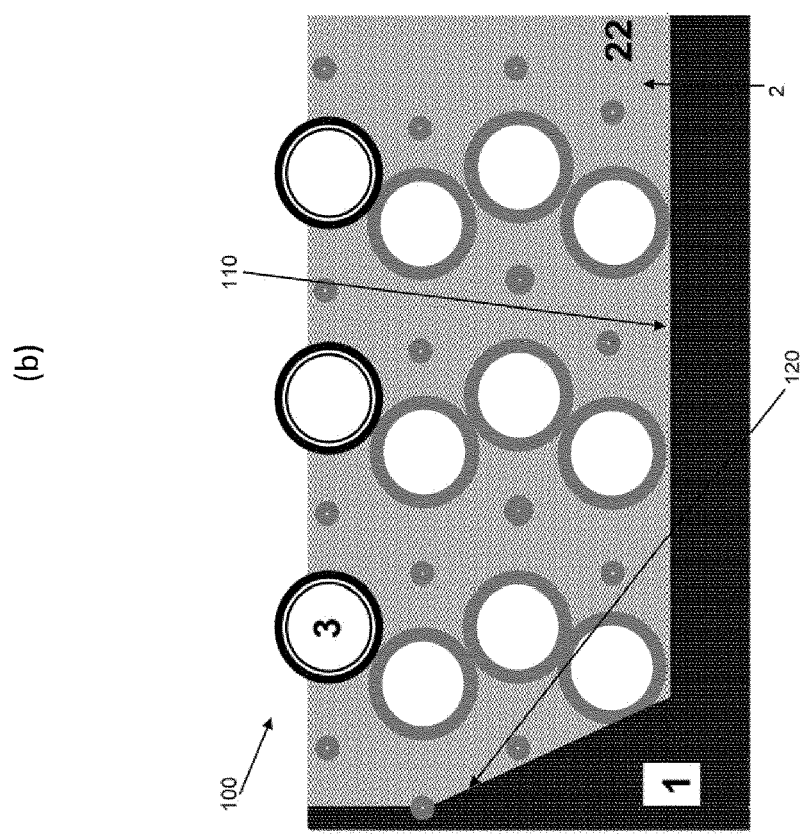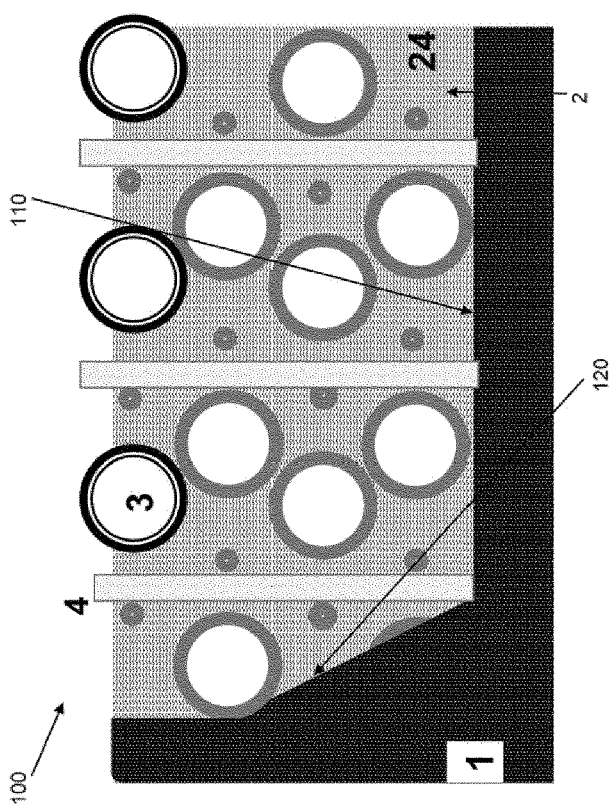
Fig. 5

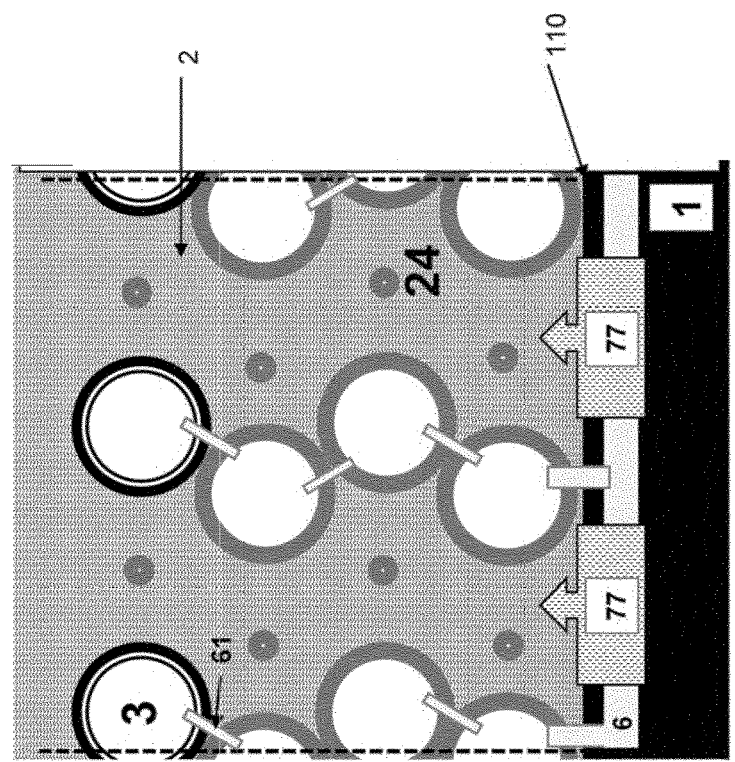
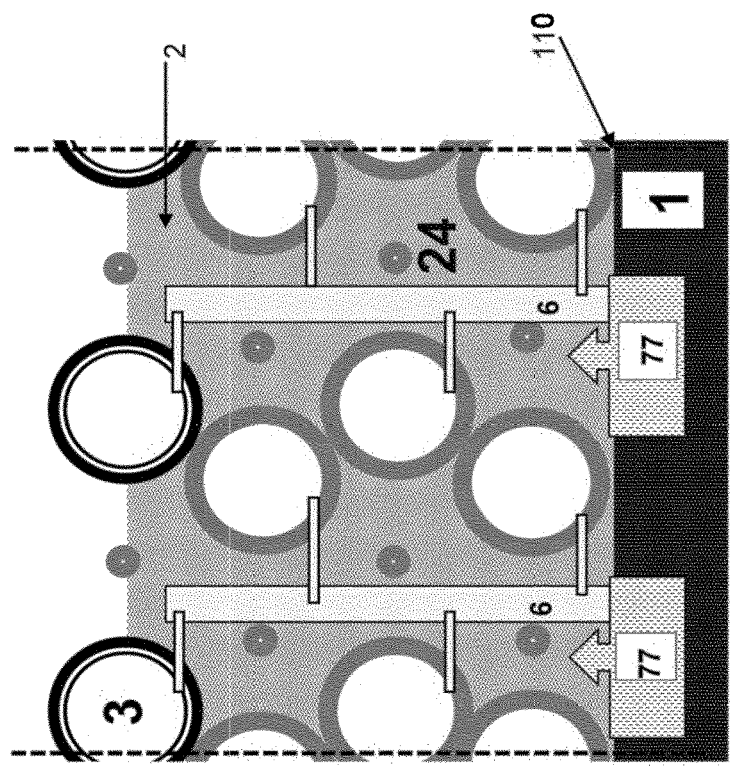
Fig. 8

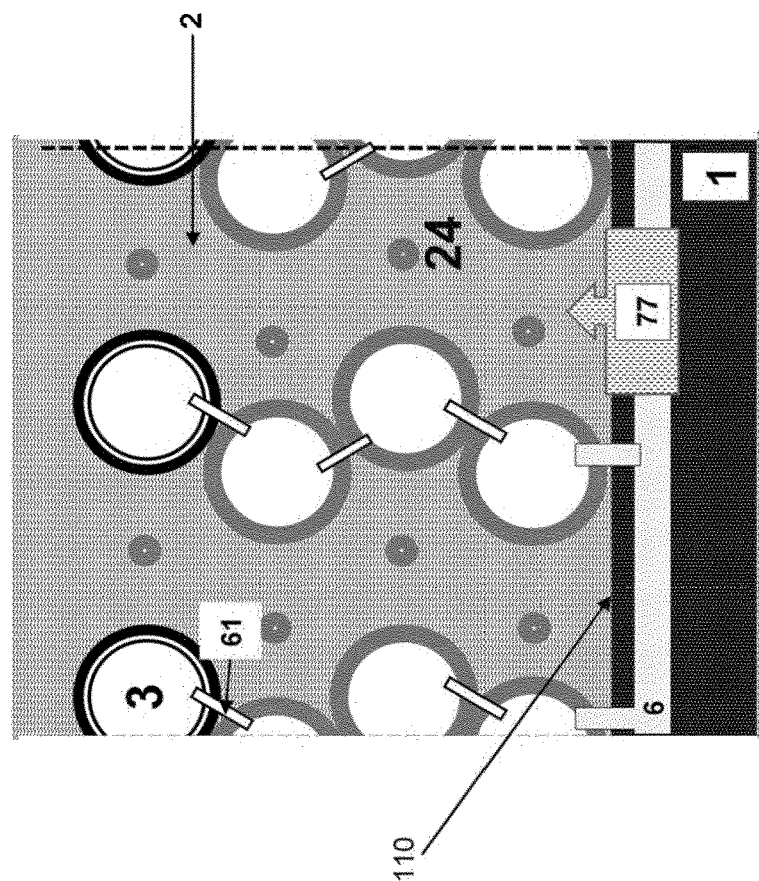
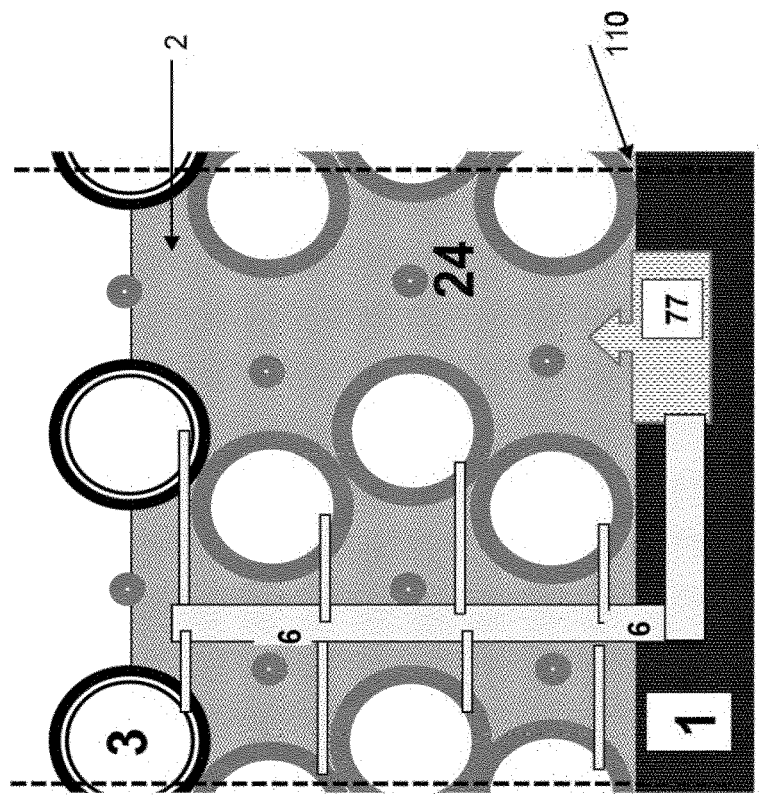
Fig. 9

METHOD FOR PROVISIONALLY USING AN AT LEAST PARTIALLY CONSTRUCTED LOWER RESERVOIR FOR AN UNDERWATER PUMPED-STORAGE POWER PLANT

TECHNICAL FIELD

The present disclosure relates to the preliminary use of an at least partially constructed lower reservoir for an underwater pumped-storage power plant, which is built in a dry but floodable ground depression, in particular in an abandoned or still operating open-pit mine. The present disclosure is suitable in particular for test operation and for energy generation during the construction of an underwater pumped-storage power plant in the Hambach open-pit mine or other lignite mining sites.

BACKGROUND OF THE DISCLOSURE

An Energy Transition Requires Short- and Long-Term Storage Systems

The "energy transition" involves almost completely covering the electrical power supply with renewable energies (RE)—primarily wind and photovoltaics (PV)—while at the same time expanding the utilization of this energy to the heating sector and the transport sector (integrated energy). Due to the inconsistent supply of RE on account of weather and astronomy, and the possibility even of short-term Dunkelflauten [dark doldrums], the energy transition can only be implemented with the use of energy storage systems. In contrast to daunting calculations assuming exclusively short-term storage systems (such as pumped-storage power plants (PSPP)) and then warning of an "energy transition to nowhere" (/Sinn 2013/), the truth is that the problem of storage can only be overcome by a combination of short-term and long-term storage systems (in the form of P2G gas storage). This combination was modeled using the "two-storage model" (e.g., /LuSchmB_2014/; /AKE20-14F/, /Lu2016/, /Duren 2017/). It was found that a short-term storage capacity of only 0.20 to 0.30 full-load days will be sufficient for Germany (/Lu2016/), unless extreme cost increases are assumed.

However, this always assumed a withdrawal time of around 5 or 6 hours, which has been typical for PSPP to date. If it were possible to significantly reduce the partial specific costs for the pure storage volume, it would also be possible to consider keeping larger volumes in reserve, which would be withdrawn less frequently but would then continue to use the turbines of short-term storage systems that have already been emptied of energy. Reference is made to the corresponding considerations on "reserve storage" in (/LuSchmB Bergei2/), in particular in the chapter entitled: "3.3 *Reserve-Tiefspeicher* 1*b:—Blindschächte für etwas längere Speicherzeiten*" [Reserve deep storage—blind shafts for slightly longer storage times].

The current electricity consumption of the Federal Republic of Germany is approximately 600 [TWh/a]. Due to integrated energy, we must assume—despite all savings efforts—a significant increase in electricity consumption in order to complete the energy transition, these calculations being based on an annual consumption in Germany of Q_a=1000 [TWh/a], which corresponds to an average daily consumption of Q_d=2.74 [TWh/a]. The average capacity will then be 114 GW.

Open-Pit Lignite Mines as Sites for PSPP

Overall, it can be said that there is considerable research activity in Germany in the field of underground PSPP with reference to the hard coal mining industry, but only isolated publications on the subsequent use of open-pit lignite mines. This is also reflected in the entries on the topic page for UPSW [underground PSPP] (http://www.upsw.de/index.php/de/startseite.html), for example.

However, the huge potential of abandoned open-pit lignite mines as sites for pumped-storage power plants was also recognized early on. For example, in DE19513817B4, Siol (/Siol 1995/) describes a pumped-storage plant characterized "in that the lower and the upper storage basin are located in an existing or cleared lignite deposit".

The prior art up to 2012 is comprehensively presented in two research reports by Forschungszentrum JA/ich. In the STE Research Report August 2011 (/Baufumb et al. 2011/), a short synopsis on "underground pumped storage", Chapter 111.2 is devoted to PSPP in open-pit lignite mines. Two basic concepts are distinguished:

(1.) In the underground PSPP concept according to/Schreiber et al. 2010/, the pipes, cavities and installations that are needed later can be constructed on the lowest floor and the machine components fitted while the open-pit mine is still in operation. These are subsequently covered with overburden and, finally, the upper basin is designed as a residual lake on the top level.

(2.) In the concept entitled "PSPP in an open-pit mine residual lake" according to/Schulz 2009/, two partial lakes are separated from each other by a dam wall. The partial lake located in the shallower area serves as the upper basin while the substantially deeper partial lake serves as the lower basin, the level of which is lowered to the extent that the difference in level to the upper lake is as great as possible, and the remaining residual volume can be pumped into the initially empty upper lake.

In the STE Research Report 03/2012/Stenzel et al. 2011/, "Unconventional energy storage", the two basic concepts are further laid out in Chapters IV 1.5 and IV 1.6, respectively. Variations and projects are specified and, in particular, the operating characteristics are examined.

The following chapter of this report, Chapter IV 1.7, is dedicated to the principle of hollow sphere storage, in which hollow spheres are lowered from the sea surface to the seabed. This addresses the possible use of such storage facilities in marine areas and surveys the "prospective" coastal areas.

A new study by the Wuppertal Institute /Thema 2019/ shows—using a simple rough estimate for a large-scale pumped-storage plant in the current Hambach, Garzweiler and Inden open-pit mines—that there is a significant technical storage potential of up to 400 GWh available, according to their calculations. This corresponds to approximately ten times the capacity of all current German PSPP combined.

The authors' approach consists in using a large, deep open-pit mine as the lower basin and a smaller open-pit mine as the upper basin. When storing energy, all of the water in the lower basin is pumped up into the upper basin, which is initially mostly empty, except for a small residual amount.

This conventional idea is applied to the—at present—deepest and largest open-pit lignite mine, Hambach, as the lower basin and the neighboring, smaller open-pit mines of Garzweiler and Inden, which are to be hydraulically connected to each other, as the upper basin. To operate the PSPP, it is assumed that a minimum height difference of 100 m is maintained in any operating state.

If realized, one would probably have to raise a critical objection that the alternative of almost completely emptying the basins—which would be required for operational reasons—represents an overly brutal landscape intervention and overrides the imperative of reclamation. The sight of the "open pits", once approved as temporary, would continue unchanged and groundwater previously flowing into the open pit would also have to continue to be pumped out.

Underground and underwater PSPP The "sea egg principle": The "sea egg principle" of moving an artificially created cavity to the seabed where it is used as the lower basin of a PSPP, with the sea itself acting as the upper basin, was published independently of one another and in a complementary fashion by Alexander Slocum and co-workers /Slocum/ on the one hand and by Schmidt-Böcking and Luther (/Meerei_1/ and /Meerei_2/ on the other. The "MeerEi" [sea egg] concept aroused significant interest in the daily press /Küffner FAZ 2011.0401/ and was taken up in Germany by a consortium led by Hochtief, who named it the StEnSea (=Stored Energy in the Sea) project (/StEnSea/). The results of the preliminary planning stage were presented by Hochtief Solutions AG in a talk at the 7th International Renewable Energy Storage Conference, 7th IRES Conference, Nov. 7-12, 2012, presented and published as ppt slides in the proceedings of said conference/Garg e.a.2012/. As a result, a planned pilot project for a "sea egg" was presented with the following data:

Hollow sphere with inner diameter of approx. 30 [m]
Wall thickness approx. 3 [m]
Storage volume approx.: 12,000 [m$^3$]
Storage capacity of approx. 20 MWh at a water depth of 700 [m]
Pump turbine for approx. 5-6 [MW]; if we interpret the smaller output figure as turbine output, this yields a withdrawal time of 4 [h]
Construction target costs ("CTC") were submitted for this facility, based on the following unit prices:
Concrete costs including formwork and reinforcement=225 [€/m$^3$], which corresponds to specific costs of 413 [€/kW] in relation to the installed power.
Pump turbine and electromechanical accessories=525 [€/kW]

In addition, significant costs were included in the calculations for the installation of the hollow sphere on the seabed, which amounted to €300/kW when normalized to the installed capacity. Even with these costs, the sea egg would be competitive with other PSPP.

As is evident, for example, when comparing the inner diameter with the specified volume, these are rough figures and, on multiple levels, "round" calculated values that do not always match up on a strictly mathematically basis. In the following, we will often refer to the data provided under the name "the StEnSea sphere", but—in order to facilitate recalculation—we will base all volume-dependent values on the indicated inner diameter of 30 m, which corresponds to an "ideal" volume of 14,100 [m3].

Furthermore, it was shown that the development objective is to deploy and interconnect a very large number of individual spheres to create one large PSPP. The "Norwegian Trench" was mentioned as a possible area of application; see e.g., /BMWi2017/.

/LuSchmB 2011+13-Bergei1+2/ also describes an application within a mine constructed for storage purposes, where deep blind shafts are used as storage reservoirs, large-sized shafts are used as penstocks with intermediate stations for the pump turbines, and a body of surface water is used as an upper basin. /LuSchmB 2014-langeSaar/ presents a method by which federal waterways can significantly increase their capacity as the upper basin of a large PSPP with underground mining storage by proactively operating their impoundments.

In a report by the Ruhr University, /Ruhr Uni 2013/, several individual contributions deal with the structural design and optimization of concrete structures as a lower basin at the bottom of a residual lake built in a former open-pit lignite mine, which serves as an upper basin. All designs are characterized in that they have a central tower for ventilation, supply and access to a cavern located therebelow. The water from the extensive storage structure converges in this cavern, where it is fed to the pump turbines.

Various designs are under investigation as lower basins. Sanio and Mark are investigating a dome-shaped shallow storage lower basin supported by transverse walls or piers and anchored by stakes in the subsoil. (see page 151 from /Sanio-Mark2013/) Perau and Korn /Perau-Korn 2013/ are investigating somewhat more general geotechnical issues in the construction of underground pumped-storage plants. Their objective is to prevent resulting buoyancy forces from acting on the storage structure by covering the entire storage structure with sediments. (see page 141 and page 144 of /Perau-Korn 2013/)

The present disclosure relates to support of the construction of a large-scale pumped-storage power plant in order to provide the necessary short-term storage capacity for the energy transition while keeping the ecological impact low despite the tremendous storage capacity. The pumped-storage power plant fault-friendly and safe; in particular, therefore, test operation should be made possible as early as during construction. Furthermore, the pumped-storage power plant may be usable on a preliminary basis as early as during the construction thereof, which may take several years.

General Description

The present disclosure relates to a method for the preliminary use, in particular for the test operation, of an at least partially constructed lower reservoir for an underwater pumped-storage power plant, wherein the at least partially constructed lower reservoir is located in a dry but floodable ground depression, in particular in an abandoned or still operating open-pit mine, e.g., on a lower or the lowest floor of the open-pit mine. The dry ground depression is a depression which is at least not substantially filled with water, but which can in principle be flooded in such a way that an artificial lake can be formed therein.

The at least partially constructed lower reservoir for the future underwater pumped-storage power plant is designed or set up such that, when the dry ground depression is flooded, the plant can be operated in such a way that electrical energy is generated when water is admitted into the lower reservoir from the flooded ground depression and electrical energy is stored when water is pumped out of the lower reservoir into the flooded ground depression.

According to the present disclosure, a preliminary upper reservoir is constructed above the at least partially constructed lower reservoir, the upper reservoir not being identical to the ground depression and being preferably smaller than the dry ground depression and/or having a shallower depth than the dry ground depression, thus preferably having a smaller volume than the entire dry ground depression. It is also possible for a plurality of upper reservoirs to be constructed. Furthermore, according to the present disclosure, the lower reservoir, which has been or is being built while the ground depression is still dry, is connected to the preliminary upper reservoir via a (preliminary) penstock.

With the preliminary upper reservoir and the (preliminary) penstock, the at least partially constructed lower reservoir can be used on a preliminary basis in such a way that electrical energy is generated when water is admitted from the preliminary upper reservoir (via the preliminary penstock) into the lower reservoir and electrical energy is stored when water is pumped from the at least partially constructed lower reservoir (via the preliminary penstock) into the upper reservoir.

The method described above is also further explained with reference to drawings and is referred to as the "interim method."

Various options can be considered for constructing a preliminary upper reservoir. According to one embodiment, a preliminary upper reservoir can be constructed by dividing the dry ground depression, in particular the open-pit mine, in such a way that a first partial area is formed in which the at least partially constructed lower reservoir is located, and a second partial area is formed which forms the preliminary upper reservoir.

Dividing the dry ground depression into at least two partial areas in this way, one forming the higher upper reservoir, can be accomplished in particular by building a dam, a dam wall, or other boundary. The preliminary upper reservoir is thus in particular separated from the dry ground depression.

The preliminary upper reservoir can, for example, be located on the slope of the still-dry ground depression, preferably as far up as possible. For example, an upper basin can be created in the shallow area of the open-pit mine by means of a dam that is flooded with water, with the actual deep open-pit mine being left dry. The already assembled portion of the lower reservoir can be connected to said upper basin by means of pipes, so that, in parallel with the lignite mining in the open-pit basin, the upper-lower basin system can be put into operation as a hydro pumped-storage power plant at this early stage.

According to another embodiment that can be provided as an alternative or in addition, a preliminary upper reservoir can also be constructed by excavating or providing, in addition to the dry ground depression, another ground depression which forms the preliminary upper reservoir, or building, in addition to the dry ground depression, a vessel or a basin which forms the preliminary upper reservoir. In general, in both method variants, the preliminary upper reservoir can be designed in particular as a vessel or as a basin.

According to another embodiment, the dry ground depression, in particular the open-pit mine, or the partial area in which the at least partially constructed lower reservoir is located, is further widened and/or deepened while the at least partially constructed lower reservoir is in test operation. In other words, after the at least partially constructed lower reservoir has been connected to the preliminary upper reservoir and/or it has already been used or tested on a preliminary basis, the ground depression can be further widened and/or deepened. Further widening and/or deepening can be carried out in particular using open-pit mining machinery already present on site and/or for the further extraction of mineral resources in open-pit mining operations.

Test operation of the at least partially constructed lower reservoir makes it possible to gain experience and to adapt the further construction measures accordingly, in particular to ensure a high level of safety and fault tolerance of the eventual underwater pumped-storage power plant. Accordingly, the at least partially constructed lower reservoir and/or the preliminary upper reservoir can be converted and/or expanded after it has been connected to the preliminary upper reservoir and has preferably already been used or tested on a preliminary basis, i.e., in particular, once experience from test operation is already available.

The present disclosure further relates to a method for converting a lower reservoir set up for preliminary use, in particular for test operation, which is connected to a preliminary upper reservoir via a penstock (in particular as described above), into an underwater pumped-storage power plant.

In this process, a dry ground depression in which the lower reservoir is located is flooded with water so that an artificial lake is created therein, forming a final upper reservoir for the underwater pumped-storage power plant. In other words, the dry ground depression is later flooded with water in order to replace the preliminary upper reservoir with an upper reservoir formed as an artificial lake in the ground depression, thereby completing the final underwater pumped-storage power plant.

After flooding, the underwater pumped-storage power plant can be operated in such a way that electrical energy is generated when water is admitted into the lower reservoir from the flooded ground depression and electrical energy is stored when water is pumped out of the lower reservoir into the flooded ground depression.

Flooding of the dry ground depression, in particular the open-pit mine, can take a long time, sometimes years. Even during flooding, the lower reservoir can initially continue to be used or tested on a preliminary basis, in that the preliminary state is maintained while admitting water from the preliminary upper reservoir into the lower reservoir and/or pumping water from the lower reservoir into the upper reservoir.

Furthermore, when flooding the ground depression, it may be favorable to generate energy with the turbines, pumps and/or pump turbines that are already present. It may therefore be appropriate for the ground depression to be flooded with water in such a way that the water is initially admitted into one or more of the pressure vessels via a penstock provided therefor while delivering electrical energy, and thereafter pumped out of the pressure vessel or vessels into the ground depression while consuming electrical energy, in order to gradually flood the ground depression and generate (net) electrical energy in the process.

After or optionally also during flooding of the dry ground depression, e.g., toward the end of flooding, the penstock to the preliminary upper reservoir can be detached and/or removed.

Furthermore, after or optionally also during flooding of the dry ground depression, and in particular after the penstock to the preliminary upper reservoir has been detached, the preliminary upper reservoir can be transformed into a reclamation lake.

The present disclosure further relates to a preliminary pumped-storage power plant. The preliminary pumped-storage power plant comprises an at least partially constructed lower reservoir for an underwater pumped-storage power plant, which is located in a dry but floodable ground depression, in particular in an open-pit mine, and which, when the dry ground depression is flooded, can be operated in such a way that electrical energy is generated when water is admitted into the lower reservoir from the flooded ground depression and electrical energy is stored when water is pumped out of the lower reservoir into the flooded ground depression.

The preliminary pumped-storage power plant further comprises a preliminary upper reservoir which is located above the at least partially constructed lower reservoir, the upper reservoir not being identical to the dry ground depression and being in particular smaller said reservoir, wherein the at least partially constructed lower reservoir is connected to the preliminary upper reservoir via a (preliminary) penstock so that the lower reservoir can be used on a preliminary basis in such a way that electrical energy is generated when water is admitted into the lower reservoir from the preliminary upper reservoir and electrical energy is stored when water is pumped from the lower reservoir into the upper reservoir.

In the following, further aspects are provided in relation to the method according to the present disclosure, stated at the outset, for the provisional use, in particular for test operation, of an at least partially constructed lower reservoir for an underwater pumped-storage power plant. The following further aspects also apply accordingly to the preliminary pumped-storage power plant.

According to one further aspect, the at least partially constructed lower reservoir comprises a large number of pressure vessels which are arranged side by side and/or one above the other in the dry ground depression, e.g., on a lower floor of the open-pit mine. The pressure vessels or some of the pressure vessels located in the ground depression and forming the lower reservoir can then be connected to the preliminary upper reservoir via the (preliminary) penstock.

A large number of pressure vessels are provided or built on site, in particular a large number of similar pressure vessels that are ideally mass-produced for reasons of cost. The many pressure vessels are built or mass-produced in particular in the dry ground depression, so that they are preferably available directly at the bottom of the ground depression. In the case of an open-pit mine, the pressure vessels can be built, for example, on a lower floor of the open-pit mine or even on the lowest floor.

The many pressure vessels can be arranged side by side and/or one above the other in the dry ground depression, where they form the lower reservoir for the underwater pumped-storage power plant to be constructed. In the case of an open-pit mine, the pressure vessels are preferably arranged side by side and/or one above the other on a lower floor or even on the lowest floor. The pressure vessels can be arranged in such a way that the pressure vessels are arranged side by side, in particular directly adjacent to one another, i.e., such that the pressure vessels are arranged side by side in a row along one direction, for example, or even side by side along two directions in a grid or matrix. In addition, the pressure vessels can also be arranged one above the other, for example in multiple layers, which, in turn, can be in particular directly adjacent to one another, so that the pressure vessels touch each other or are supported against each other.

Arranging the pressure vessels in the ground depression while it is still dry is disclosed. For example, the pressure vessels can be built directly at the position where they are to be arranged, i.e., the method steps of building and arranging can form a joint step. But even if the pressure vessels are initially built elsewhere, it is possible to subsequently arrange them very precisely as long as the ground depression is still dry. In addition, machines that operate in dry conditions can be used for the construction, machining and/or arrangement of the pressure vessels in the dry depression, in particular open-pit mining machinery which may already be on site anyway. Dry arrangement also allows the pressure vessels to be conveniently connected to or equipped with connecting pipes, turbines, pumps, pump turbines, shafts, or other structural elements. It should also be noted that larger, more compact arrangements of pressure vessels can be constructed in dry conditions than would be possible in the case of subsequently sinking them. Last but not least, arranging the pressure vessels in the still-dry ground depression is particularly cost-effective and flexible.

The use of a number of pressure vessels, in particular a large number, allows the pressure vessels to be mass-produced, which in turn saves costs and makes it possible to use pressure vessels that have as simple or geometrically simple a shape as possible, are not very prone to faults and are very reliable in terms of their structural stability. By virtue of the lower reservoir of the pumped-storage power plant to be built being composed of a large number of pressure vessels, a high degree of safety is also achieved because, in the event of a defect, only individual pressure vessels are affected, which then, either temporarily or permanently, no longer contribute to the lower reservoir. At the same time, the use of many, in particular similar, pressure vessels allows a high degree of design flexibility and subsequent expandability.

In particular, the at least partially constructed lower reservoir can be converted and/or expanded in such a way that further pressure vessels are arranged next to and/or above the pressure vessels already present. This will be discussed in more detail below.

The pressure vessels are preferably designed, built or machined in such a way that they each have at least one flow-through opening for admitting and/or discharging water so that they can serve as a lower reservoir for the underwater pumped-storage power plant to be constructed.

Particularly preferably, the pressure vessels are also designed, built or, optionally, machined in such a way that they are sufficiently pressure-resistant to be able to be pumped dry in a dimensionally stable manner against a hydrostatic water pressure acting on them from the outside when the ground depression is flooded with water, i.e., an artificial lake is formed therein which covers the pressure vessels.

The large number of pressure vessels are preferably equipped with one or more turbines, pumps and/or pump turbines so that, when the dry ground depression is flooded with water, the underwater pumped-storage power plant can be operated in such a way that electrical energy is generated when water is admitted into the pressure vessels from the flooded ground depression and electrical energy is stored when water is discharged from the pressure vessels into the flooded ground depression. It can be the case that the pressure vessels are equipped with one or more turbines, pumps and/or pump turbines after said vessels have already been arranged. Alternatively, turbines, pumps and/or pump turbines can also be fitted to a pressure vessel itself even before it is arranged in its desired position.

With regard to equipping the pressure vessels with turbines, pumps and/or pump turbines, various options are available.

One option is that, of the large number of pressure vessels, individual pressure vessels are designed as independent pressure vessels by equipping each of said pressure vessels, via at least one flow-through opening thereof, with its own turbine, pump and/or pump turbine. Even in the case of multiple flow-through openings, a pressure vessel can be designed as an independent pressure vessel, e.g., by connecting one flow-through opening to a turbine and another flow-through opening to a pump. In the context of this disclosure, a pressure vessel designed as an independent pressure vessel is also referred to as an "autarkic case". It can be the case, for example, that at least one of the pressure vessels, at least some of the pressure vessels, the majority of the pressure vessels or even all of the pressure vessels are designed as independent pressure vessels.

According to another embodiment, which can be considered additionally or alternatively, of the large number of pressure vessels, a plurality thereof can be designed as a pressure vessel group by interconnecting said pressure vessels via at least one pressure line or via a plurality of pressure lines between respective flow-through openings and equipping said vessels with a common turbine, pump and/or pump turbine. The plurality of pressure vessels interconnected to form a group can, for example, be two or more adjacent pressure vessels, in particular arranged directly side by side and/or one above the other. In the context of the present disclosure, designing a plurality of pressure vessels as a group is also referred to as the "oligotarkic case" or the "centralized case", as will be discussed in further detail below. A plurality of pressure vessel groups may be designed, e.g., by connecting some adjacent pressure vessels to form a group in each case.

As explained above, use can be made of a number, in particular a large number, of pressure vessels. In principle, at least four or at least ten pressure vessels can be provided, for example. Preferably, in particular after the lower reservoir has been converted and/or expanded, at least 100 pressure vessels can be comprised, preferably at least 1,000 pressure vessels can be comprised and even more preferably at least 10,000 pressure vessels can be comprised.

In particular in the case of a large number of pressure vessels contributing to the total volume of the lower reservoir, the pressure vessels can in particular have relatively small volumes. Accordingly, the pressure vessels, or at least one pressure vessel has a volume of less than 600,000 cubic meters, preferably of less than 100,000 cubic meters, particularly preferably of less than 15,000 cubic meters. At the same time, the pressure vessels should not be too small either. This is because, in particular in the case of spherical pressure vessels, bottlenecks of free spaces between the pressure vessels should not become too small. One reason is that turbines, pumps and/or pump turbines can then be better arranged, operated or maintained in the free spaces, in particular because the free spaces between the pressure vessels can serve for water flows or pump turbines remain easily accessible for inspection. Another reason is to ensure that the pump turbines have a favorable cost-benefit ratio. Accordingly, it is intended in particular to have a volume of at least 1,000 cubic meters, preferably of at least than 5,000 cubic meters, particularly preferably of at least 10,000 cubic meters. Overall, it may therefore be useful, for example, for one, some or all of the pressure vessels to have a volume of between 5,000 and 600,000 cubic meters, preferably between 5,000 and 100,000 cubic meters, and particularly preferably between 5,000 and 15,000 cubic meters.

To be able to arrange the pressure vessels suitably side by side and/or one above the other, many different shapes can be considered. For example, tubular or toroidal pressure vessels may be provided. For reasons of structural stability, pressure vessels with a sphere-like shape are particularly suitable. Accordingly, it may be the case that the pressure vessels or at least some of the pressure vessels have a shape that fills a smallest possible (hypothetical) enveloping sphere to at least 25 percent in terms of volume, preferably at least 50 percent, particularly preferably at least 75 percent, and most particularly preferably at least 90 percent. In this context, the shape of the pressure vessels refers in particular to the outer shape of the pressure vessel components that ensure the resistance to pressure. Specifically, the pressure vessel or at least some of the pressure vessels may be designed in particular as pressure-resistant spheres, as an egg shape, an ellipsoid or polyhedron.

Pressure vessels with sphere-like or spherical geometry are stabilized by the external pressure. Even if, for example, cracks are already present, the pressure vessels often remain functional because such cracks are compressed by the external pressure. This can result in the pressure vessels having a very long service life of, for example, over 100 or over 1,000 years. Furthermore, the pressure vessels can be made of a concrete without iron reinforcement, for example. By using a concrete, e.g., for off-shore installation, which does not require iron reinforcement, there is no rust formation, which is likewise beneficial to the aforementioned long service life. A service life of over 100 or over 1,000 years enables very long depreciation periods for the concrete spheres, thus providing an investment in the future energy supply from which many generations will benefit. The present disclosure is therefore characterized in particular by a high level of sustainability.

As will be discussed in more detail below, the wall thickness of the pressure vessels can be estimated on the basis of various factors. In a favorable case, however, the pressure vessels each have a wall thickness of between 5% and 15%, preferably between 7.5% and 12.5%, e.g., of 10% of the equivalent spherical diameter of the storage volume. This can compensate for the buoyancy of the pressure vessel when empty.

As already explained, the pressure vessels can be positioned side by side and/or one above the other in the dry ground depression, e.g., on a lower floor of the open-pit mine. In this case, the pressure vessels are preferably arranged at regular intervals side by side and/or one above the other.

A preferred possibility is that the pressure vessels are arranged in the dry ground depression in such a way that a lower pressure vessel layer containing pressure vessels arranged at regular intervals and lying directly on the subsurface is formed, which layer is preferably suitable as an underlayer for a second pressure vessel layer having a regular arrangement lying thereabove, in such a way that the pressure vessels of the second pressure vessel layer can be stably arranged in depressions in the lower pressure vessel layer lying therebelow. This means in particular that pressure vessels of a second layer cannot easily slide or slip sideways.

A lower layer of pressure vessels preferably comprises at least 100, particularly preferably at least 500, more preferably at least 1,000 pressure vessels in a regular arrangement. The pressure vessels may be arranged while the depression is still in the dry state, as it would be far more difficult to create a regular arrangement of pressure vessels in the form of a lower layer by subsequently sinking them into an already existing lake. This is also due to the fact that the subsurface can be leveled more easily beforehand in the dry state, as will be explained below. In this context, however, reference is made to the special procedure of "lake-based deployment" described in more detail below.

Preferably, in particular as long as the ground depression is still dry, a second pressure vessel layer is preferably arranged on the lower pressure vessel layer lying on the subsurface and a third pressure vessel layer is particularly preferably arranged thereon and further pressure vessel layers are optionally arranged thereon, wherein the pressure vessel layers—as described above—are each in turn preferably suitable as an underlayer for a pressure vessel layer lying thereabove in each case.

In the case of most shapes chosen for pressure vessels, in particular in the case of sphere-like or spherical pressure vessels, free spaces remain between the pressure vessels. Preferably, the many pressure vessels in the dry ground depression are arranged side by side and/or one above the other, in particular arranged as a lower, a second and a third pressure vessel layer, in such a way that free spaces remain between the pressure vessels and extend from the top, preferably rectilinearly from the top, to the subsurface, in particular through all the layers, and preferably in such a way that the free spaces occur in a regularity defined by the arrangement of the pressure vessels. Free spaces of this kind can form water-bearing access points to the flow-through openings or turbines, pumps and/or pump turbines.

In this case in particular, but also independently of this, one or more free spaces remaining between pressure vessels can be designed as continuously upward, optionally upwardly projecting, shafts.

As discussed and illustrated below in more detail with reference to examples, the pressure vessels can be arranged according to the structure of a close-packing, in particular hexagonal close-packing, of spheres, preferably by arranging pressure vessels of the lower and optionally of the second pressure vessel layer according to the structure of a close-packing of spheres and optionally by arranging the pressure vessels of the third pressure vessel layer according to the structure of a hexagonal close-packing of spheres (and therefore in turn congruent with the lower layer).

If the pressure vessels are arranged in layers, e.g., in a close-packing of spheres, but also independently thereof—with reference to the "autarkic" case—a pressure vessel designed or to be designed as an independent pressure vessel is arranged or machined in such a way, for example, that a flow-through opening for admitting and/or discharging water into the pressure vessel is arranged at the bottom or laterally at the bottom of the pressure vessel, preferably in such a way that the flow-through opening is located inside the pressure vessel at the lowest point.

Alternatively or additionally—with reference to the "oligotarkic" or "centralized" case—a plurality of pressure vessels designed or to be designed as a pressure vessel group can be arranged or machined in such a way that at least one flow-through opening in one or preferably in each pressure vessel of the pressure vessel group is arranged at the bottom or laterally at the bottom of the pressure vessel, in particular in such a way that the flow-through opening is located inside the pressure vessel at the lowest point, and wherein preferably two pressure vessels arranged one above the other are connected to one another via pressure lines between a flow-through opening arranged at the bottom or laterally at the bottom of the pressure vessel arranged further up and a flow-through opening in the pressure vessel arranged further down.

According to the consideration that free spaces between the pressure vessels can serve as water-bearing access points, it can be expedient—with reference to the "autarkic" case—that an individual turbine, pump and/or pump turbine of an independent pressure vessel is connected to a flow-through opening in the pressure vessel in such a way and/or is arranged in a free space formed between pressure vessels in such a way that, when the dry ground depression is flooded with water, water that is admitted into the pressure vessel is drawn preferably from the top, particularly preferably rectilinearly from the top, via the free space and/or water that is discharged from the pressure vessel is discharged preferably upward, particularly preferably rectilinearly upward, via the free space.

Alternatively or additionally—with reference to the "oligotarkic" or "centralized" case—a common turbine, pump and/or pump turbine of a pressure vessel group can also be connected to a flow-through opening in a pressure vessel or to a pressure line connecting the pressure vessels in such a way and/or be arranged in a free space formed between pressure vessels in such a way that, when the dry ground depression is flooded with water, water that is admitted into the pressure vessel group is preferably drawn from the top, particularly preferably rectilinearly from the top, via the free space and/or water that is discharged from the pressure vessel group is preferably discharged upward, particularly preferably rectilinearly upward, via the free space, wherein the common turbine, pump and/or pump turbine is preferably arranged on the subsurface or recessed in the subsurface.

With regard to the arrangement of the pressure vessels, it can be favorable if at least some of the pressure vessels, in particular the pressure vessels of the lower pressure vessel layer, are arranged in the dry ground depression, e.g., on a lower floor of the open-pit mine, in such a way that adjacent pressure vessels are each supported laterally against one another and/or pressure vessels located at the edges are preferably supported laterally against a wall or a part of the dry ground depression.

In order to provide lateral support for pressure vessels located at the edges, it can be the case that walls and/or a trench bounded by walls can be provided or produced in the dry ground depression, in particular the open-pit mine, so that pressure vessels, in particular those of the lower layer, can be supported laterally thereagainst. In this context the ground depression is dry, i.e., the production of retaining walls can be carried out using normal construction machinery, or, in the case of an open-pit mine, using open-pit mining machinery already present on site. Preferably, retaining walls and/or a trench are constructed in the ground depression before the pressure vessels are arranged therein. Incidentally, the subsurface for the pressure vessels can also be leveled at the same time.

The pressure vessels may remain at the bottom of the ground depression without significant weighting or anchoring, or even entirely without weighting or anchoring, when said depression is flooded with water. Therefore, at least some of the pressure vessels preferably have a mass which is greater than, or at least not substantially less than, the mass of the water displaced by the pressure vessel when the dry ground depression is flooded with water.

Independently of this, at least some of the pressure vessels, in particular the pressure vessels of a lower pressure vessel layer, can be fixed or anchored to the subsurface, and/or at least some of the pressure vessels, in particular the pressure vessels of an upper pressure vessel layer, can be weighted with ballast, in particular with excavated material from the ground depression. These measures can serve to ensure that the pressure vessels remain on the subsurface when the ground depression is flooded with water, but they can also be provided when the pressure vessels would already remain on the subsurface due to their mass, e.g., in order to stabilize the pressure vessels against sliding out of position.

As already discussed, free spaces usually remain between the pressure vessels arranged side by side and/or one above the other, in particular if the pressure vessels are sphere-like or spherical. While such free spaces—as described above—can serve as a link between the eventual artificial lake and the turbines, pumps and/or pump turbines, not all free spaces are necessarily required or suitable for this purpose.

Accordingly, free spaces that remain between pressure vessels and do not serve as access to turbines, pumps and/or pump turbines, can be backfilled or filled with excavation or construction material (e.g., sand, stones, rubble and/or cement). This can be done, for example, with a view to stabilization or even to influence the flow behavior of the water.

Weighting the pressure vessels and/or backfilling free spaces between the pressure vessels should preferably be designed or carried out in such a way that the weighting material or backfilling material remains stationary and does not, for example, get washed away by flowing water, contaminate the water or damage turbines, pumps or pump turbines. For this purpose, the material can be fixed in place with cement, for example.

In a particular embodiment of the present disclosure, the large number of pressure vessels can also be designed as a pressure vessel entity in that said pressure vessels communicate with one another via respective flow-through openings and are closed off to the outside with a common casing, the common casing having at least one flow-through opening to the outside in order to be able to equip the pressure vessel entity with a common turbine, pump and/or pump turbine.

It may be worthwhile to first further widen and/or deepen the ground depression, in particular if it already exists as an open-pit mine, preferably using open-pit mining machinery already present on site. This can be carried out in particular after the lower reservoir has been connected to the preliminary upper reservoir. In particular, the ground depression can be further deepened and/or widened in such a way that a depth of more than 100 meters, preferably more than 300 meters, more preferably more than 400 meters, even more preferably more than 500 meters, particularly preferably more than 700 meters and optionally even more than 1,000 meters is reached.

Even if the ground depression does not already exist as a natural depression or as an open-pit mine, it may be worthwhile to initially construct it on a "green field" or "yellow desert sand" site. Accordingly, the dry ground depression for the construction of the underwater pumped-storage power plant can initially be created in particular in such a way that a depth of more than 100 meters, in particular more than 200 meters, preferably more than 300 meters, more preferably more than 400 meters, even more preferably more than 500 meters, particularly preferably more than 700 meters and optionally even of more than 1,000 meters is reached.

In a preferred embodiment, a cavity, e.g., a shaft or a tunnel, for the installation of technical equipment such as cables, pressure lines, turbines, pumps and/or pump turbines, can be provided or created in the dry ground depression below a floor planned as a subsurface for the arrangement of the pressure vessels. This is described and illustrated in more detail below.

Alternatively or additionally, however, a negotiable and/or drivable cavity, e.g., a shaft or a tunnel, in particular for the supply and/or maintenance of technical equipment, can also be provided or created in the dry ground depression below a floor planned as a subsurface for the arrangement of the pressure vessels, optionally again below—as described above—a cavity for the installation of technical equipment. Such a negotiable and/or drivable cavity can preferably be connected to an external access which is provided or created in particular in a slope or on a slope of the ground depression.

In particular, the at least partially constructed lower reservoir created within the scope of the present disclosure can be operated without connections to the outside air. In particular, the construction of appropriate connections, e.g., towers to the surface of the eventual artificial lake planned for the depression, is therefore not required. Greater depths may be considered for the ground depression. Air in the cavities reduces the efficiency of energy storage, since it does not condense when the pressure in the cavities is increased, but rather builds up a counterpressure and heats up in the process. This thermal energy can be a major loss factor for the type of energy storage proposed here.

Accordingly, the at least partially constructed lower reservoir or the pressure vessels or at least some of the pressure vessels is/are preferably designed in such a way, are arranged in such a way, are equipped with one or more turbines, pumps and/or pump turbines in such a way and/or are connected to one another via pressure lines between respective flow-through openings in such a way that, when water is discharged from the pressure vessel, no air flows into the pressure vessel, but preferably a vacuum limited only by the partial pressure of the water vapor is created in the pressure vessel.

Furthermore, it can be the case that, when water is admitted into the pressure vessel, the pressure vessel is not completely filled with water but preferably a specific residual volume remains with a vacuum limited in particular only by the partial pressure of the water vapor. Such a residual volume can be very small; for example, it can be less than 100 cubic meters, preferably less than 10 cubic meters, or even a residual volume of less than 1 cubic meter is possible.

If the pressure vessels are arranged in multiple layers, a "lake-based deployment" of the pressure vessels may be appropriate. Accordingly, it can in particular be the case that the large number of pressure vessels in the dry ground depression, e.g., on a lower floor of the open-pit mine, are arranged in layers in such a way that in the dry ground depression firstly a lower pressure vessel layer of pressure vessels lying directly on the subsurface is formed, and thereafter the ground depression is filled with water to such an extent that pressure vessels for a second pressure vessel layer can be conveyed by means of floating to respectively intended positions above the lower pressure vessel layer, and the second pressure vessel layer is formed by conveying the pressure vessels for said layer by means of floating to the respectively intended positions, e.g., by making said vessels buoyant, and by lowering said vessels to the lower pressure vessel layer, e.g., by making said vessels submersible or submersible again.

In an analogous manner, the ground depression can then of course gradually be filled further with water to such an extent that pressure vessels for a third pressure vessel layer and, optionally, further pressure vessel layers, can each be conveyed and lowered to intended positions by means of floating.

Using a "lake-based deployment" of this kind for the pressure vessels represents a particular approach for allowing very heavy pressure vessels in particular to be set down in a targeted and simple manner by filling the ground depression with water in a specifically selected way.

According to another development of the present disclosure, a lower reservoir of pressure vessels that is already submerged can be subsequently expanded. For this purpose—after the large number of pressure vessels have been arranged in the ground depression and the ground depression has been at least partially flooded with water such that an artificial lake serving as an upper reservoir is formed—one or more further pressure vessels can be lowered from the surface of the lake onto the already arranged pressure vessels.

Preferably, in this case, the already arranged pressure vessels are arranged as one or more pressure vessel layers, so that the further lowered pressure vessels can be stably arranged in depressions in one of the pressure vessel layers. The further lowered pressure vessels are designed in particular as independent pressure vessels having their own turbine, pump and/or pump turbine.

BRIEF DESCRIPTION OF THE DRAWINGS

In the drawings:

FIG. 5a shows a cross section in plane A-A # from the top view in FIG. 4 in a schematic, oversimplified representation, where the small circles are not to scale and indicate only the location at which the lateral ends of the sphere lying directly in front of and behind the cross-sectional plane touch. It possible to see a trench having embedded cavity storage tanks 3 arranged in hexagonal close-packing of spheres as well as clear access shafts 4 to the pump turbines.

FIG. 5b shows a cross section in plane B-B # of the top view in FIG. 4 again in schematic representation (as in FIG. 5a), where the backfill space 22 can be filled with stones, gravel and sand.

FIG. 8a shows a schematic cross section of an open-pit mine, e.g., the Hambach trench, with connecting pipes 6 from the storage spheres 3 to bunkers which are installed on the lake bottom 1 and contain a common pump turbine 77 for a group of storage spheres.

FIG. 8b shows a schematic cross section of an open-pit mine, e.g., the Hambach trench, having short connecting pipes 61 from storage sphere to storage sphere and bunkers which are installed on the lake bottom and contain the common pump turbine 77 for a larger group of storage spheres, where the 2*8=16 spheres, which are located just behind and just in front of the cross-sectional plane shown and are only indicated in the drawing, can also be connected to the distribution pipework 6, which can also extend on or in the bottom 1 perpendicularly to the cross-sectional area shown.

FIG. 9a is a schematic cross section of an open-pit mine, e.g., the Hambach trench, with connecting pipes 6 from storage spheres to bunkers which are installed on the lake bottom and contain a common pump turbine 77 for a group of storage spheres.

FIG. 9b shows a schematic cross section of an open-pit mine, e.g., the Hambach trench, with short connecting pipes 61 from storage sphere to storage sphere and a bunker which is installed on the lake bottom and contains the common pump turbine 77 for a larger group of storage spheres.

DETAILED DESCRIPTION

Figure 1:
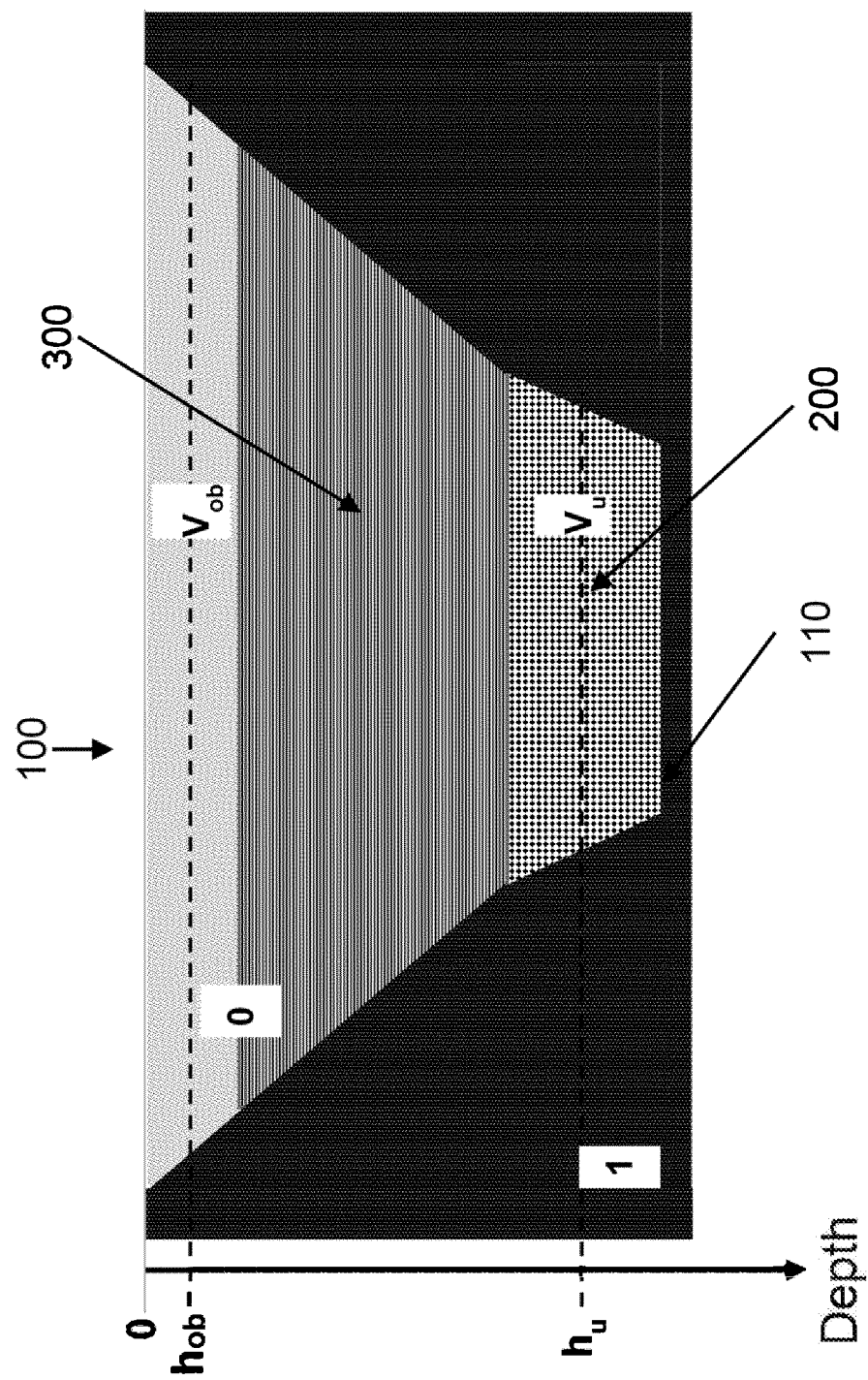
FIG. 1 is a schematic representation of a reservoir which, when storing energy, conveys water, in balance, with the volume Vob=Ffill*Vu from the middle depth $h_u$ of the lower basin constructed as a structure on the lake bottom to the upper basin at the middle depth $h_{ob}$.

In the following, the at least partial construction of a lower reservoir, in particular by means of a large number of spherical pressure vessels, is first discussed. Further below, the method according to the present disclosure for the preliminary use of the at least partially constructed lower reservoir ("interim operation") is described and illustrated in more detail.

Expansion of an Existing Open-Pit Mine as a PSPP

The following section discusses the expansion of an existing open-pit mine as a PSPP and the particular conditions of a large open-pit mine that is being phased out. However, the statements apply generally to any dry ground depression that already exists or is to be constructed. As will be discussed in more detail below, if the geology is suitable, a PSPP facility can be constructed on a "green field" (or "yellow desert sand") site without the preparatory work of an open-pit mine being phased out.

The following section therefore deals with the approach of optimally and extensively developing an existing open-pit mine for energy storage as an "unconventional PSPP," using the lake provided by reclamation as the upper basin and a suitable cavity structure to be constructed at the bottom 1 of the lake as the lower basin. This is shown schematically in FIG. 1. The lower basin 200 has the gross volume $V_u$, but only the portion thereof characterized by the fill factor $F_{fill}$ can be used as net usable volume for energy storage. This net volume raises the water level of the upper basin 300, i.e., the open lake water 0 (free from structures), when pumping out, so that, in balance, the raised volume $V_{ob}$ there is filled with water. Depending on the requirements, power cables—but also water connection pipes or an access point or even a convenient access road—can be laid below the lake bottom 1 at a connection level 66, as shown in FIG. 2. The lower reservoir 200 is constructed on the subsurface 110 of the ground depression 100. A cavity 66 can be located therebelow and can serve as an installation route, underground connection level, e.g., having a channel for power lines, water connection pipes or even an access point/road.

Depending on the embodiment, the present disclosure can be implemented with one or more of the following features:
- the entire volume available as a "lower basin" can be used for energy storage as far as possible.
- The facility consists of independent elements, each of which remains accessible from the outside.
- Safety: In the event of an accident, the effects remain limited to a part of the overall plant where the hazard potential is manageable and, in particular, a "chain reaction" of further accidents remains impossible.
- Installation of the storage facility remains possible—at least after a technical cabling level 66 is installed on or in the ground and a first layer of the storage level—in principle even after the lake has been filled.
- Any remaining buoyancy of the elements emptied of water (i.e., energetically charged) is compensated for in the immediate vicinity of each element and, due to the symmetry of the forces acting on the storage element, the creation of torques is also avoided as far as possible.
- The inflows and outflows of lake water to the pump turbines are distributed over a large area across the surface of the facility, resulting in very low flow velocities in the body of lake water. At constrictions within the storage facility, water velocities, which are inevitably slightly higher at these points, can be flow-adjusted by continuously narrowing (or widening) transition sections.
- The pump turbines are installed in the lower part of a cavity or, in the case of cavity bodies resting directly on the lake bed, possibly also in caverns in the lake bottom in order to manage without upstream pressure when pumping.
- The PSPP plant can be constructed and put into partial operation in parallel with the phasing out of coal mining.

Depending on the embodiment, the present disclosure is based on one or more of the concepts listed below for reclaiming a large abandoned open-pit mine as a lake and using it as a pumped-storage power plant. Further embodiments are given below.

(1.) Basic Storage Cell: Hollow Sphere Storage (Lake Egg)

Preferably, a hollow sphere storage tank (hereinafter called a "lake egg"), which is commonly referred to as a pressure vessel, is used as the basic storage cell. In principle, the shell thickness need only be as thick as required on account of the water pressure, since buoyancy safety can also be achieved by embedding (see (8.)). Alternatively, it may be more practical and simpler in some cases to keep using an intrinsically buoyancy-compensated "unit sphere" even at small depths.

Furthermore, the following should be noted:
- "Pipe bundles" of large volume can also be used as water storage shafts in horizontal or vertical arrangements. However, the initially free and above-ground access in the abandoned open-pit mine allows the use of large, serially produced spheres, for filling and permits a smaller wall thickness (about half as thick).
- More detailed structural considerations will likely reveal that improvements can be achieved from small deviations from the spherical shape to more "egg-shaped" hollow bodies. However, we will continue to use the term "hollow sphere" as an idealized term even for such structures and will base the capacity calculations on a sphere.
- Suitable polyhedra are also conceivable.

(2.) Pump Turbine (PT)

Three cases in particular can be distinguished when equipping the storage facility with pumps and turbines:
1. Case: Autarkic, PT for any basic storage cell, no other pipe connections.
2. Case: Oligotarkic: A few adjacent basic cells are connected by short connecting pipes; a symmetrical arrangement allows a new unit cell to be created from the connected elementary basic cells. Only one pump-turbine unit is used for this unit cell. Note: "Oligotarkic" denotes here the independence of the composite unit cell, which consists of a plurality of basic cells.
3. Case: Centralized: A plurality of basic cells or unit cells are grouped together and connected to a powerful central pump-turbine unit.

The case is selected on the basis of, for example, the cost structure of the pump turbines depending on capacity and on considerations of inflow, safety, and environmental impact.

The water—as shown in point (5.)—can reach the pump turbines from the lake quickly and with low resistance due to the geometrical arrangement of the basic cells (storage spheres).

(3.) Trench for Holding the Storage Units

A trench is constructed on the floor of the open-pit mine and can hold the primarily spherical basic storage cells in an orderly and symmetrical arrangement. The trench can extend over the entire available lake bottom. If necessary, it can also be "parceled out" in portions, e.g., by an earth wall.

Figure 3:
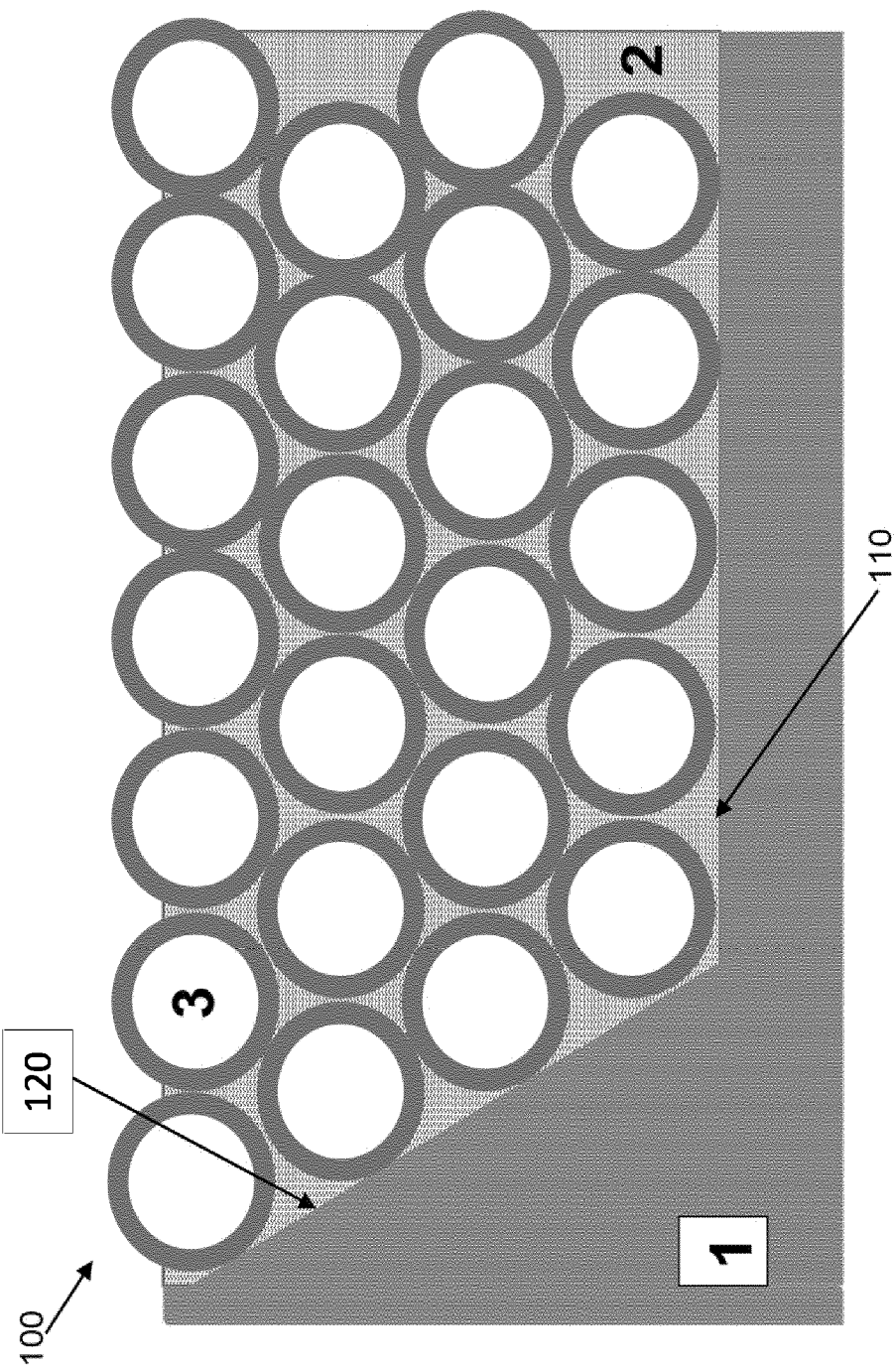
FIG. 3 is a schematic representation of an open-pit trench having embedded cavity spherical storage tanks in a regular arrangement.

FIG. 3 shows the easy-to-understand principle according to which the pressure vessels 3 ("lake egg"; elementary basic storage cell, primarily a hollow sphere storage tank) can be arranged at regular intervals on the subsurface 110 of the ground depression 100, which is defined by the bottom 1, and can optionally be laterally supported by walls 120. These can be imagined, for example, as if spheres were arranged in a large box with sloping walls. Between the spheres there usually remains a gap/free space 2, which at least in partial areas can be filled with embedding material (excavated material comprising sand, gravel, smaller rock fragments, possibly also lightweight concrete for stabilization), e.g., to prevent buoyancy, so that a sufficient average density results, and in other partial areas (particularly in the case of a hexagonal sphere arrangement) the space is kept clear to serve as a connecting space from the lake to the lower spheres or to installations on the bottom, as will be explained in more detail below.

Figure 4:
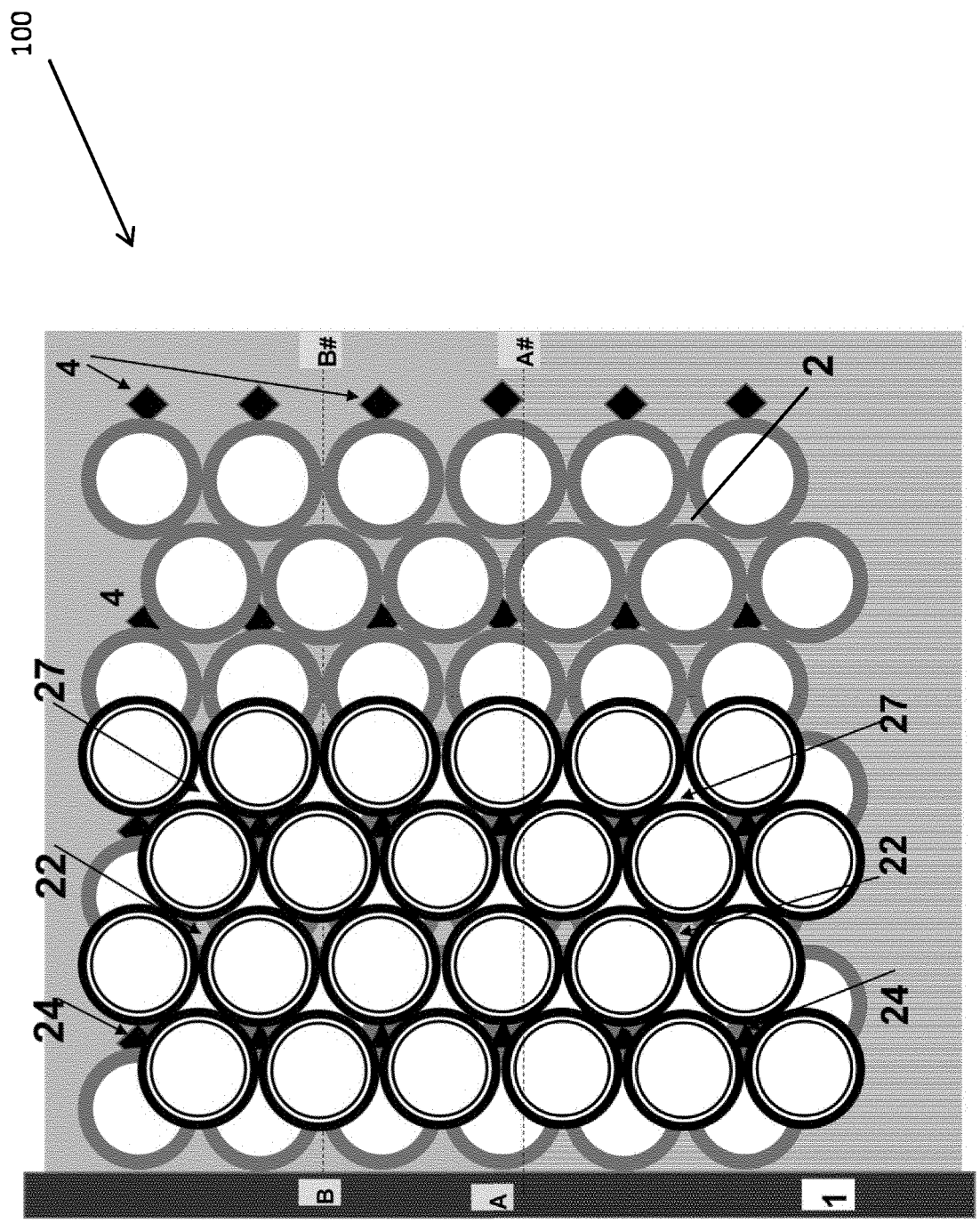
FIG. 4 is a schematic top view of an open-pit mine, e.g., the Hambach trench, having embedded cavity spherical storage tanks in hexagonal close-packing. The spheres are represented only two-dimensionally by their horizontal cross-sectional great circles. It is possible to see the whole extent of the second layer from the top and, on the left-hand side, a partial area of the topmost layer. For reasons of symmetry, the hexagonal close-packing of spheres illustrated results in continuous vertical free spaces 24 and 22 from bottom to top, one half of which (namely 24) can be used as access shafts or connecting shafts with a clear bottleneck shaft 4 as shown. In hexagonal close-packing of spheres, the spheres of every third level are again exactly above the spheres of a first level.

The cross-sectional plane shown in FIG. 3 may not yet show optimal symmetry of the sphere packing: each upper sphere sits on only two lower spheres. It is more favorable to use the optimal hexagonal close-packing of spheres for the basic storage cells, as we will illustrate in the following figures. The difference is a more effective offset of the horizontal levels of spheres, where each upper sphere sits in the trough between three lower spheres; this difference will be considered in the following figures (FIG. 4 and the following drawings).

(4.) Installation Routes 66

Below the trench holding the storage elements, channels can be constructed to accommodate the power cables, which are then routed up the side of the lower basin or in a shaft. In some embodiments (see below), these installation routes are developed as an access point to oligotarkic pump-turbine systems installed at the bottom. Drywall construction can be used to create an access tube along the slope of the upper and lower basin, providing convenient access for personnel and material transport to the technical equipment on or in the bottom of the lower basin. As in underground mining, the production sites are then easily accessible, but in this case the arduous underground tunneling can be done in advance in the convenient and dry open-pit mine.

(5.) Geometric Arrangement of the Lake Eggs: Hexagonal Close-Packing of Spheres

The lake eggs are preferably arranged in hexagonal close-packing of spheres. In such an arrangement, the spheres of each following level are fixed in half of the troughs of the level below. Two successive horizontal levels are offset by a symmetry-defined fraction of the sphere's diameter, resulting in identical packings of two of the mutually offset successive levels in each case. Therefore, in every third level the spheres are located exactly above the spheres of the first level. This distinguishes the hexagonal close-packing of spheres from the equally dense "cubic close packed" packing of spheres, in which only every fourth level is again located exactly above the first level.

Hexagonal close-packing of spheres results in continuous vertical free spaces. For a particularly vivid and detailed description of these symmetry forms, please refer to the homepage "Chemie verstehen" [Understanding Chemistry] by M. Schmidt /Schmidt 2019/. Alternatively, of course, one can also refer to crystallography textbooks. For the purpose of spatial imagination it might be helpful to "see" in the following figures not only the single spheres but also the tetrahedra of four spheres, namely those where three spheres abut in a (vertical or horizontal) plane and the 4th sphere is in the trough of the first three.

FIG. 4 is a top view of the ground depression 100 or trench having embedded pressure vessels 3 designed as cavity spherical storage tanks in hexagonal close-packing, where free spaces 2 remain between the pressure vessels 3. Each sphere is represented here only two-dimensionally by its horizontal cross-sectional great circle. It is possible to see the whole extent of the second layer from the top and, on the left-hand side, a partial area of the topmost layer.

Free spaces are created between the spheres. These free spaces 2 can be divided into two classes according to the criterion of "vertical access" to the lake above. They are:

Either an "access space" (22 and 24), which has a free vertical access to the open lake above, and which, depending on its function, can be further differentiated as a "backfilled" access space 22 if filled, for example, with sand, gravel, or stones, or as an open or surplus-water access space 24, if it remains open Or a "blind shaft space" 27—as we are to call a contiguous "trapped" space between the spheres, when no vertical access to the lake is possible from said space.

Thus, for reasons of symmetry, the hexagonal close-packing of spheres illustrated results in continuous vertical access spaces 22 and 24 from bottom to top, the constrictions of which remain visible in the top view. These free spaces can remain open in one portion to ensure lake water access to the pump turbines (surplus water access space 24) and thus can also be used as access shafts or connecting shafts for maintenance purposes, and they can be backfilled with rocks, gravel and sand in another portion as "backfilled access spaces" 22 to act as buoyancy barriers. In FIG. 4, in the case of the surplus-water access spaces 24, the vertical volume element resulting from the geometry of the consecutive constrictions is marked as a "clear bottleneck shaft" 4. This is therefore an imaginary subspace of the surplus-water access space 24. In this example, this "clear geometric bottleneck shaft" 4, results from the hexagonal geometry of the sphere arrangement and is located in the portion 24 of the free spaces 2 that is not backfilled.

Preferably, each sphere has direct access to three access spaces (22 or 24) adjacent thereto, and three adjacent spheres in each level can be directly accessed from an access space. Therefore, the access from the spheres to the access spaces can be selected in such a way that some of the access spaces are not used as access to the lake at all and can therefore also be backfilled, for example. In FIG. 4, exactly half of the access spaces were selected as surplus-water access space 24, which is also suggested for reasons of symmetry.

It can also be seen from FIG. 4 that each sphere is surrounded by three blind shaft spaces 27. It makes sense to backfill these blind shafts with sand, gravel or stones in the course of installing the facility, i.e., as long as they are not yet covered by the sphere level above and can therefore still be accessed from above. The small remaining lateral holes to surplus-water access spaces 24 can be sealed using binding material (e.g., lightweight concrete) or even using construction textiles during filling, or they can just be beveled.

It is possible to equip a hollow sphere with a balance (bead) so that it fits well on the spheres therebelow, in particular on the three spheres therebelow ("three" because of the hexagonal symmetry, see FIG. 4) on which it is placed. Optionally, the direct contact surfaces can also be provided with bonding materials or a mortar to compensate for small-area pressure points (otherwise see also below on "embedding"). In addition, it is possible to attach a balance so as to cover the lateral access to the cavities that are intended eventually to be backfilled.

We will now consider a cross section for the plan view of FIG. 4 (e.g., the Hambach trench), specifically in a plane A-A #, in which the surplus-water access spaces 24 to the pump turbines are located (FIG. 5a). The section passes through the vertical great circle of one third of the spheres and touches the lateral tips of the other ⅔ of the spheres, which are both behind and in front of the drawing plane. However, for clarity, we have only indicated this with a single bold dot.

Between the pressure vessels 3, which are designed as cavity storage tanks, free spaces 4 that are open at the top and designed as "clear access shafts" are shown; these can serve as access to the pump turbines. Generally, a surplus-water access space 24 can be provided between the pressure vessels 3 and a free space between the spheres, in which adequate access to the lake water can be ensured.

One can see that there is plenty of room at the shaft level and in the associated space between the spheres for access to the inlets/outlets thereof located laterally at the bottom. In principle, this space can be kept open to lake water; we then refer to it as the "surplus-water access space" 24.

However, it can be also be partially filled, e.g., with stone materials, in particular provided that a sufficiently large space for free access of water to the openings in each sphere remains ensured. In this regard one should also consider maintenance work, including replacement of the pump turbine, which will undoubtedly be due at some point.

In principle, a cross-sectional plane shifted by one sphere radius (see section line B-B # in FIG. 4) looks the same (see FIG. 5b), except that here there is optionally no access to the spheres and therefore the entire space, which we will now refer to as backfill space 22, could be filled with sand, gravel and stones.

Thus, one aspect of the entire storage facility is, in particular, that it results as if from building blocks from the symmetrically ordered arrangement of stable and statically optimal, elementary hollow bodies (in particular hollow spheres). In the same way as a simple wall can be assembled from clinker bricks set in a bond, we build a storage facility from hollow spheres in hexagonal close-packing of spheres, the storage space then being located in the extremely stable interior of the hollow spheres and the symmetry of the arrangement providing for access spaces open to the lake and, optionally, also for suitable embedding spaces for ballast material.

Further below, some additional embodiments and details on the construction and design of a storage facility will be discussed, as well as more considerations. Before that, however, the enormous economic and energy potential will be discussed.

Energy Potential of an Open-Pit Mine Converted to a PSPP

Figure 2:
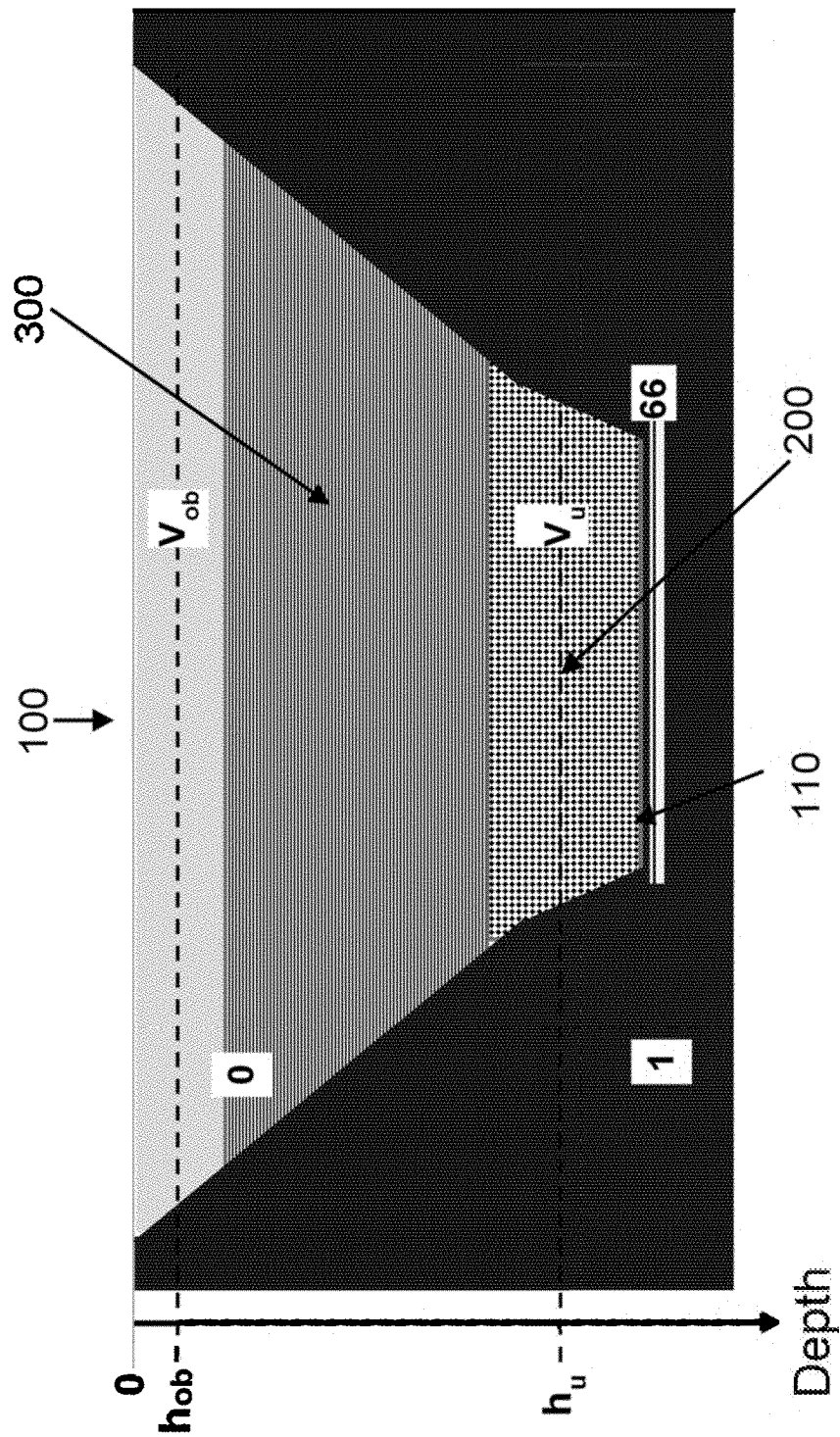
FIG. 2 shows the reservoir from FIG. 1 having an installation route/underground connection level, e.g., having a channel for power lines, water connection pipes or access/access route.

The present disclosure relates in particular to optimally and extensively developing an existing open-pit mine for energy storage as an "unconventional PSPP," using the lake provided by reclamation as the upper basin and using a suitable cavity structure to be constructed at the bottom of the lake as the lower basin (cf. FIG. 1).

The volume $V_{Sp}$ of the cavity structure available for the storage process is obtained from the geometrically strained volume $V_u$ by multiplying it by a fill factor $F_{fill}$:

$$V_{Sp} = F_{fill} \cdot V_u \quad (1)$$

The fill factor can be calculated from the wall thickness required for the stability of the vessels and from the gaps between the vessels. For the arrangement of hollow spheres in hexagonal close-packing (see below), which is our primary consideration, a fill factor in the order of 0.45 results, depending on the wall thickness.

The storage water is located in the upper basin after introduction, so the following applies:

$$V_{ob} = V_{Sp} \quad (2)$$

The potential energy of the body of water is thus increased by $$\Delta E = g \cdot \rho_w \cdot V_{Sp} \cdot (h_u - h_{ob}) \quad (3)$$

where we use gravitational acceleration g=9.81 [m/s²] and the water density $\rho_w$=1000 [kg/m³]. Strictly speaking, $h_u$ and $h_{ob}$ denote the heights of the centers of gravity of the storage water in the lower basin and the volume $V_{ob}$ in the upper basin, respectively. So as not to dwell on minor matters, the follow calculations use effective values for the geometrical dimensions of the reservoir, which result from the fact that we work with a rectangular cross section in the actual working area (i.e., in the lower basin and in the rise/fall range of the water level).

Then, the rise in the water level simply yields:

$$\text{Rise} = 2 \cdot h_{ob} \quad (4)$$

Now
$A_{ob}$=the area of the actual lake, and
$A_u$=the area of the trench supporting the storage body, and
H=the height of the storage body, which we will assume to be uniform throughout.

Then, from a simple geometric consideration and using Eq(1), we get:

$$V_{ob} = A_{ob} \cdot \text{rise} \quad (5)$$

$$V_{Sp} = F_{fill} \cdot A_u \cdot H \quad (6)$$

Using Eq(2), we then get for the maximum rise in the lake between storage and withdrawal:

$$\text{Rise} = H \cdot F_{fill} \cdot A_u / A_{ob} \quad (7)$$

And for recoverable storage energy, Eq(3) is used to calculate at a turbine efficiency of ηT=0.90 to yield:

$$\Delta E = (g \cdot \rho_w \cdot \eta T) \cdot F_{fill} \cdot A_u \cdot H \cdot [h_u - h_{ob}] \quad (8)$$

Eq(7) and Eq(8) describe the "landscape" cost and economic energy potential of the storage operation. For estimations, it is sufficient to use a calculated value of $F_{fill}$=0.45 for the fill factor. However, in the following we will still derive a determination equation for $F_{fill}$.

The Fill Factor

The fill factor $F_{fill}$, i.e., the proportion of the usable storage volume in the total hole to be excavated for this purpose, is the product of two factors.

$$F_{fill} = x\_V \cdot x\_\text{Pack} \quad (9)$$

The first factor, the wall thickness volume factor x_V, describes the ratio of the inner volume of the hollow sphere, i.e., the storage volume V_Sp available for storage, to the total volume of the hollow sphere Va. The second factor, the packing factor x_Pack, takes into account that hollow spheres cannot be packed arbitrarily close together.

The cavity available for storage purposes, which we will call the "useful pit" or the storage volume, must be embedded in a stable structural envelope and secured against floating. For a spherical structure with usable inner diameter D_i and wall thickness $th_i$, we calculate a usable storage volume of $$V\_Sp = \pi/6 \cdot D\_i^3 \tag{10}$$

and an external "gross" volume of $$V\_a = \pi/6 \cdot (D\_i + 2 \cdot thi)^3 \tag{11}$$

from which the wall thickness volume factor x_V results:

$$x\_V = V\_Sp/V\_a = (1 + 2 \cdot thi/D\_i)^{-3} \tag{12}$$

If we convert Eq(12) to the outside diameter, D_a=D_i+2·thi, we get $x\_V = (1+2 \cdot thi/D\_i)^{-3} = [D\_i/(D\_i+2 \cdot thi)]^{+3} = [(D\_a-2 \cdot thi)/D\_a]^{+3}$, thus:

$$x\_V = [1 - 2 \cdot thi/D\_a]^{+3} \tag{12a}$$

For the wall thickness thi of the sphere, a minimum value results from calculating the strength and stability against the hydrostatic pressure prevailing at the depth. For a sphere with an inner diameter of 30 m and a hydrostatic pressure at 700 m sea depth, a value thi=3 [m] was determined in the StEnSea project (see above). Then, according to Eq(12a), the wall thickness-volume factor for this environment is as follows $$x\_V = 0.579 \text{ in the StEnSea project} \tag{12b}$$

In addition, we must take into account that it is impossible to pack spheres next to each other and on top of one another without empty spaces. We will refer to the ratio of the space occupied by the spheres to the total space of an enclosing cuboid as the packing factor x_Pack. For an infinite crystal in hexagonal close-packing of spheres, the geometry yields the value (see e.g.: /Schmidt 2019/)

$$x\_Pack = 0.74 \tag{13}$$

The product of Eq(12b) and the constant value Eq(13) then yields, according to Eq(9), the fill factor already defined in Eq(1)

$$F_{fill} = x\_V \cdot x\_Pack \tag{9}$$

For the StEnSea sphere, this yields the numerical value of the fill factor as:

$$F_{fill} = 0.43 \text{ for the StEnSea sphere} \tag{14}$$

At lower depths, it is possible to use smaller wall thicknesses thi. Therefore—and because of the uncertainties—we often calculate with a rounded fill factor value:

$$F_{fill} = 0.45 \text{ (calculated value for more general considerations)} \tag{15}$$

However, the positive aspect of higher fill factors with thinner walls is sometimes clouded by the need to use additional ballast to compensate for any resulting buoyancy in the empty hollow sphere. In fact, the next section shows that the StEnSea sphere can actually manage in fresh water without additional ballast.

Buoyancy and Ballast

An interesting characteristic value is obtained if we require the buoyancy of the empty hollow sphere to not be greater than its weight. This requirement is optional, because any resulting lift could also be compensated for by anchoring or ballasting. The buoyancy of the empty sphere is: V_a·g·Rho_W and its weight: (V_a−V_Sp)·g·Rho_concrete, where Rho_W=1000 [kg/m³] and Rho_concrete=2400 [kg/m³] are the densities of water and concrete. If both forces are set equal, we get, by using Eq(12):

$$Rho\_W/Rho\_\text{concrete} = 1/2.4 = (1-V\_Sp/V\_a) = 1 - x\_V$$

and finally for the wall thickness volume factor of the equilibrium between buoyancy and gravity, which we denote by the index "0" as $x\_V_0$:

$$x\_V_0 = 1 - Rho\_W/Rho\_\text{concrete} = (2400-1000)/2400 = 1.4/2.4$$

$$x\_V_0 = 0.5833 \tag{16}$$

As long as the wall thickness volume factor x_V of a hollow concrete sphere, calculated according to Eq(12), remains smaller than $x\_V_0$, the empty sphere will remain at the bottom of the lake on account of its own weight. A comparison with Eq(14) shows that this is precisely the case for the StEnSea sphere in freshwater.

We now wish to apply these relationships by way of example to the Hambach open-pit mine as it is currently planned and, additionally, in a further embodiment with the aim of utilizing storage.

In this regard, we will consider the lower basin as a structure that results from multiple layers of elementary hexagonal-close-packed hollow spheres, while the gaps resulting from the symmetry are used as:

(1.) hydraulic access to the upper lake (and optionally as an inspection shaft)
(2.) or as backfill space to reduce buoyancy The lowest layers and the slope stabilization are conveniently created in dry construction.

Energy Potential Using the Example of the Hambach Trench: Planned Reclamation Lake Currently, according to the entry in Wikipedia /Wikipedia #Hambacher Tagebau/ [Hambach surface mine], a residual lake of 4200 [ha]=42 [km²] surface area and up to 400 m depth is planned for the Hambach open-pit mine. This area can be slightly reduced due to the slope in the region of the level rise in the upper basin (see $V_{ob}$ in FIG. 1), so that we can anticipate vertical boundaries. Therefore, we take as a calculated value:

$$A_{ob} = 40 \text{ km}^2 = 40 \cdot 10^6 \text{ [m}^2\text{]} \tag{21}$$

Our own rough measurement of the Google map of the Hambach open-pit mine yields a deepest bottom, which we will call the "Hambach trench", of $A_u$=4.1 km². This trench may have a depth of 400 m at any point. For the storage structure, we assume a height H of 130 m, which corresponds to approximately four layers of close-packed spheres of 30 m inner diameter. Then, with vertical walls, the average depth $h_u$ of the lower basin is (400−H/2)=335 [m]. In summary:

$$A_u = 4 \cdot 10^6 \text{ [m}^2\text{]} \tag{22}$$

$$H = 130 \text{ [m]} \tag{23}$$

$$h_u = 335 \text{ [m]}. \tag{24}$$

According to Eq(7), with a fill factor of $F_{fill}$=0.45, the rise in the upper basin yields $$\text{rise} = 130 \cdot 0.45 \cdot 1/10 = 5.8 \text{ [m]} \tag{25}$$

and thus an average depth $h_{ob}$ of the upper basin of $$h_{ob} = 2.9 \text{ [m]} \tag{26}$$

From these data and the constants defined above, the (withdrawable) storage energy is calculated according to Eq(8), as follows $$\Delta E = 191 \, [\text{GWh}] \tag{27}$$

Given the future German annual consumption of Q_a=1000 [TWh/a] on which we based our assumptions above for completing the energy transition, which corresponds to an average daily consumption of Q_d=2.74 [TWh/a], the storage capacity according to Eq(27) would correspond to only 7% of daily consumption. This is already almost five times the current total capacity of German PSPP, but, with a somewhat more generous expansion of the open-pit mining site with a view to its future use as the backbone of the energy transition, it will be possible to achieve capacities that are higher by more than one order of magnitude. This is shown by the example in the next section.

Energy Potential: Deep-Dredged and Widened Trench in the Lake

In the next section, we will show that it can be worthwhile to use the existing lignite mining infrastructure to further develop the open-pit mine for the purposes of the PSPP.

The approved operating area for the Hambach open-pit mine is 85 km². The residual lake, which was previously planned at 42 km², could thus well be doubled in size. The geology of the Lower Rhine Bay is characterized by a sedimentary package up to 1300 m thick (/Wikipedia #Tagebau Hambach/ [Hambach surface mine]). The reservoir could therefore be dredged substantially deeper. We do not currently have any detailed planning documentation on the Hambach open-pit mine. We must therefore limit ourselves to estimates and to cautious, rough assumptions.

For our second example calculation, we will make the following choice:

We are setting a substantially greater trench depth of 1000 m—instead of the current depth of 400 m. In addition, we are massively increasing the base area of the trench from the previously planned 4 km² to 20 km², which is approximately half the area that was intended for the planned residual lake.

We are dividing the new total lake into two partial areas. The actual upper basin for the PSPP will comprise only an effective area of the size of the previously planned residual lake, i.e., 40 km². This basin, now only to be used for operational purposes, is hydraulically separated from the total lake by a dam and therefore allows a large rise in its body of water. The area beyond said dam, i.e., the part of the total lake not being used for operating the PSPP, represents the lake for recreational use, which was promised as a reclamation measure, and will be created in the region of the approved operating area. (see below for the method for the phased construction of the large-scale PSPP)

The lower basin consists of eight layers of standard hollow spheres with an internal diameter of 30 m. For this purpose, we will adopt the data from the StEnSea project (see above). Because of the greater depth, the wall thickness is slightly thicker than in the previous chapter and is 3 [m]. This affects the fill factor $F_{fill}$, which we will now set somewhat lower. However, we do not need to worry about the resulting buoyancy of the empty sphere. We calculate the total height H of the basin to be 280 m.

This results in the following parameters for the PSPP:

$$A_{ob} = 40 \, \text{km}^2 = 40 \cdot 10^6 \, [\text{m}^2] \tag{28}$$

$$A_u = 20 \cdot 10^6 \, [\text{m}^2] \tag{29}$$

$$H = 280 \, [\text{m}] \tag{30}$$

$$h_u = 860 \, [\text{m}]. \tag{31}$$

According to Eq(7), with a fill factor now of $F_{fill}$=0.43, the rise in the upper basin is considerable yet still expandable and, because it is bordered by the reclamation lake, is by no means off-putting:

$$\text{Rise} = 60 \, [\text{m}] \tag{32}$$

According to Eq(8), the (withdrawable) storage energy results in $$\Delta E = 4.927 \, [\text{TWh}] \tag{33}$$

For classification: At the outset, we assumed a future average daily consumption in Germany of Q_d=2.74 [TWh/a] and a short-term storage demand of 20 to 30% of this daily demand. A comparison shows that it would be possible to build a PSPP in the Hambach lake with a capacity a whole order of magnitude greater. Theoretically, it would thus be possible to supply the whole of Europe. The excuse often made by opponents of the energy transition—that Germany does not have sufficient geographic resources for short-term storage during the energy transition—is therefore inapplicable. Indeed, it is fundamentally wrong.

Observation: Since—as already mentioned—no planning documents were available, the above figures are to be considered provisional. Cooperation with the operator of the open-pit mine hopefully will arise and more precise specifications are possible. However, this is hardly likely to raise any doubt about the basic statement regarding the enormous short-term storage potential.

Economic Potential Per m³ Usable Cavity

Hambach open-pit mine, the largest and deepest open-pit mine in Germany, already provides a pit that is suitable for the construction of PSPP. In addition to that, however, there is also a highly productive and proven mining installation that can further enlarge, deepen and otherwise shape the pit at very low cost. Previous efforts and models have amounted simply to putting the already existing pit to optimal subsequent use.

But that is only a short jump. The obvious question is whether the existing infrastructure, which has proven successful and is optimal for large-scale earthworks of any kind, as well as the relevant experienced workforce, can be used to expand or adapt the open-pit mine in such a way that it can be developed and converted even more efficiently and on an even larger scale for the new operating purpose of a "pumped-storage power plant".

The goal here is twofold: The trench in which the hollow sphere storage tanks are to be embedded can be
 deepened to allow higher operating pressures and thus better utilization of the cavity volume and/or
 widened in order to achieve an even greater number of efficiently operating hollow sphere storage tanks and thus an increase in capacity The key technical and economic argument in this regard is the low additional cost of constructing an additional pit on the floor of the open-pit mine. Since we have not found a handy publicly available citation for this, we will first present a somewhat rough estimate of our own before drawing far-reaching conclusions from the low value obtained of just under 20 [€/m³] per free hollow volume at the working depth.

What is the Cost of Producing a 1 m³ Pit at a Great Depth H in an Open-Pit Lignite Mine?

In the brochure published by Greenpeace, "WAS BRAUNKOHLESTROM WIRKLICH KOSTET" [THE TRUE COST OF LIGNITE-BASED ENERGY] (/Greenpeace 2018/), the market price for lignite is estimated at €13.8/t based on the 2016 financial statements of LEAG (formerly Vattenfall Europe Mining). With a lignite density of $\rho\_BK=1250$ [kg/m³]—incidentally, there are also smaller values in the literature—this results in a lignite volume price of approximately: 17.5 [€/m³]. According to Wikipedia /Wikipedia #Braunkohle/ [Lignite], open-pit lignite mining yields a volume ratio of overburden to coal of about 6.2 to 1. Unfortunately, in the same article, the same value is also given as the ratio of the output and overburden quantities in [t]. We will therefore choose a round calculation value for the "pit factor", which indicates the ratio of the total pit from coal+overburden to the pure coal volume $$\text{Pit factor}=6 \tag{41}$$

Thus, the extraction of 1 m³ of lignite produces a total pit of 6 m³. Unfortunately, we do not know exactly where contributions to this total pit are made in every area of the open-pit mine, because the waste rock occurs not only in the immediate vicinity of the extracted product, but also in higher overburden layers, the removal of which is what makes access to the lignite possible in the first place. In underground hard coal mining, in which waste rock but no higher access overburden accumulates, it can be assumed that tailings account for approximately 50% of the raw run-of-mine coal (/Reuther 2010/, Image 351, top component image). Based on this value, we can assume as a calculated value that for each m³ of lignite, approximately 1 m³ of waste rock is additionally extracted from the same depth. A gross pit of 2 m³ is thus created at the same depth, and we therefore set $$\text{Waste rock factor}=2 \tag{42}$$

It has been shown above that a fill factor of approximately 0.45 can be expected for hexagonal close-packing of spheres. At a value of ½, the fill factor would exactly offset the effect of the waste rock factor above, Eq(42). Given that the estimate of the waste rock factor is a rough estimate, we can therefore make a clear statement.

Interim conclusion: Active lignite mining produces—according to our rough estimate—for each cubic meter of lignite:
- an access hole of approximately 4 m³ in the upper portion.
- a pit of approximately 2 m³ at the depth of the open-pit mine, which gives a useful pit of 1 m³ that can be used directly as storage volume.

After these considerations, we can answer the question about the cost of a storage pit.

Conclusion: A useful pit that can be used directly as storage volume costs in the region of 17.5 [€/m³], rounded up to approximately 20 [€/m³]. Therefore: Compared to the specific volume construction costs of €225 per m³ of concrete used (!) stated above for the StEnSea project, the costs for creating the useful pit are hardly significant.

However, if producing the storage pit is so relatively inexpensive, then it might even be attractive to dig deeper for storage extraction alone, even without lignite production. Therefore, we must ask ourselves the question: Is it even worthwhile to build directly on the bottom?

Let us consider a 100 m high lower basin constructed from standard hollow spheres as per the StEnSea project (see above) and built on the current bottom of the trench at a depth of 400 m. For the useful volume V_Sp, an external volume V_a is used according to Eq(12) where $$V\_a=V\_Sp/x\_V, \text{ where } x\_V=0.579 \tag{43}$$

The unit price of €225/m³ given on the concrete volume (V_a−V_Sp) can be converted to a reference to the storage volume V_Sp using a factor that depends only on x_V. The pure construction costs K_400 for the lower basin per m³ then result in $$K\_400=(V\_a-V\_Sp)\cdot 225[€]$$

$$K\_400=V\_Sp\cdot[(1-x\_V)/x\_V]\cdot 225[€] \tag{44}$$

where for the "StEnSea sphere" the following applies: $[(1-x\_V)/x\_V]=0.728$

We now theoretically sink the lower basin downward by 100 m. This construction measure incurs only the above-mentioned additional costs of around €20 per m³ of the storage volume V_Sp. Thus, for a structure at greater depth, we obtain the cost K_500 as follows $$K\_500=V\_Sp\cdot([(1-x\_V)/x\_V]\cdot 225+20)[€] \tag{45}$$

This increases the construction cost of the "buried" lower basin by the following factor:

$$K\_500/K\_400=(225\cdot[(1-x\_V)/x\_V]+20)/(225\cdot[(1-x\_V)/x\_V]) \tag{46}$$

$$K\_500/K\_400=1+(20/225)\cdot[x\_V/(1-x\_V)]=1.12 \tag{46a}$$

thus by only 12%. At the same time, according to Eq(6), the storage content increases by a factor of $$x\_h=[h_u+100-h_{ob}]/[h_u-h_{ob}]=\text{approx. } 450/350=1.29 \tag{47}$$

thus by 29%. Burying the lower basin can therefore pay off significantly.

It could now be argued that the spheres located higher up could be built with thinner walls. This is correct in principle and would, when using Barlow's formula, which can actually only be used for thin-walled spheres, result in a proportionality of the required wall thickness with the pressure. However, additional ballast would then have to be used for buoyancy safety. Moreover—and this is the key argument—the unit price of €225/m³ primarily comprises the costs for the formwork and associated costs, and not much could be saved in this area. If, for example, a fixed amount of €125 for the formwork etc. is deducted from the unit price and the concrete costs are reduced by a factor of 1/x_h, this results in a consideration analogous to Eq(46), while maintaining the costs K_500:

$$K\_500/K\_400=(225/0.728+20)/((125+100/x\_h)/0.728)=1.18$$

The 29% increase in storage capacity is therefore offset by an 18% increase in costs. This remains attractive, although no costs have yet been applied for the additional ballast.

Conclusion: It may therefore be worthwhile to dig even deeper at the depth already reached using existing extraction equipment and to exploit new, deeper storage volumes.

Energy Potential Per m³

In the following, we will compare the cumulative electrical withdrawal current from 1 m³ storage volume with the singular amount of electricity that would be generated from the quantity of lignite mined at the same effort and cost.

In the previous section, we concluded that a useful pit that can be used directly as storage volume at the mining depth costs in the region of 17.5 [€/m³]. This section likewise demonstrated that the estimated lignite extraction price is €13.8/t, which corresponds to a volume price of 17.5 [€/m³]. Producing one m³ of lignite and one m³ of useful pit thus costs roughly the same in open-pit mining. The calculations above use a lignite density of $\rho\_BK=1250$ [kg/m³] and there are therefore 1.25 tons of lignite in one m³ of lignite.

For a modern lignite-fired power plant, the specific fuel input is given as 0.9 [kg/kWh] (/Wikipedia #KraftwerkNiederaußem/ [Niederaussem Power Station]), which corresponds to a volume-related input of 0.72 [m³/MWh]. Therefore: A storage pit (=useful pit) of 1 m³ costs as much as 1 m³ of lignite; this lignite produces 1.39 [MWh/m³] in a modern power plant.

At a depth of 500 [m] and a turbine efficiency of 90%, a storage well yields 1.24 kWh/m³$_{\_hollow}$.

Conclusion: The storage pit would therefore have to withdraw 1120 cycles of electricity until it reached the combustion energy produced by a singular instance of lignite mining. Depending on the number of annual full-load cycles, this should be achieved in five to ten years.

Further Embodiments and Details on Construction and Design

In the following, some additional embodiments and details on the construction and design of the storage facility according to the present disclosure are provided, with the numbering started above being continued.

(6.) Widening the Constrictions

Figure 6:
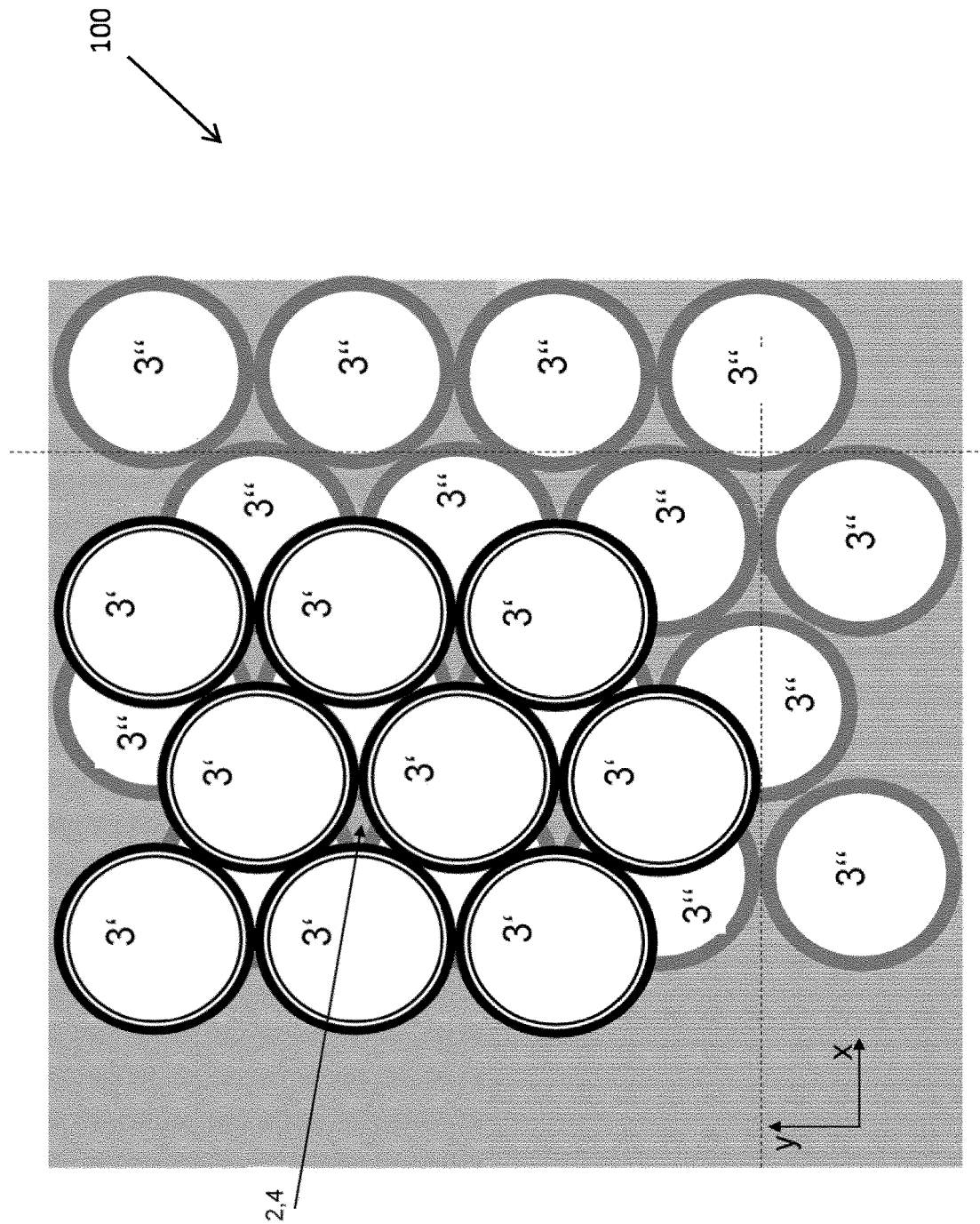
FIG. 6 is an enlarged detail from FIG. 4, showing a top view of a small section of the top layer and a slightly larger section of the second layer from the top.

FIG. 6 shows a detail from FIG. 4 with the top layer of pressure vessels 3' and the second from top layer 3".

The shape and size of the bottleneck is relevant: In a preferred embodiment, the horizontal great circles of adjacent spheres abut at six points in each sphere level. If we consider a specific sphere (see FIG. 6), at each of these points of contact with the neighboring spheres we obtain a free equilateral triangle the sides of which are segments of circles. Looking at the successive triangles of this type along a horizontal line in the x- or y-direction, we see that they exist in two orientations A and B, which are mirror-symmetrical with respect to the straight lines.

In hexagonal close-packing of spheres, the individual sphere levels are identical, but neighboring sphere layers are offset from one another and only the next but one sphere levels are again congruent on top of one another. Looking now at the overlap of the triangles of the lower layer with the great circles of the upper layer, we can see that half of the lower triangles lie completely below an upper sphere and the other half of the lower triangles lie below a triangle of the upper layer, whereas the triangles lying on top of one another are of different orientation, i.e., above a lower triangle of orientation "A", a triangle of orientation "B" lies in the upper level, and so on:

A largest possible circle can be inscribed in every equilateral triangle. These circles do not change when mirrored, which means that, for reasons of symmetry, all triangles lying on top of one another always have the same circle at the same place despite their two different orientations. These circles can be theoretically expanded to become a virtual vertical pipe, resulting in a completely free vertical "clear" connection through the entire sphere arrangement. Through this virtual "bottleneck pipe" 4 one could, for example, lower an object (e.g., a not too large turbine) freely down to the ground on a rope.

Since the triangles assume only two fixed orientations, the actual "clear" space through the sphere arrangement is even slightly larger and "frayed" into a rhombus, as can be seen in FIG. 6.

The "clear" rhombus is available to act as a transport limitation in the case of strictly vertical movement. But, if we nevertheless allow a small horizontal movement or rotation before the constrictions, it is possible to transport any object through the sphere arrangement if said object fits through the clear triangles of the individual sphere levels. It can already be seen from FIG. 6 that with an inner sphere diameter of 30 m, objects with dimensions of 4 to 5 m still fit through.

If bottleneck cross sections need to be widened without making any changes to the spherical shell, this can be achieved during embedding by adding a spacer layer of filler material between the spheres, which layer can then be removed again locally at the critical bottleneck locations.

However, there are other ways to slightly widen the bottleneck:
- Locally flattening the spheres at the bottleneck, which is structurally compensated for by reinforcing the concrete at this point (e.g., by means of armoring, metal plates or metal rings).
- Using cavity spheres of a second type, which have a smaller diameter than the standard spheres.
- Omitting selected spheres so that a winding shaft with the desired cross section can be constructed in the empty space initially kept free in this way. The non-functional space can then be backfilled as the installation of the spheres progresses.

In addition, there is also a "software" alternative for preventing excessive flow velocities in a bottleneck. After all, it is not necessary to operate at full load and simultaneously all the pump turbines that have a common, bottleneck-limited access point to the upper water reservoir; rather, the required water flows can be distributed as evenly as possible to all access points.

(7.) Pump Turbine Accessibility

Figure 7:
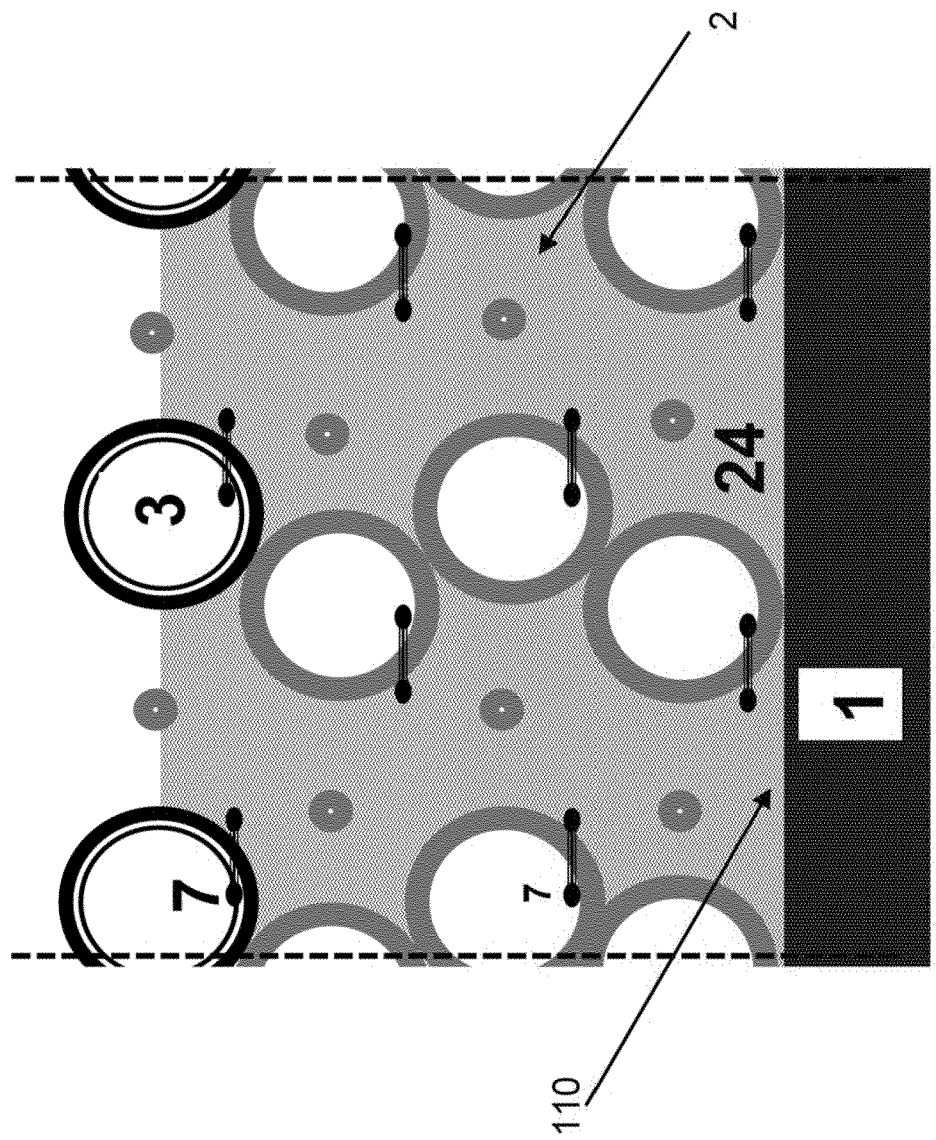
FIG. 7 shows a schematic cross section of an open-pit mine, e.g., the Hambach trench, with pump turbines 7 installed directly in the cavity spheres, with sufficient access to the lake water being ensured by the free space 24 between the spheres 3.

The pump turbines should preferably remain accessible for maintenance or replacement via a sufficiently large free channel. This can be done, depending on the concept used for fitting the pump turbines (see point (2): autarkic, oligotarkic or centralized), e.g., using the following two concepts:

- The pump turbines 7 are installed laterally at the bottom of the spheres at the lowest points thereof and use a vertical shaft 24 that is open at the top as a dry well (FIG. 7). (Autarkic, in some cases also small oligotarkic PT).
- Groups of spheres are connected via pressure lines 6 to a larger pump turbine 77 responsible for the entire group (oligotarkic/centralized pump turbine). These pressure lines can lead directly from the sphere via an external independent manifold 6 (FIG. 8a), although it is also possible to group a plurality of spheres together in series via short connecting lines from sphere to sphere (i.e., between adjacent spheres) and then connect, e.g., the lowest sphere of a series to the pump turbine (FIG. 8b). Note that FIG. 8a and FIG. 8b combine different elements for supplying a pump turbine.

Of course, other variations for assigning storage elements and oligotarkic pump turbines are possible, an example of a comprehensive summary being shown in FIG. 9a. Similarly, of course, this can be also done via direct sphere-to-sphere connection, as shown in FIG. 9b. Other mixed forms are also possible.

In general, it may therefore be suitable for the pressure vessels 3 to be arranged at regular intervals in layers side by side and/or one above the other in the dry ground depression 100 (e.g., in hexagonal close-packing of spheres), with free spaces 2 remaining between the pressure vessels 3 (at least some of which remain as non-filled-in free space 24), preferably extending in some places through all layers (clear channels 4) from the top to the subsurface 110. In this context, a pressure vessel 3 can, e.g., be equipped with an independent turbine 7, pump 7 and/or pump turbine 7, which can, e.g., be installed in the pressure vessel 3, e.g., at the bottom and/or at the side. Alternatively or additionally, pressure vessel groups can be provided which comprise two or more pressure vessels 3 interconnected via pressure lines 6, 61 and equipped with a common turbine 77, common pump 77 and/or common pump turbine 77. In this case, directly adjacent pressure vessels 3 can be connected via a direct pressure line 61 (short connecting pipe from sphere to sphere). Furthermore, bunkers with a common turbine, pump and/or pump turbine 77 can be constructed on or in the subsurface 110 and pressure lines 61, 6 from the storage spheres 3 can be laid there.

(8.) Embedding and Securing Against Buoyancy (8a) A first layer of the basic storage cells (i.e., the hollow spheres) can be placed in close-packing on the bottom of the trench—when still in the dry state.

(8aa) For stabilization and to safeguard against buoyancy, these elements can then be embedded and/or "slurried" with sand, gravel or stones—whatever is available on site.

Preferably, this is initially done only up to the height at which a second layer of hollow spheres can be placed. This embedding allows the hollow spheres to be weighted and firmly attached.

(8b) A second layer of spheres can be placed in the troughs between the spheres of the lowest and already partially embedded layer in a correspondingly offset manner. In the process, pipes (in some cases flexible pipes) can be used to keep the inflow and outflow paths to the pump turbines clear in the lowest layer. In accordance with step (8aa), the hollow spheres and pipes can now be embedded using ballast.

(8c) In the same way as in step (8b), further layers of hollow spheres can be laid and embedded.

(8d) If it is desired to lay additional spheres above the top level of the trench, these hollow spheres can be given their own buoyancy control; e.g., either by their own weight (shell thickness) or additional ballast.

Embedding the spheres also serves, among other things, to distribute the pressure when the hollow spheres are stacked. Since the spheres are embedded in the (delimited) trench, it is possible to use ordinary sand. The walls of the trench prevent the sand from drifting away.

(9.) Generator Operation During Filling (e.g., of the Hambach Lake)

During the filling of an open-pit mine (e.g., the Hambach open-pit mine) to create a lake, which may take many years, some of the pump turbines can be used as electricity generators. For example, the inflow water coming from the Rhine (or elsewhere) can be fed into the turbines. The outflow from the hollow sphere can be, for example, through an independent discharge nozzle, which is then closed again at a later time. Alternatively, one (or many) oligotarkic unit cells can be used and the inlet can be arranged in a first basic storage cell and the outlet in a second basic storage cell.

(10.) Use of the Existing Infrastructure of the Open-Pit Mine:

For earthworks, it is preferable to have available the existing large-caliber machines of the lignite open-pit mine being phased out. These can be used for excavating the trench, creating further tiers in the lake bottom, rearrangements in the eventual lake bed and for filling the cavities between the spheres.

(11.) Widening of the Trench, Steepness

Using the preferably available large-caliber machines (see (10.)), toward the end of open-pit mining and even before the lake is filled, the base area of the open-pit mine, e.g., the Hambach trench, can also be expanded. Some of these construction measures can be associated with further lignite mining. However, they should also be carried out with the independent objective of "preparing the largest possible storage trench".

The entire trench can be covered with storage spheres as far as its edge and filled with excavated material in partial areas during the course of this installation. This reinforces the slope against any kind of sliding—even after filling the lake with water.

During the construction phase, the spheres can also be used to construct provisional support structures in places. This allows the trench wall to have an unusually steep shape in the final stage.

Alternative Considerations

Limitation of the Storage Rise in the Upper Basin

According to current plans, the Hambach lake will become the second largest lake in Germany in terms of volume after Lake Constance. However, the potential of the PSPP is so great that it could result in a significant water level rise at the lake surface. To reduce this, the following can be contemplated:

(12.) Entire Lake District as the Upper Basin

By incorporating neighboring open-pit mines, a hydraulically connected lake district can be created so that the water level of the lake district can be lowered or raised collectively. Sluice gates or controllable gate valves can be used to adjust the storage rise of the various lakes to different levels, allowing each lake to be used for different means or to allow for small differences in the levels of the different lakes.

(13.) the Rhine as a Further Upper Basin

The Rhine is approximately 40 m above sea level and thus about 60 [m] below the level of the fully filled Hambach lake according to current plans. The depth of the lake-egg installation in the Hambach trench of 400 m (at present) is thus still 340 m below the Rhine. Using water from the Rhine to fill the Hambach lake has already been proposed. If a large tunnel were to be built to the Rhine at the same time as reducing the area of the Hambach lake and lowering it by approximately 60 m, the Hambach lake and the Rhine would be permanently hydraulically connected and the two could jointly serve as the upper basin of the PSPP.

A strong hydraulic connection between the two receiving waters would buffer the level fluctuations, such that the level swings in the Hambach lake could be smaller or would at least not have to be extremely low for a long period of time.

However, if the whole potential of the Hambach trench were to be served by a Rhine tunnel, the cross sections of said tunnel would have to be exceptionally large. Note that only a comparatively small cross section is needed to fill the Hambach lake, which is expected to take years or even a decade.

"Mining" Access to PT Stations by Means of Supply Routes 67

It is often helpful to approach a problem from a completely different angle. Let us now ask ourselves: Can access to the pump turbines be accomplished from the side instead of from the top?

Figure 10:
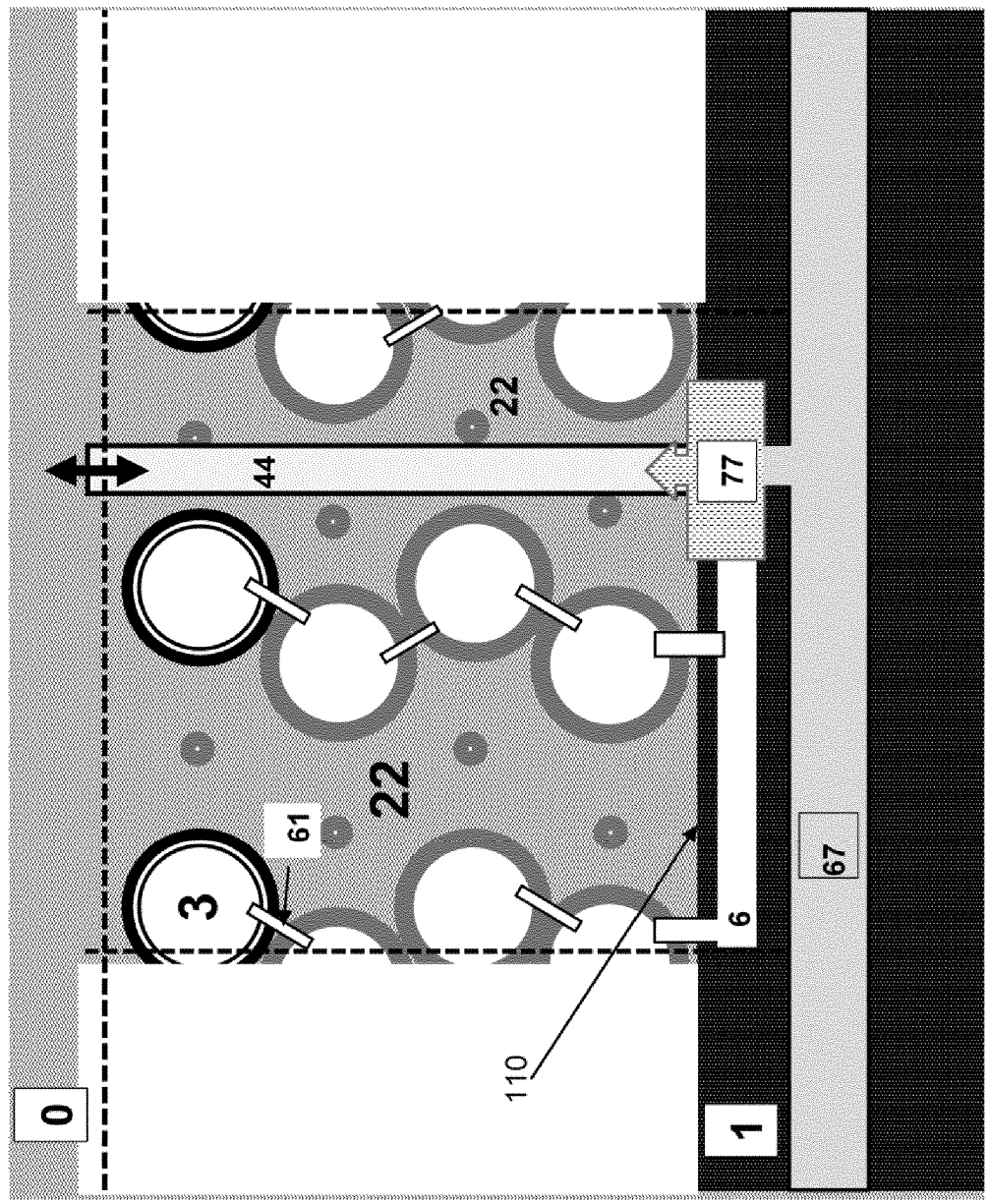
FIG. 10 shows a schematic cross section of an open-pit mine, in which the storage facility has at least one connecting pipe 44 between free reservoir 0 and the PT station 77 and is otherwise fully embedded, i.e., the space shown as free access space 24 in the previous figures is now also filled in, such that the reservoir is accessed through the pipeline 44 which is open at the top. Maintenance and possible replacement of the pump turbine can be carried out—as in a mine—via a route 67 laid in the lake bottom, which route can be connected to a central supply and personnel shaft 5 (see FIG. 11).
Figure 11:
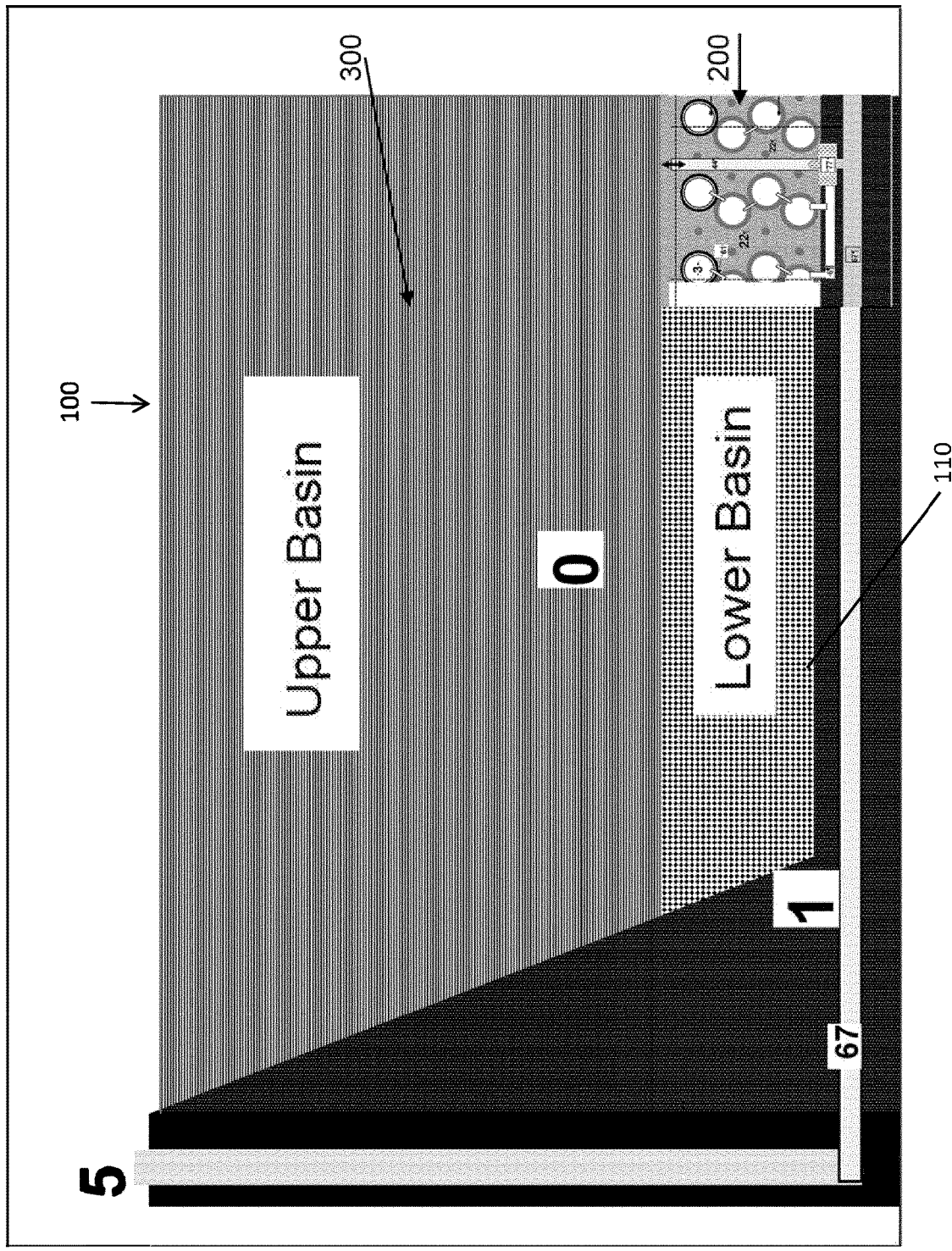
FIG. 11 shows a schematic cross section of an open-pit mine having a drivable route 67 that extends in the lake bottom 1 and is connected to a supply and personnel shaft 5, it also being possible for said route to extend as a drivable and watertight tunneled mountain road on the slope of the lake and to be constructed in dry conditions prior to the lake being flooded.

The lake bottom 1 is initially dry, freely accessible and can be worked using large and heavy equipment. Referring to FIG. 10, we can thus make the PT bunkers accessible by means of a suitable route network 67 and optionally also sink a deep shaft 5 down to the eventual bottom of the lake (cf. FIG. 11). A pipe 44 can then be provided from a PT station 77 to the open lake 0, which pipe serves to transport water, but no longer necessarily has to be used as access for maintenance and repair. Generally, a connecting pipe or a gap 2 designed as a shaft 44 can be provided between the common pump/turbine/pump turbine 77 and the open lake 0. Thereafter, once the lake is flooded, this will then function like a mining access to stations at the lake bottom: The routes contain the power lines and access for material and personnel and are connected to the outside world—as in a mine—via one (or multiple) shafts 5 (FIG. 11). In particular, a drivable route 67 can be provided that extends in the lake bottom 1 and connects the PT stations 77 to a central supply and/or personnel shaft 5.

The shaft 5 provides an external connection to one or more routes 67 and can, in addition to a supply and personnel shaft, also be realized by a steep but still drivable tunnel. Instead of a shaft 5, access to the route network 67 can also be provided as a drivable and watertight tunneled mountain road on the slope of the lake and constructed in dry conditions prior to the lake being flooded. It can then also be used during the construction of the PSPP plant.

Subsequent Expansion "In Situ" by Autarkic Storage Elements 30

Figure 12:
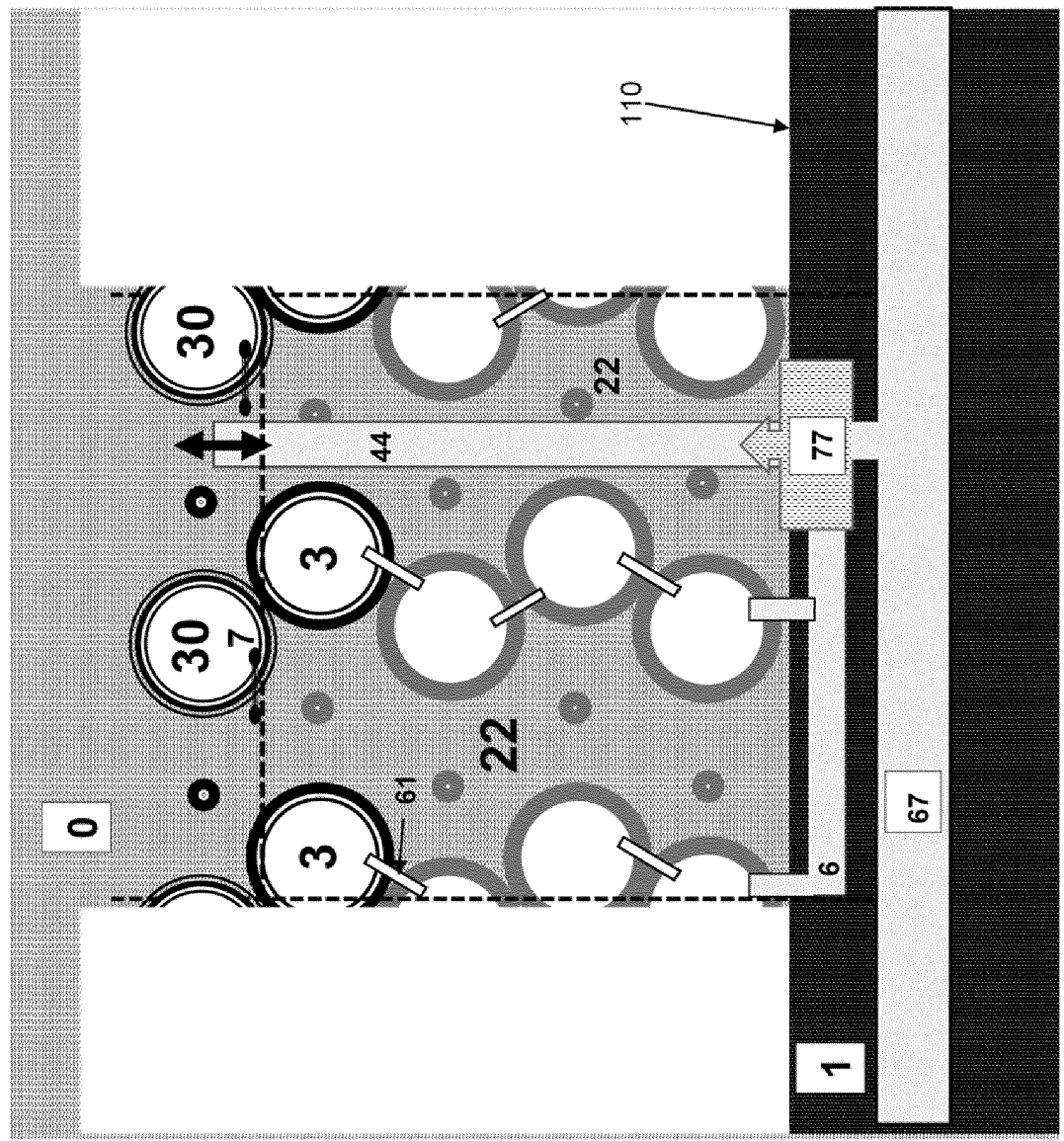
FIG. 12 shows a schematic cross section of an open-pit mine having an operating storage facility from FIG. 10 and subsequently installed autarkic storage spheres ("in situ" installation).

Assume that a PSPP plant, e.g., as shown in FIG. 10, is already in operation and, now that the lake has been filled, is to be expanded. This can be accomplished by lowering further pressure vessels 30 onto the pressure vessels 3 already located on the subsurface. In particular, autarkic pressure vessels 30 (hollow spheres) can be placed on top of the existing system in the already existing troughs ("epitaxially" so to speak) (FIG. 12). In terms of electrics the autarkic storage elements can first be grouped together at the top of the lower basin and led down to the route 67 at one or more locations, for example by sharing connecting pipes 44 in the existing system. It is advisable to prepare the electrical connection to the route 67, or even to establish it, as early as during the "dry" installation of the storage facility.

Method for the Phased Construction of the Large-Scale PSPP

Germany's largest open-pit lignite mine would have the potential to hold more than 10,000 cavity storage tanks as a lower basin for a combined large-scale PSPP. It may not be desirable to wait a long time until the open-pit mine is completed, then install the substructure and all the cavity spheres, then fill the lake, and then only after many years put the PSPP into operation.

However, a sophisticated method exists for constructing some of the facilities earlier, testing them extensively, expanding them section by section and, optionally, putting them into operation before coal production ceases. For a project of such large size, this slow process, which can be perfected through experience and technical improvements, may be desirable.

Figure 13:
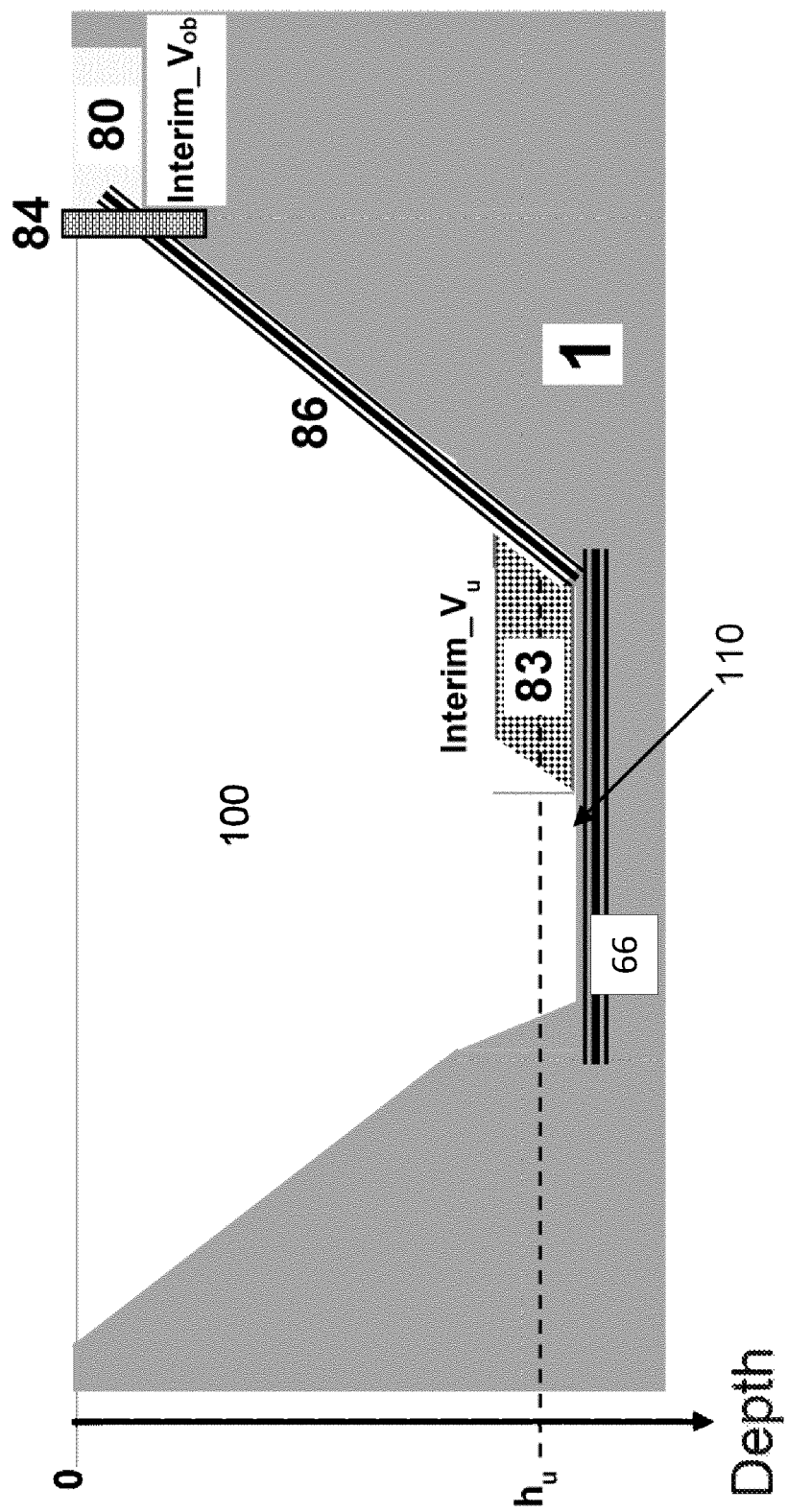
FIG. 13 is a schematic representation of an open-pit mine in interim operation having an only partially constructed lake-egg lower basin 83 comprising oligotarkic pump turbines and a pipe connection 86 to the interim upper basin 80 at the eventual lakeside promenade, the interim upper basin being sealed off from the eventual operational lake by a dam wall 84.
Figure 14:
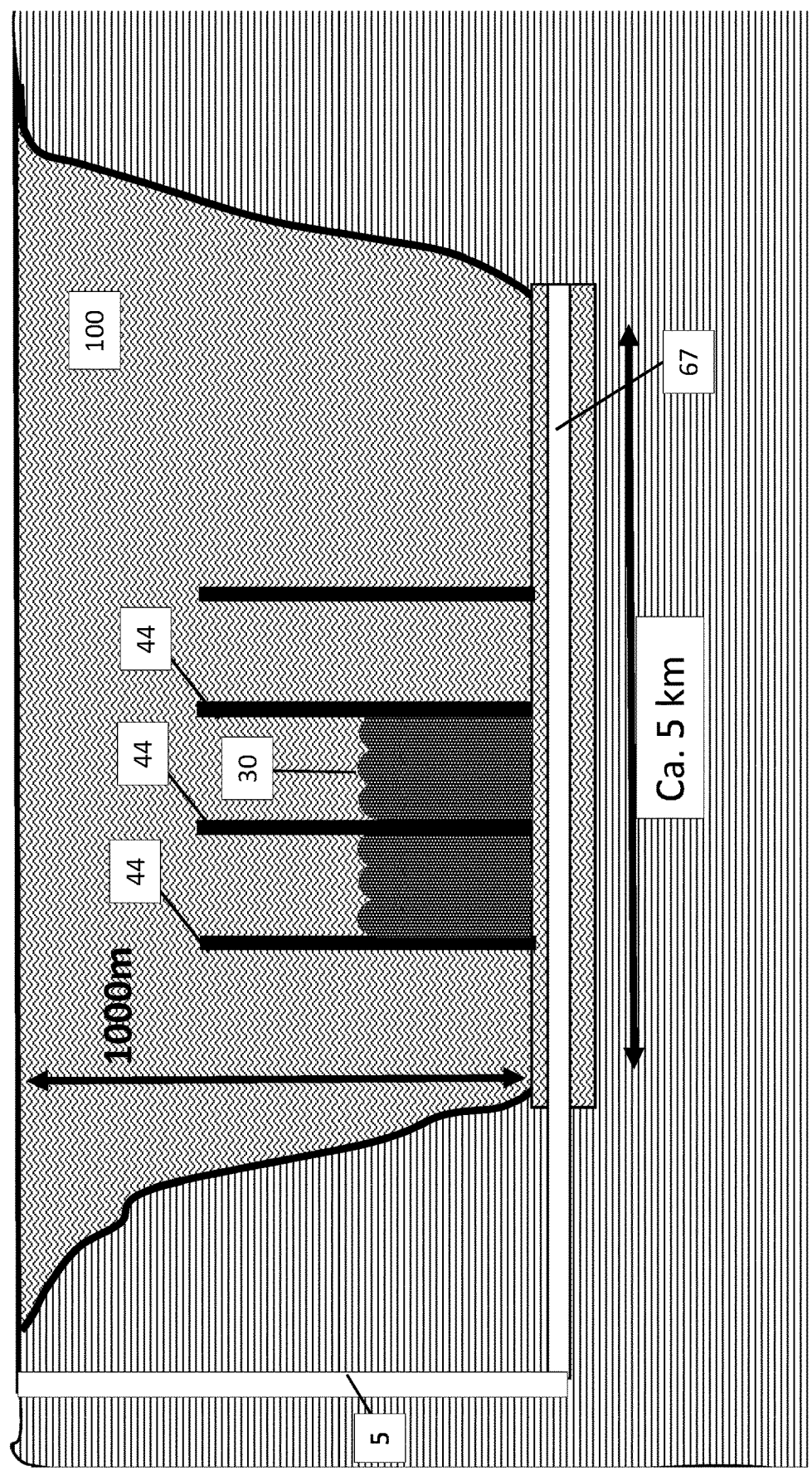
FIG. 14 is a schematic representation of an open-pit mine having an underwater pumped-storage power plant according to a further embodiment.

The simple basic concept to be exploited here is as follows: The complex, pressure-resistant lower basin with its built-in pump turbines does not necessarily have to be operated with the entire body of water of the reclamation lake that is envisaged later as the upper basin. Essentially, any other available basin, large or small, at the top of the open-pit mine can be used for this purpose, provided only that the hydraulic connection intrinsically provided by the lake at a later point in time is replaced by preliminary penstocks 86 (FIG. 13).

A procedure having one or more of the following process steps may be considered, for example.

1. In particular, in the littoral zone of the eventual lake (e.g., the Hambach lake), an interim upper basin 80 is constructed, which is separated from the current open pit by a dam 84 (dam wall, basin wall).

2. For example, only a small part of the already exploited trench (partially constructed lake-egg lower basin 83) is initially built on and then, optionally, advanced further afterwards. In other words, for the interim solution, the already arranged pressure vessels 3 are connected via a penstock 86 to a vessel 80 or basin 80 that forms a preliminary upper reservoir and is separated from the ground depression 100. Thus, in particular, a penstock is established as a hydraulic connection between the interim upper basin and the already arranged pressure vessels 3, i.e., the first construction sections of the lake-egg lower basin. For example, the "clear geometric bottleneck shaft 4" in the "surplus-water access space 24" can be replaced by an internal penstock and connected to an interim penstock 86, which extends as far as the aforementioned interim upper basin (see 1.). For example, a unit consisting of a plurality of hydraulically coupled cavity spheres with an oligotarkic pump turbine can be created, but it is also possible to connect only a single autarkic sphere with a built-in pump turbine to such an interim penstock for testing purposes.

3. The interim upper basin 80 can be dimensioned so as to accommodate the storage water from the initially planned lower basins, but it can also be expanded as they continue to be added. While the open-pit mine is still active, the interim PSPP created in this way can not only be tested but can also already be operated commercially ("interim operation").

4. Once coal mining has been phased out and the open pit has developed its final shape, the further lower basins can be built, or pressure vessels arranged, in the entire planning area. The ground depression can then be filled to form an artificial lake that will replace the preliminary one as the final upper reservoir. During the filling period, the part of the lower basin already connected to the interim upper basin can continue to be operated as before.

5. When the whole lake is filled with water, the interim pipe connection 86 can be detached. The part of the lower basin previously allocated to the interim PSPP can then be used according to the present disclosure as a "lake-egg" in the same way as the later installations.

6. The interim upper basin 80, which is indeed separated from the actual "operational lake" by the dam 84, can, for example, be used (subsequently) as a reclamation lake for recreational activities and the like (recreational lake). For example, as with an "infinity pool", it would be possible to row (or swim) up to the dam wall and take a look at the operational lake.

7. The operational lake, which corresponds to what was previously referred to as the upper basin or open lake water 0, can now be operated substantially from a technical perspective due to the hydraulic and access separation from the reclamation lake (the former interim upper basin 80), and can have, for example, an unusually large level rise.

Depending on the size and seasonal variation in use of the interim upper basin, it could of course also be used for a modest and controlled drawdown. After all, people also go swimming in the North Sea despite the ebb and flow of the tide.

Figure 19:
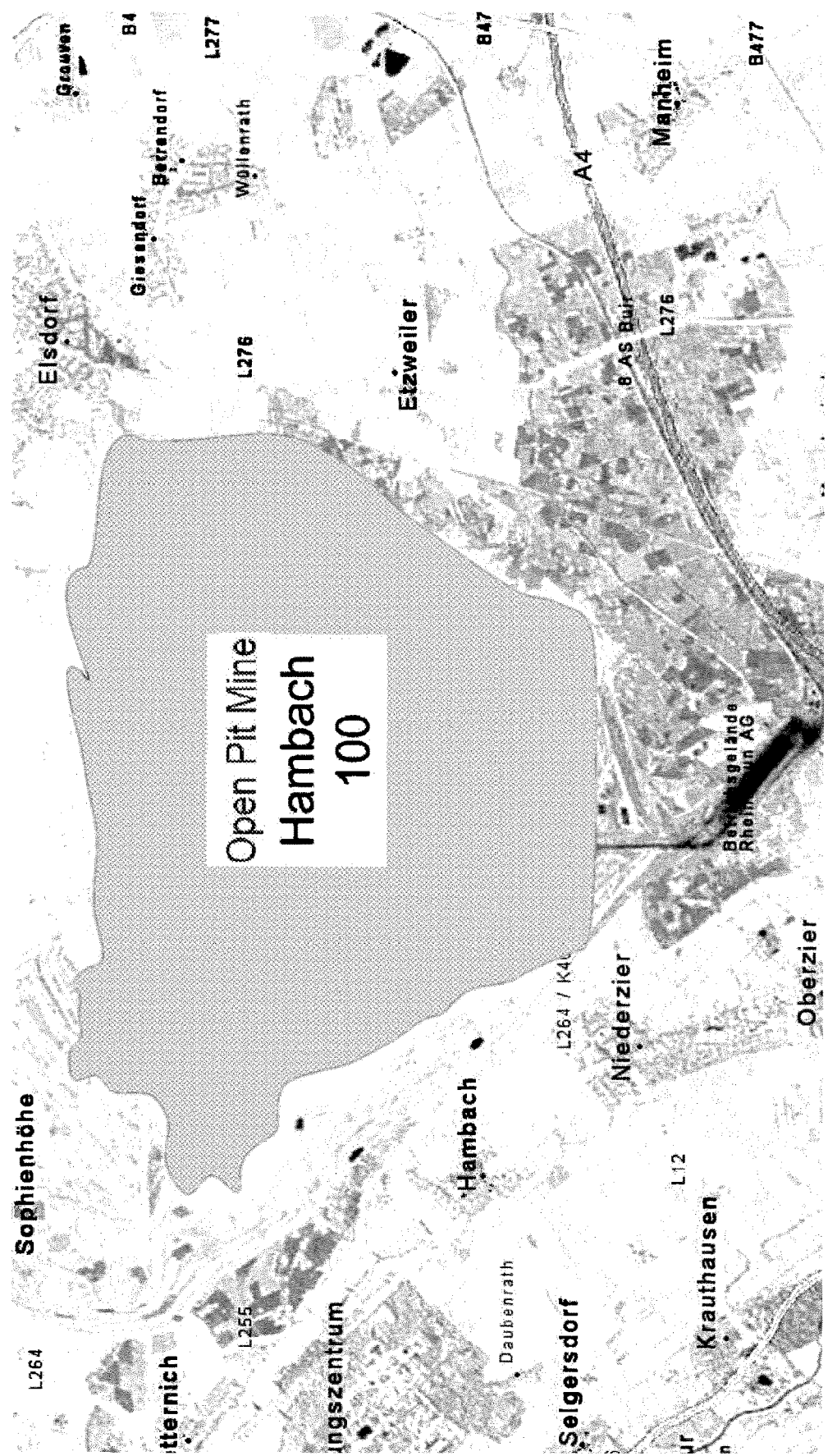
FIG. 19 is a map of the Hambach open-pit mine in the dry state.

FIGS. 19 to 22 again show various stages in the construction of an underwater PSPP in a ground depression 100, in this case the Hambach open-pit mine. FIG. 19 shows the Hambach open-pit mine 100 in the dry state before construction of the PSPP has started.

Figure 20:
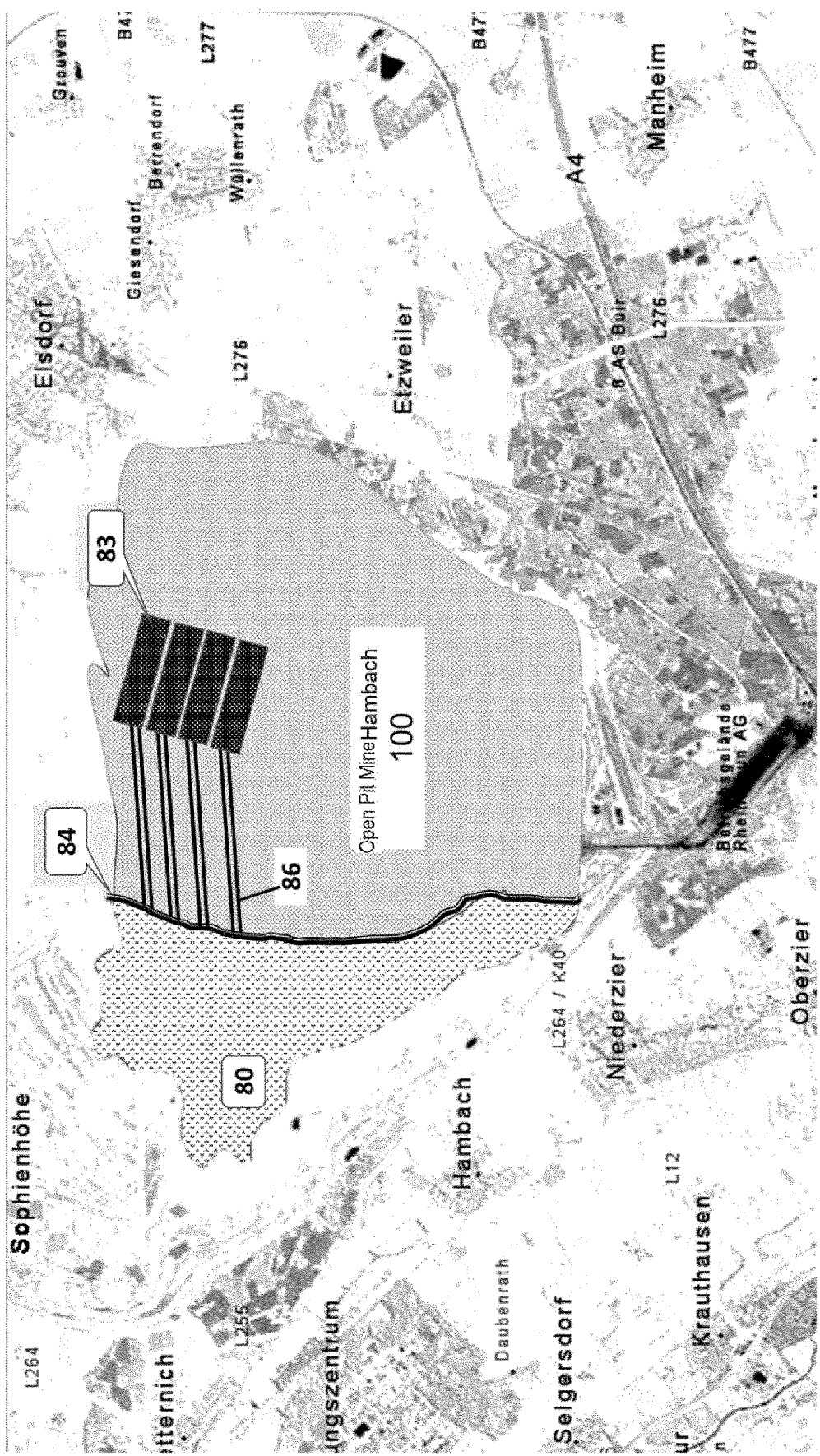
FIG. 20 is a map of the Hambach open-pit mine with a dam in interim operation.

In FIG. 20, a lower reservoir 83 (containing hollow bodies) has been constructed in at least part of the ground depression 100 and is connected to a preliminary upper reservoir 80 (interim lake/assembly lake) via penstocks 86 (pipe connections during assembly). The preliminary upper reservoir 80, which is higher than the lower reservoir 83, is also located in the ground depression 100, in particular at the edge of the ground depression 100, and is separated from the rest of the open-pit mine by a boundary 84 (dam/separating dam/basin wall). For cost reasons it may be desirable for the interim lake 80 as well as the dam 84 to be relatively low. Preferably, the dam 84 can be constructed on a ground-depression contour line through the ground depression 100 (in this case, the Hambach pit) so that it is securely based thereon. In FIG. 20, the dam 84 is constructed approximately on a terrace of the open-pit mine; this allows the interim lake 80 to have a concave shape that is desirable from a pressure perspective and blends nicely with the landscape. At the stage shown in FIG. 20, the already partially constructed lower reservoir 83 can already be used and/or tested to gain experience for the further construction of the lower reservoir 83. In the process, the preliminary upper reservoir 80 will experience a level swing.

Figure 21:
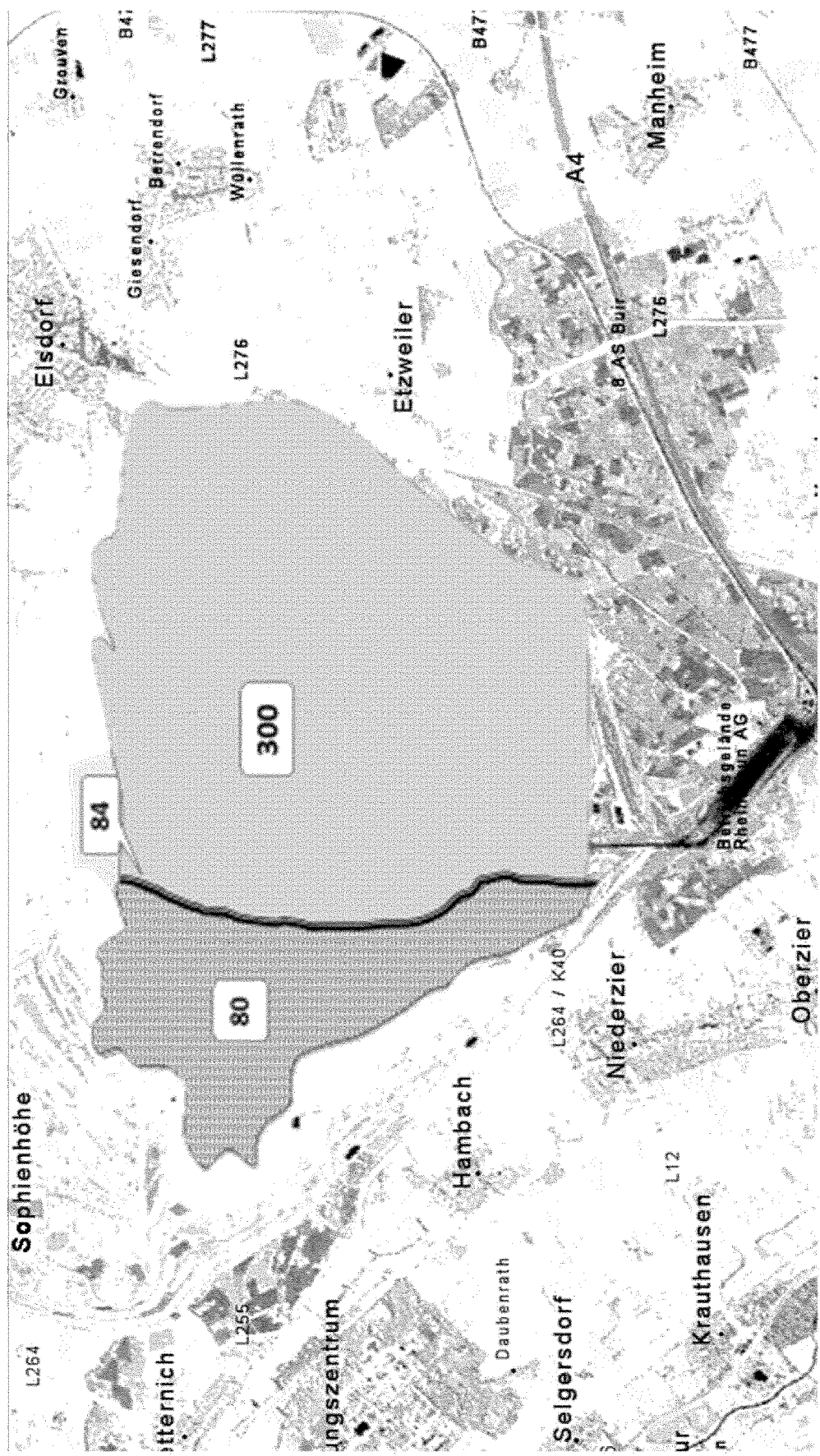
FIG. 21 is a map of the Hambach open-pit mine with a dam after flooding.
Figure 22:
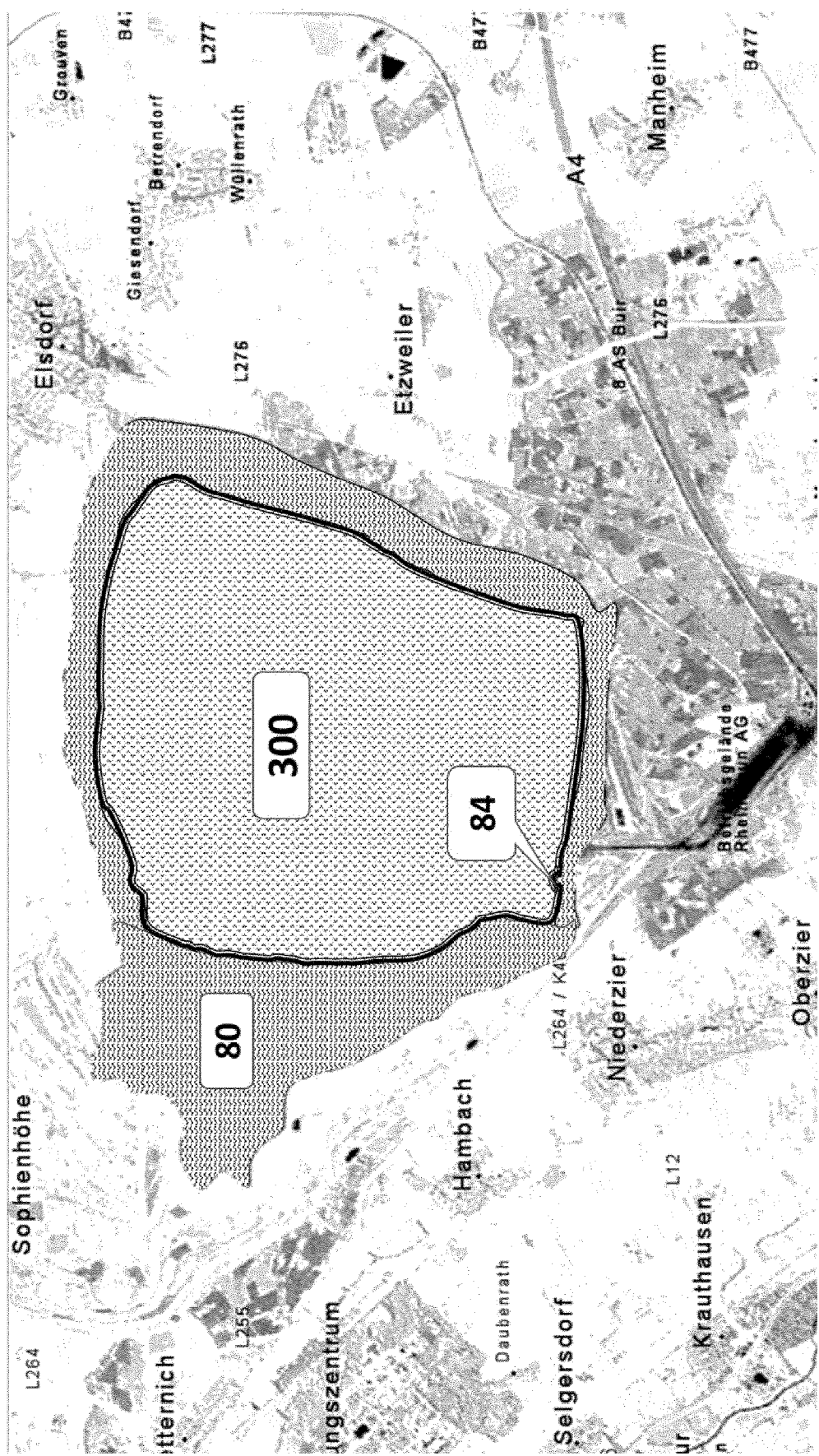
FIG. 22 is another map of the Hambach open-pit mine with a dam after flooding.

Referring to FIG. 21, once the lower reservoir is completed, the ground depression 100 can be flooded so that the lower reservoir remains on the subsurface and is covered by the artificially formed lake which forms the final upper reservoir 300 with a level swing. The penstocks 86 to the interim lake 80 can be detached. Eventually, the interim lake 80 can be transformed into a recreational lake, which no longer experiences level swings. The crest of the dam can be transformed into, for example, a lakeside promenade between the recreational lake 80 and the operational lake 300, which is also popular for cyclists. FIG. 22 shows an embodiment in which the boundary 84 is constructed circumferentially in the ground depression at the edge thereof, so that the preliminary upper reservoir 80 (or the potential recreational lake) extends annularly around the portion of the ground depression in which the lower reservoir is constructed.

Method for Lake-Based Deployment of the Hollow Bodies

In comparison with deploying a "sea egg" deep in the high seas, installing a hollow sphere storage facility in an open-pit mine that is dry or to be flooded can be considerably less costly.

One possibility is, e.g., a procedure having one or more of the following method steps:
(1) Constructing the installation route 66 and preparing the foundation.
(2) Constructing the 1st level of lake eggs primarily as an on-site structure. Installing the connections to the installation routes 66. Access to the construction site, for example, is via the still undeveloped bottom. It is thus possible to proceed as in the case of developing a new settlement area.
(3) Flooding the trench and the hollow bodies with water.
(4) Further flooding with the structural facility covered so that the trench becomes a "navigable" waterway.
(5) Constructing a central construction site for the mass production of the hollow bodies as a shipyard on the edge of the waterway.
(6) Launching the hollow bodies, which may be made buoyant by means of laterally attached floats ("air cushions").
(7) The floating hollow bodies are towed on site, where they are slowly and gently lowered by controlled inflow of water so that they rest in the correct orientation in the designated troughs of the lower tier.
(8) By repeating steps 4 to 7 in a similar way, the second and then likewise further levels of the lower basin are created.

Observation on step (2): As an alternative to step (2), the lowest level of hollow bodies could already be deployed using the floating method—similarly to steps 3 to 7—after the foundation has been suitably prepared.

Further observation: The trench can be divided into construction sections by earth walls (and/or other appropriate site setup measures). The pump turbines of the already installed systems are available to be pumped dry and refilled (see above).

Note on the above calculation examples: We consider the above-described combination of a floating placement on site and a "dry" hydraulic and electrical connection to be minor in comparison with the corresponding effort for a sea-egg installation on the high seas. Our rough cost estimate therefore does not include the high installation costs factored in for the StEnSea project (see above).

Observation on the sphere diameter: The diameter of a hollow sphere is limited by the dimensions of the manufacturing shipyard and by restrictions on transportation from the shipyard to the docking site. The above-described water-based method of deploying the hollow body, in which "shallow" sinking after an approach by floating is alternated with "dry" electrical (and optionally also hydraulic) connection, it would appear possible that very large spheres could be built. In the StEnSea project they already had the courage to use 30 m spheres. It may now be possible to be even bolder.

Large and small spheres: It then becomes worth considering a structure formed of spheres of different diameters. This is of interest if, in the case of intrinsically buoyancy-compensated spheres, suitable crystallographic gaps of a basic lattice of large spheres are filled by small spheres. This increases the packing density and thus leads to a higher fill factor Ffill of the entire lower basin.

Method for Generating Energy when Filling the Lake.

The method described above for the phased construction of the large-scale PSPP preferably makes use of an infrastructure consisting of an interim upper basin 80, a penstock 86, and already installed storage units 83 equipped with pump turbines in the lower basin. This means that the technical equipment is already in place to allow the feed water for filling the reclamation lake to run over the existing turbines. A simple way of doing this would be to fill and empty the already installed lake-egg storage units in a periodic batch operation, which can consist of three stages:

The feed water is first discharged into the interim upper basin 80.

From there, it flows via a penstock 86 into already installed lake-egg units 83, specifically until said units are filled.

The water is pumped from the already installed lake-egg lower basins 83 into the lake, which will only rise slowly as it fills up.

If a plurality of lake-egg units are already installed, the process can be quasi-continuous, in that the individual units are filled and pumped out with a time delay.

If insufficient aboveground feed water is available and underground tapping of the Rhine is carried out, the Rhine water can first be pumped up to the level of the penstock intake in the interim upper basin 80. It may also be useful to install, from the outset, an inlet at the level of the Rhine, which would be approximately 60 [m] below the eventual level of the reclamation lake (see above), to the penstocks 86 laid in open cut. The interim upper basin could also have the necessary depth at the appropriate location from the outset.

Two Observations on the Construction and Gentle Operation of the Storage Spheres No frictional compressive stress: The hollow spheres are designed in particular for the externally acting pressure of the water column of the (eventual) lake. A similar internal pressure, theoretically possible via the penstock in interim operation, cannot occur if—as envisaged—the cavity sphere is operated without an enclosed air cushion and, when being filled with water, the inlet valve of the turbine closes just before 100% filling. In this way only the pressure of the local water quantity prevails in the sphere at all times and there is no pressure surge. The hollow sphere is therefore not subjected to tensile stress (inside to outside) during interim operation, in particular due to the non-compensated water pressure from the pipeline, but acts hydraulically more like an open basin.

Even in subsequent lake operation, it remains ensured that inside the sphere there is no frictional pressure connection to the deep water and that the pressure on the hollow sphere does not change continuously between deep pressure and pressure equalization (fatigue due to cyclical pressure relief). During the test operation, a safety valve can be used to ensure correct procedure.

Observation on continuous 3D printing of the hollow sphere formwork: Efforts will be made to ensure that mass production of the hollow spheres is as inexpensive as possible, so that ultimately only the pure concrete costs are of real significance. The wall thickness of the hollow spheres is unusually thick, e.g., 2-3 m, which opens up the possibility of using 3D printing processes, optionally without external formwork. For this purpose, let us imagine that, during step-by-step construction of the hollow sphere, a formwork collar is first created on each of the inner and outer edges of the flat cross-sectional surface of the spherical shell using a suitable concrete or other material, which collar is then filled with the structural concrete after solidification. In this way, it could be possible to print or cast the entire hollow sphere layer by layer under computer control.

Embodiment with Storage Pipes

With reference to FIG. 14 to 17, the pressure vessels 3 arranged in the ground depression 100 can also be designed as tubular pressure vessels 30 (storage pipe elements). In the example illustrated, the tubular pressure vessels 30 have a circular cross section and are arranged vertically side by side in the ground depression in such a way that they form a single level in which the pressure vessels 30 are arranged in close-packing (see FIG. 17). Further levels are not provided in this example. The pressure vessels 30 are connected via pressure lines 6 to common pump turbines 77, which are connected (via a valve 78) to connecting pipes 44', 44, leading to the lake.

Figure 15:
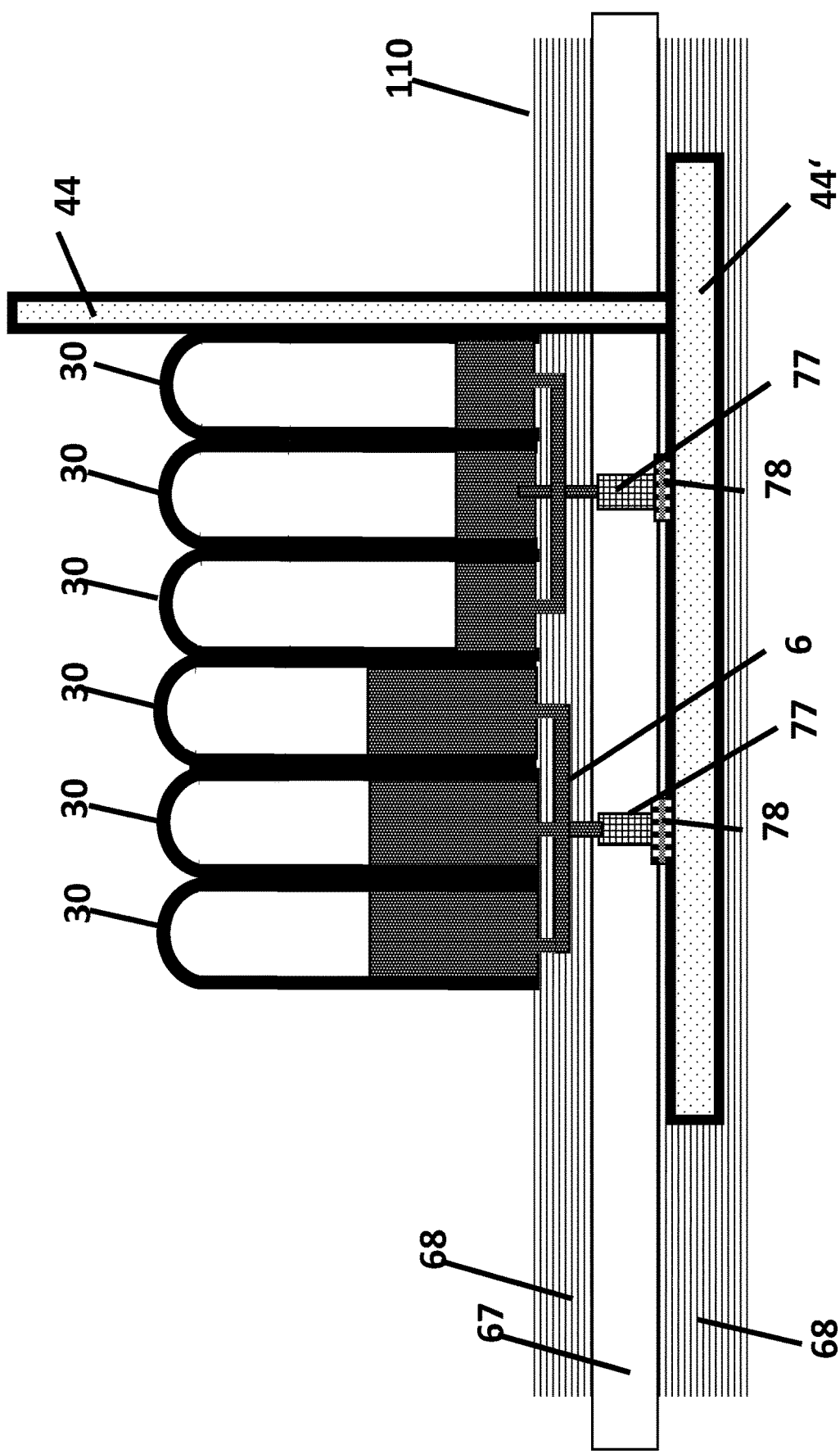
FIG. 15 shows a schematic cross section of the lower reservoir of FIG. 14.
Figure 16:
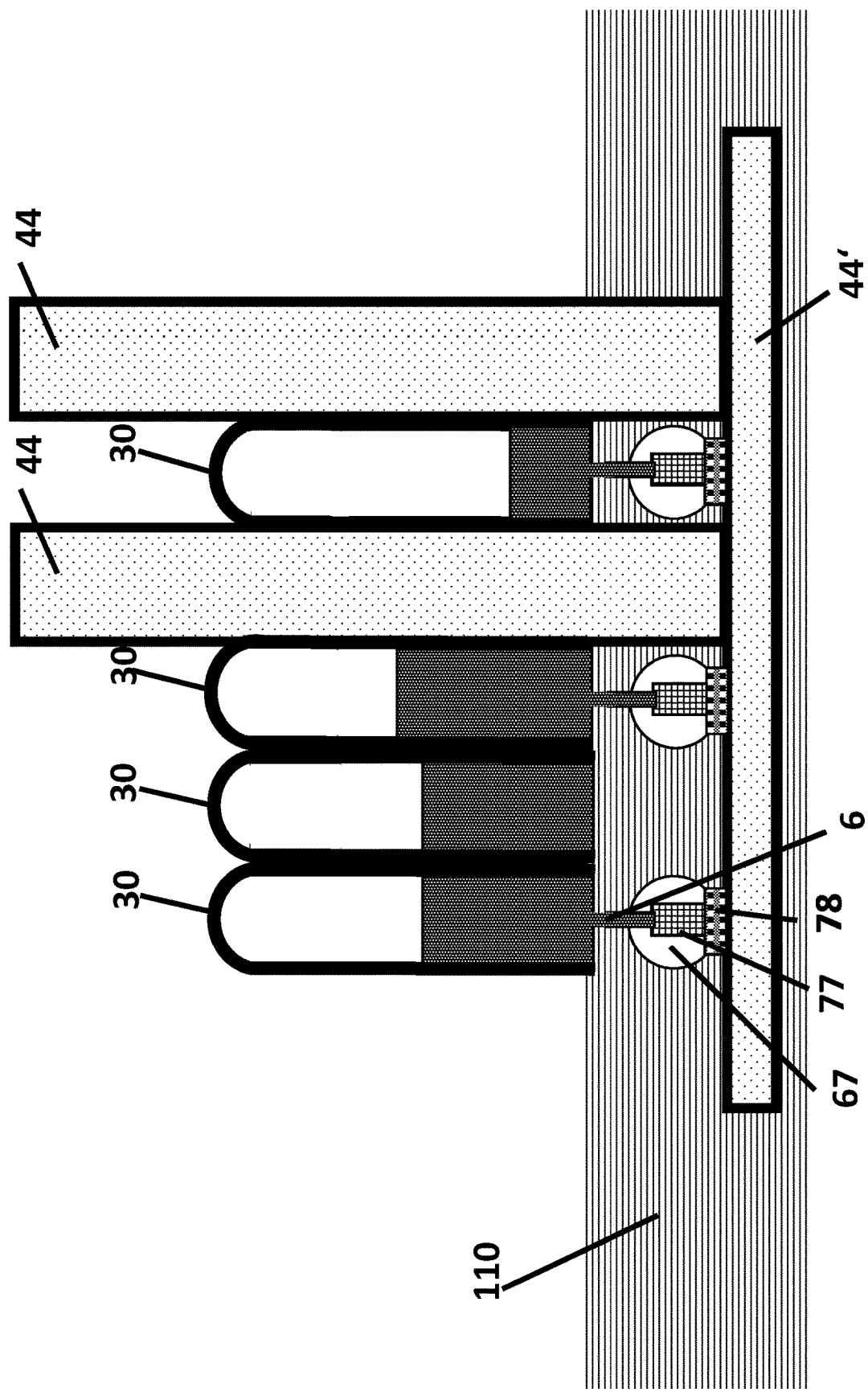
FIG. 16 shows a schematic longitudinal section of the lower reservoir of FIG. 14.

As illustrated, connecting pipes 44 (water-bearing pipes from the upper lake to the turbine) can be arranged vertically and between the pressure vessels 30. The vertical connecting pipes 44 to the lake can in turn lead to the pump turbines 77 via horizontal connecting pipes 44' which optionally extend in the subsurface. As shown in FIG. 15 and FIG. 16, each of the pump turbines can be located in a negotiable and/or drivable supply shaft 67 below the subsurface 110. For this purpose, a concrete foundation 68 can be provided in which the supply shaft 67 or even multiple such shafts 67 extend (foundation with turbines, valves, cables, etc.).

Figure 17:
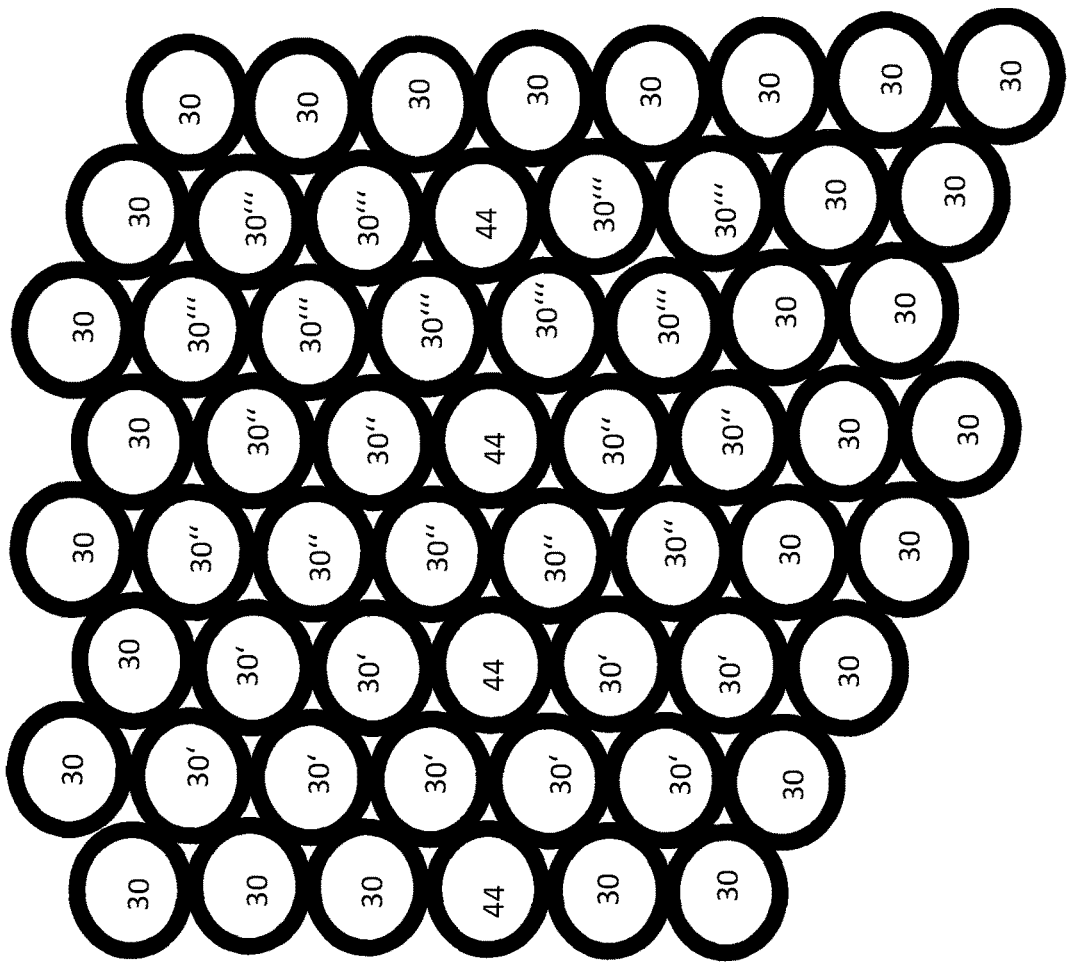
FIG. 17 shows a schematic top view of the lower reservoir of FIG. 14.
Figure 18:
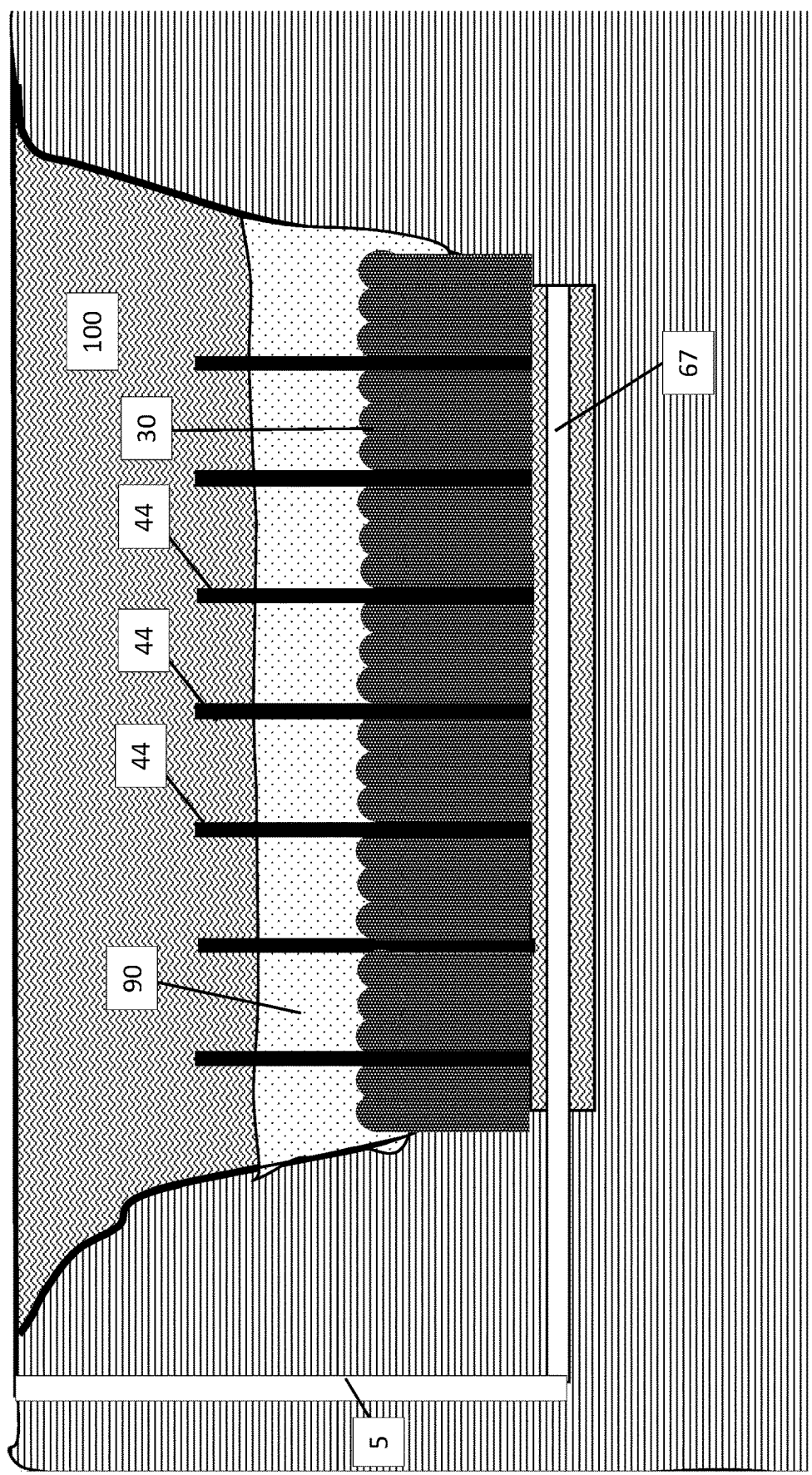
FIG. 18 is a schematic representation of an open-pit mine having an underwater pumped-storage power plant according to a further embodiment with filling material.

FIG. 17 is a top view of the tubular pressure vessels 30 and connecting pipes 44 to the lake arranged therebetween; the close-packing of spheres arrangement can be seen clearly. A plurality of, in particular adjacent, vertically arranged tubular pressure vessels are operated via a common pump turbine 77 as a pressure vessel group. In the example shown, the pressure vessels 30' form a group, the pressure vessels 30'' form a group, and the pressure vessels 30''' form a group, each of which is operated via a common pump turbine 77 and connected to the lake via a common connecting pipe 44.

Specifically, in the example shown, a pump-turbine unit is intended to supply nine storage pipes 30', 30'', 30'''. Each storage pipe in the example is approximately 300 m high (height h) and has a 30 m outer diameter and a 25 m inner diameter.

This results in the following exemplary estimate: Internal volume: $\pi \cdot r^2 \cdot h = 3.14 \cdot 12.5^2 \text{ m}^2 \cdot 300 \text{ m} = 147{,}187 \text{ m}^3$; volume per turbine unit $9 \cdot 147{,}187 \text{ m}^3 = 1{,}320{,}000 \text{ m}^3$;

At a depth of 1000 m, the storage energy per turbine unit is approximately $2.0 \cdot 9 \cdot 147{,}187 \text{ m}^3 = 2{,}600{,}000$ kWh; turbine power 200 kW, i.e., this unit can provide 200 kW of power over approx. 13 hours. Since, at 800 m depth, 1 m³ per second provides 2.0 kW, 200 kW of power is generated when 100 m³ per second flow through the turbine.

600 turbines of 200 kW each can therefore generate 120 gigawatts of power over 13 hours, i.e., one such unit alone can supply the whole of Germany with electricity for a full day. The amount of water per second would then be 60,000 m³ per second. If the surface area of the flooded lake is 40 km², the lake's body water sinks by about 1 mm per second or by 50 m per day.

Various Embodiments of the Present Disclosure

Size and Depth
  Due to the fact that the (powerful) open-pit mining infrastructure is still available, current operations can be redirected to a different target fulfillment using essentially the same mode of operation. This therefore results in favorable one-off costs for creating empty space in which cavity structures can eventually be built for storage purposes.
  It is therefore worthwhile for a PSPP to establish unusually large storage capacities and height differences.
  A greater "lower basin" depth reduces the level swing per MWh of storage energy.
Design and Operation
  By using similar elementary basic cells, mass production can be exploited.
  Filling the trench with hollow spheres stabilizes its edges, therefore allowing a steep slope angle and thus a wide trench to be achieved.
  Very compact plant with a high fill factor and therefore low height loss
  Free access to pump turbines for maintenance, repair and replacement.
  As opposed to constructing a plant in an existing inland lake or on the seabed, a first layer can be constructed in dry conditions and a level subsurface can optionally be created beforehand. This would not readily be possible with hollow spheres on the seabed.
Safety and Fault Tolerance
  The wide-scale flow caused during operation from the lower basin to the upper basin, said basins being fed from many decentralized inlets and outlets, ensures low flow velocities even in the area of inflowing or outflowing water. The funnel-shaped channel to the constrictions also slows down the flow.

Safe damage limitation in a "worst-case scenario": In the autarkic case, if a sphere that has been pumped dry ruptures, the collapsing volume remains confined to the sphere cavity (i.e., it cannot cause a "tsunami" in the operational lake!)

Fault tolerance: in the event of leaks, only a small self-contained component of the entire "cellular" storage facility is affected at any one time, which means that, in the worst case, this component can simply fail and be abandoned without interfering with the operation of the rest of the plant.

Construction

Part of the PSPP plant can be constructed on a preliminary basis as an interim structure in parallel with the coal mining operations that are being phased out. This part can also be used when filling the lake to generate electricity from the potential energy of the feed water.

The interim installation can be used to generate energy during the initial filling of the lake.

The lake-based deployment of the hollow bodies and the "dry" electrical and hydraulic integration into the overall plant result in a comparatively simple and cost-effective installation—even for large storage bodies Ecological and Social Benefits The amount of water in the lake remains unchanged, and therefore the weight of the lake also remains constant.

Long operational lifetime: Since, in the case of spheres, these are essentially subjected to compressive stress and also only a very low dynamic load occurs during operation, iron reinforcement of the concrete can optionally be dispensed with. This can extend the operational lifetime (no rusting of the steel reinforcement) to hundreds or thousands of years (Roman buildings), making it a sustainable investment in future energy supply that will benefit many generations.

Despite the enormous storage capacity, the right to reclamation and recreational use is maintained.

This PSPP can be constructed and put into partial operation in parallel with the phasing out (e.g., by 2038 of lignite mining), so that none (or only very few) of the existing jobs are lost.

Outlook: "Cavity Open-Pit Mining" Only for the Purpose of PSPP Construction

In the Rhenish lignite mining region, and in particular in the Hambach open-pit mine, a huge depression is already available. To establish a large-scale PSPP, most of the excavation has already been carried out with other objectives in mind and we are also able to expand this large pit and make it even deeper.

In the case of underground PSPP, too, we must look first to converting and adapting the existing mines of the hard coal mining being phased out, although the question has already been raised in this regard of whether it would not be simpler to construct new and very large underground storage facilities exclusively according to the requirements of PSPP operation (/LuSchmB Bergei2/).

Let us therefore ask ourselves whether large-scale PSPP plants cannot also be built directly "on a greenfield" (or "on yellow sandy desert") from the top down, independently of any lignite production being phased out. And what must therefore be taken into consideration to create a deep lake in a suitable environment using the proven extraction methods of an open-pit mine as a combined upper and lower basin for a large-scale PSPP anywhere in the world?

This question is of particular interest for arid and sunny locations, for example in North Africa. In such a climate, the question of intermediate storage of PV electricity is easier than here in the temperate climate zones. Because solar irradiation is very uniform, one can assume a high demand for short-term storage systems for the purpose of daytime smoothing and night-hour bridging. If appropriately dimensioned, these storage systems allow for largely predictable utilization on a virtually day-to-day basis. Bieringer was able to show that in Morocco, with a largely PV-supported power supply in the future and a constant demand over time, even large short-term storage systems with a storage capacity of 13 full-load hours can still achieve a full-load cycle number of approximately 300/a and more/Bieringer 2019/. This is roughly twice the amount calculated for short-term storage systems in Germany using the same model. However, this means that for the same electricity price, the cost per kWh stored may be twice as high.

If we once again bring to mind the cost structure of the StEnSea storage spheres (see "Underground and underwater PSPP" above) and the considerations in the chapter "Economic potential per m$^3$ of usable cavity", the following costs per m$^3$ of useful pit (denoted as [m$^3_{\_hollow}$]) apply to a large-scale PSPP in a deep open-pit mine at a depth of approximately 500 m, using the concrete costs from Eq(45) and the volume factor from Eq(44).

(Item 1): Concrete costs (including formwork, etc.): approx. €165/m$^3_{\_hollow}$ (=0.728·225)

(Item 2): Creation of the useful pit: approx. €20/$^{m3}_{\_hollow}$

Together this yields €185/m$^3_{\_hollow}$ for a 100 m high lower basin with base point at 500 m depth.

We must now separately compile and add the preliminary work for the open-pit mine up to a depth of 400 m. For 1 [m$^3_{\_hollow}$] useful pit, we needed a gross pit size of 2 m$^2$ area and 1 m height at the useful depth. For the considered lower basin of 100 [m] height, we therefore need a base area of likewise 2 [m$^2$] for a 100 m$^3$ useful pit and for this purpose must apply a direct excavation volume of 2·400=800 [m$^3$] from the top. To this we must add the proportionate excavation for the slope, for which we apply a flat rate of 25%, resulting in a total excavation of 1000 [m$^3$]. Based on a unit storage volume of 1 [m$^3_{\_hollow}$], an additional 10 [m$^3$] gross pit must therefore be excavated.

We stated above that for every m$^3$ of lignite mined, an average total pit of 6 m$^3$ is created (i.e., at different heights of the open-pit mine). At a lignite price of €17.5/m$^3$, the excavation costs are therefore estimated to be approximately €3/m$^3$, which means 30 [€/m$^3_{\_hollow}$] in relation to the unit useful pit.

We can therefore add a 3rd item to the above cost summary. For the construction of a comparable large-scale PSPP (500 m floor, 100 m high lower basin) on a "greenfield" site, add:

(Item 3) Additional excavation of the surface layer: 30 [€/m$^3_{\_hollow}$]

The costs for pump turbine and electrical system are estimated to be 525 [€/kW] in the StEnSea project. With an electrical storage density of approximately 1 kWh/m$^3_{\_hollow}$ (corresponding to a height difference of approx. 400 [m]) and a storage/withdrawal time of approximately five hours, the following electrical outlay is added in both cases:

(Item 4) Pump turbine+electrical: 105 [€/m$^3_{\_hollow}$] at 5 h turnover time

We can see:

The additional building costs for constructing a large and deep PSPP plant on a "greenfield" site instead of on the bottom of an abandoned open-pit lignite mine are relatively low. In our roughly calculated example, these costs were roughly 15%.

It can also be favorable to construct a large and deep PSPP "on yellow sand" if the utilization is favorable—as can be expected, for example, in sunny areas with PV as a power source—and if the geology of the site is favorable for open-pit mining (favorable as compared with open-pit lignite mining).

The above calculation underlines the importance of the height of the lower basin, to which the excavation of the surface layers can certainly be allocated.

When used in arid or even semi-arid areas, evaporation from the reservoir can be reduced by a floating cover, unless a body of water is available for refilling.

An energy transition involving an electrical power supply being almost completely covered by renewable energy sources such as solar plants or wind turbines is disclosed. However, due to their naturally fluctuating output, these energy sources require the use of large energy storage systems, the realization of which still represents a major problem today. The present disclosure relates to supporting the construction of a large-scale pumped-storage power plant, e.g., in the Hambach open-pit mine, by enabling test operation as well as energy generation as early as during the construction phase.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

BIBLIOGRAPHY

/Baufumé et al. 2011/
Baufumé, Sylvestre; Bongartz, Richard und Peter Markewitzr: STE Research Report August 2011, *"Unterflur-Pumpspeicher-Eine Kurzsynopse"* [Underground pumped storage—a short synopsis", (2011) *Forschungszentrum Jülich*, Systems Analysis and Technology Evaluation (IEK-STE)
http://www.fz-iuelich.de/SharedDocs/Downloads/IEK/IEK-STE/EN/report 08 2011.pdf? blob=publicationFile
/Bieringer 2019/
Kevin R. Bieringer (2019): *"Grobe Modellierung einer solaren Stromerzeugung in Nordafrika mit Kopplung zur deutschen Stromversorgung; Staatsarbeit für das Lehrfach Physik"* [Rough modeling of solar power generation in North Africa with coupling to the German power supply]; *Staatsarbeit für das Lehrfach Physik, Universität des Saarlandes, Experimentalphysik, Forschungsstelle Zukunftsenergie* [Final Thesis for the Discipline of Physics, Saarland University, Experimental Physics, Future Energy Research Unit], Saarbrucken 2019/; available at http://www.fze.uni-saarland.de/Speicher.htm
/BMWi 2017/ Bundesministerium für Wirtschaft [Federal Ministry for Economic Affairs] 2017: *"Pumpspeicherkonzept StEnSEA-Kugelpumpspeicher unter Wasser"* [StEnSea pumped-storage concept—underwater pumped-storage spheres]
Project page: https://forschung-energiespeicher.info/projektschau/gesamtliste/proiekt-einzelansicht/95/Kugelpumpspeicher unter Wasser
Image source: Concept overview© HOCHTIEF Solutions
/Düren2017/
Düren, M. (2017). Understanding the Bigger energy Picture—DESERTEC and Beyond, Springer Briefs in Energy. Springer. DOI: https://dx.doi.org/10.1007/978-3-319-57966-5
/Garg et al. 2012/
A. Garg, C. Lay and R. Füllmann: "STENSEA, Stored Energy in the Sea—the Feasibility of an Underwater Pumped Hydro Storage System"; 7th IRES Conference, Nov. 12, 2012, paper C2, page 477 ff. of Proceedings. Available from IRES: https://www.eurosolar.de/en/images/EVENTS/IRES/IRES2012/Proceedings IRES2012.pdf https://www.eurosolar.de/en/index.php/events/ires-conference-eurosolar
/Küffner FAZ 2011.0401/
Küffner, G.: "Hohlkugeln speichern überflüssigen Windstrom" [Hollow spheres storing superfluous wind power]; FAZ, Apr. 1, 2011, page T2 https://www.faz.net/aktuell/technik-motor/technik/in-der-tiefe-der-meere-hohlkugeln-speichern-ueberschuessigen-windstrom-1608012.html
/Greenpeace 2018/
Greenpeace: "WAS BRAUNKOHLESTROM WIRKLICH KOSTET" [THE TRUE COST OF LIGNITE-BASED ENERGY] http://www.foes.de/pdf/2018-06-25-GPE-Studie-Braunkohle.pdf
/AKE2014F/
Luther, G., & Schmidt-Böcking, H. (2014): *"Das Zusammenwirken von PSKW-artigen und P2G- artigen Energiespeichern und die mögliche Rolle von Tiefschachtspeichern bei der Energiewende"*; [The interaction of PSPP-type and P2G-type energy storage systems and the potential role of deep shaft storage systems in the energy transition]; http://www.fze.uni-saarland.de/AKE_Archiv/AKE2014F/Links_AKE2014F.htm. #Paper AKE2014F_06; or direct: http://www.fze.uni-saarland.de/AKE_Archiv/AKE2014F/Links_AKE2014F.htm/Vortrage/AKE2014F_06LutherSchmB_Ber gwerksspeicher.pptx
/LuSchmB 2011-Bergei1/
Luther, G. and Schmidt-Böcking, H. (2011). *"Schacht Pumpspeicherkraftwerk"* [Shaft pumped-storage power plant],
DE 10 2011 105 307
available at: http://www.fze.uni-saarland.de/Speicher.htm
/LuSchmB 2013-Bergei2/
Luther, G. and Schmidt-Böcking, H.: *"Tiefschacht-Pumpspeicherkraftwerk"* [Deep shaft pumped-storage power plant];
patent DE 10 2013 019776 B3
available at: http://www.fze.uni-saarland.de/Speicher.htm
/LuSchmB 2014-LangeSaar/
Luther, G. and Schmidt-Böcking, H. (2014). *"Verfahren zur Nutzung staugeregelter Fließgewässer als Oberbecken für ein Pumpspeicherkraftwerk unter Tage"* [Method for using dam-regulated flowing waters as an upper basin for an underground pumped-storage power plant]; DE 10 2014 007 184.7.
available at: http://www.fze.uni-saarland.de/Speicher.htm
/LuSchmB 2014/
Luther, G. and Schmidt-Böcking, H. (2014). "*Pumpspeicherkraftwerke-Unsichtbare Speicher für die Energiewende*" [Pumped-storage power plants—invisible storage systems for the energy transition], ew-Spezial(III), pages 22-24.
available at: http://www.fze.uni-saarland.de/Speicher.htm
/Lu2016/
Luther, G. (2016). *Wärmepumpe oder KWK-was passt zur Wärmewende* [Heat pump or CHP—what suits the heat transition]. In H. Bruhns (ed.), *Energie-Forschung und Perspektiven* [Energy—research and perspectives]. Papers presented at the DPG Spring Meeting Regensburg 2016, (pp. 123-139). Bad Honnef; ISBN 978-3-9818197-0-0
available at: http://www.fze.uni-saarland.de/Speicher.htm
/DE_Meerei1/:
Schmidt-Böcking, H. and Luther, G. (2011): "*Pumpspeicherkraftwerk*" [Pumped-storage power plant]; EP 2 683 933 B1, DE2011.013 329
available at: http://www.fze.uni-saarland.de/Speicher.htm
/DE_Meerei2/
Schmidt-Böcking, H. and Luther, G. (2011): "*Pumpspeicherkraftwerk*" [Pumped-storage power plant]; DE2011.118 206
available at: http://www.fze.uni-saarland.de/Speicher.htm
/Perau-Korn2013/
Perau, E. and Korn, S. (2013): "*Geotechnische Fragestellungen beim Bau von Untertage-Pumpspeicherwerken im rheinischen Braunkohle-Tagebau*" [Geotechnical issues in the construction of underground pumped-storage plants in Rhenish open-pit lignite mines"; pp. 135-146 from/Ruhr-Uni 2013/
/Reuther 2010/
Reuther, Ernst Ulrich: "*Lehrbuch der Bergbaukunde*" [Textbook on mining engineering], 12th edition, 2010, VGE-Verlag, Essen, ISBN=978-3-86797-0760-1; here page 532, image 351.
/Ruhr Uni 2013/
Ruhr Uni: Perau et al.: *Report Geotechnik* [Geotechnics report] 40, (2013), "*Untertage-Pumpspeicherwerke in Anlagen des Berg-und Tagebaus*" [Underground pumped-storage plants in mining and open-pit mining installations]; "Universität Duisburg-Essen" [University of Duisburg-Essen], VGE Verlag, Essen 2013;
ISBN: 978-3-86797-155-3
See in particular p. 148-165 (/Sanio-Mark 2013/) and p. 135-46 (/Perau-Korn2013/)
/Sanio-Mark 2013/
David Sanio and Peter Mark: "*Entwurf und Optimierung von Betonkonstruktionen für Pumpspeicherwerke in ehemaligen Braunkohletagebauen*" [Design and optimization of concrete structures for pumped-storage plants in former open-pit lignite mines], pp. 148-165 from/Ruhr-Uni 2013/
/Schmidt 2019/
Schmidt, Michael: Internet homepage: "Chemie verstehen" [Understanding Chemistry]; https://www.cumschmidt.de
Hexagonal close-packing of spheres: https://www.cum-schmidt.de/s styp hdp.htm
Cubic close-packing of spheres: https://www.cum-schmidt.de/s styp kdp.htm (Retrieved Mar. 1, 2019)
/Sinn 2013/
Sinn, H.-W. (2013). *Energiewende ins Nichts* [Energy transition to nowhere]. Lecture on Dec. 16, 2013 at the LMU Munich. Retrieved from: www.cesifo-group.de/de/ifo-Home/events/individual-events/Archive/2013/vortrag-sinn-lmu-20131216.html
/Schreiber et al. 2010/
U. Schreiber, E. Perau, A. Niemann and H.-J. Wagner: "*Unterflur-Pumpspeicherwerke-Konzepte furregionale Speicher regenerativer Energien*" [Underground pumped-storage plants concepts for regional renewable energy storage systems] https://www.uni-due.de/imperia/md/content/geotechnik/forschung/upw unterflur pumspeicherwerke forschungss kizze.pdf
/Schulz 2009/
Schulz, Detlev: "*Speicherpotenziale von Pumpspeicherwerken in Tagebaurestlöchern ehemaliger Braunkohlereviere*" [Storage potentials of pumped-storage plants in abandoned open pits of former lignite mining areas]; slide 8; presentation at *Forum Netzintegration* [Grid integration forum], Deutsche Umwelthilfe, Berlin, Sep. 30, 2009; slides available online: http://www.forum-netzintegration.de/uPloads/media/DUH Schulz 300909 01.pdf
/Slocum 2010/
Slocum, Alexander; Greenlee, Alison and Gregory Fennell: "OFFSHORE ENERGY HARVESTING, STORAGE, AND POWER GENERATION SYSTEM"; U.S. Pat. No. 8,698,338 Homepage for the patent: https://tlo.mit.edu/technologies/offshore-enerav-harvesting-storage-and-power-generation-system
/Slocum 2012/
Alexander Slocum, G. Dundar, B. Hodder, J. Meredith, Elie H. Homsi, A. Garg, C. Lay, H. Schmidt-Böcking and G. Luther: "Large Scale Manufacturing and Deployment of Offshore Renewable Energy Harvesting and Storage System"
Proceedings of the 12th euspen International Conference, Stockholm, June 2012;
/Slocum 2013/
Alexander H. Slocum, Gregory E. Fennell, Gökhan Dündar, Brian G. Hodder, James D. C. Meredith, and Monique A. Sager: Ocean Renewable Energy Storage (ORES)—System Analysis of an Undersea Energy Storage Concept
Proceedings of the IEEE, vol. 101, no. 4, April 2013, p. 906-924
/Siol 1995/
Siol, Ursula: "*Pumpspeicherwerk*" [Pumped-storage plant], DE19513817 B4
/StEnSea/
Fraunhofer Institute for Energy Economics and Energy System Technology (IEE): Homepage of the "Stored energy in the Sea (StEnSea)" research project https://www.iee.fraunhofer.de/de/projekte/suche/laufende/stensea-storing-energy-at-sea.html
/Stenzel et al. 2012/
Peter Stenzel, Sylvestre Baufumb, Richard Bongartz, Jochen Linssen, Peter Markewitz and Jürgen-Friedrich Hake: STE Research Report March 2012: "*Unkonventionelle Energiespeicher*" [Unconventional energy storage systems] https://www.fz-iuelich.de/SharedDocs/Downloads/IEK/IEK-STE/DE/Publikationen/research reports/2012/report 03 2012.pdf? blob=publicationFile
/Thema 2019/
Johannes Thema and Martin Thema: "*PSKW in stillgelegten Tagebauen-am Beispiel Hambach-Garzweiler-Inden*" [PSPP in abandoned open-pit mines—using the example of Hambach-Garzweiler-Inden]; Wuppertal Paper 194

(2019); ISSN 0949-5266; Wuppertal, 2nd edition March 2019. available at: https://wupperinst.org/a/wi/a/s/ad/4612/
/Wikipedia, ##Kratwerk Niederaußem/ [Niederaussem Power Station]
Wikipedia (retrieved Apr. 1, 2019)
http://www.wikiwand.com/de/Kraftwerk Niederaußem
/Wikipedia, ##Tagebau Hambach/ [Hambach surface mine]
Wikipedia (accessed on Mar. 1, 2019)
https://www.wikiwand.com/de/Tagebau Hambach

The invention claimed is:

1. A method for the use of an at least partially constructed lower reservoir for an underwater pumped-storage power plant, comprising the steps of:
providing an at least partially constructed lower reservoir located in an area of a dry but floodable ground depression or in an area of an open-pit mine, and which comprises at least one turbine and one pump or at least one pump turbine and which, when the dry ground depression or open-pit mine is flooded, is configured such that via the at least one turbine and one pump or via the at least one pump turbine electrical energy is generated when water is admitted into the lower reservoir from the flooded ground depression or open-pit mine and electrical energy is used when water is pumped out of the lower reservoir into the flooded ground depression or open-pit mine for energy storage,
and wherein at least one upper reservoir is constructed above the at least partially constructed lower reservoir, the upper reservoir not being identical to the dry ground depression or open-pit mine,
and wherein the at least partially constructed lower reservoir is connected to the upper reservoir via a penstock so that the lower reservoir is configured to be used in such a way that via the at least one turbine and one pump or via the at least one pump turbine electrical energy is generated when water is admitted into the lower reservoir from the upper reservoir and electrical energy is used when water is pumped from the lower reservoir into the upper reservoir for energy storage, and
wherein the at least partially constructed lower reservoir is used by admitting water from the upper reservoir into the lower reservoir and/or by pumping water from the lower reservoir into the upper reservoir.

2. The method according to claim 1,
wherein the upper reservoir is constructed by dividing the dry ground depression or the open-pit mine, in such a way that a first partial area is formed in which the at least partially constructed lower reservoir is located, and a second partial area is formed which forms the upper reservoir.

3. The method according to claim 2,
wherein the dry ground depression or the open-pit mine, is divided by constructing a boundary therein.

4. The method according to claim 1, wherein the upper reservoir is constructed by excavating or providing, in addition to the dry ground depression or open-pit mine, another ground depression which forms the upper reservoir, or building, in addition to the dry ground depression or open-pit mine, a basin which forms the upper reservoir.

5. The method according to claim 1, wherein the dry ground depression or the open-pit mine, or the area in which the at least partially constructed lower reservoir is located, is further widened and/or deepened, using open-pit mining machinery already present on site, after the at least partially constructed lower reservoir has been connected to the upper reservoir.

6. The method according to claim 1,
wherein the at least partially constructed lower reservoir is converted and/or expanded after having been connected to the upper reservoir, and/or
wherein the upper reservoir is converted and/or expanded after having been connected to the at least partially constructed lower reservoir.

7. The method according to claim 1, further comprising wherein the at least partially constructed lower reservoir comprises a plurality of pressure vessels which are arranged in the dry ground depression or on a lower floor of the open-pit mine side by side, one above the other, or a combination thereof.

8. The method according to claim 7,
wherein at least some of the pressure vessels have a shape which fills a smallest possible enveloping sphere to at least 25 percent in terms of volume or at least 50 percent in terms of volume or at least 75 percent in terms of volume, and/or
wherein at least some of the pressure vessels are designed as pressure-resistant spheres or as an egg shape, or an ellipsoid or polyhedron, and/or
wherein at least some of the pressure vessels each have a volume of less than 600,000 cubic meters or less than 100,000 cubic meters, or less than 15,000 cubic meters.

9. The method according to claim 7,
wherein the plurality of pressure vessels are arranged at regular intervals side by side and/or one above the other in the dry ground depression or open-pit mine, and/or
wherein the pressure vessels in the dry ground depression or open-pit mine are arranged in such a way that a lower pressure vessel layer containing pressure vessels arranged at regular intervals and lying directly on a subsurface is formed, which layer is suitable as an underlayer for a second pressure vessel layer having a regular arrangement lying thereover, in such a way that the pressure vessels of the second pressure vessel layer are stably arranged in depressions in the lower pressure vessel layer.

10. The method according to claim 7,
wherein the plurality of pressure vessels in the dry ground depression or open-pit mine are arranged in such a way that free spaces remain between the plurality of pressure vessels and extend from a top of the ground depression or open-pit mine, and/or rectilinearly and/or vertically from the top to a subsurface of the ground depression or open-pit mine, and/or
wherein one or more free spaces remaining between pressure vessels are designed as continuously upward, or upwardly projecting, shafts, and/or
wherein the plurality of pressure vessels are arranged according to the structure of a close-packing, or hexagonal close-packing, of spheres.

11. The method according to claim 1, wherein the at least partially constructed lower reservoir comprises at least one pressure vessel associated with at least one of the turbine, the pump, or the pump turbine.

12. A method for converting a lower reservoir, which is set up for use, connected to an upper reservoir via a penstock, according to claim 7, into an underwater pumped-storage power plant, comprising the steps of:
wherein the dry ground depression or open-pit mine in which the lower reservoir is located is flooded, so that an artificially formed lake is created therein which forms a final upper reservoir for the underwater pumped-storage power plant so that the underwater pumped-storage power plant is configured such that via the at least one turbine and one pump or via the at least one pump turbine electrical energy is generated when water is admitted into the lower reservoir from the flooded ground depression or open-pit mine and electrical energy is used when water is pumped out of the lower reservoir into the flooded ground depression or open-pit mine for energy storage.

13. The method according to claim 12, wherein, while the dry ground depression or open-pit mine is being flooded, the lower reservoir initially continues to be used by admitting water from the upper reservoir into the lower reservoir and/or by pumping water from the lower reservoir into the upper reservoir.

14. The method according to claim 12, wherein, during or after the flooding of the dry ground depression or open-pit mine, the penstock to the upper reservoir is detached.

15. The method according to claim 12, wherein, during or after flooding of the dry ground depression or open-pit mine, and/or after the penstock to the upper reservoir has been detached, the upper reservoir is transformed into a reclamation lake.

16. A preliminary pumped-storage power plant, comprising:

an at least partially constructed lower reservoir for an underwater pumped-storage power plant located in an area of a dry but floodable ground depression, or in an area of an open-pit mine, which comprises at least one turbine and one pump or at least one pump turbine and which, when the dry ground depression or open-pit mine is flooded, is configured such that via the at least one turbine and one pump or via the at least one pump turbine electrical energy is generated when water is admitted into the lower reservoir from the flooded ground depression or open pit mine and electrical energy is used when water is pumped out of the lower reservoir into the flooded ground depression or open pit mine for energy storage, and an upper reservoir which is located above the at least partially constructed lower reservoir and is not identical to the dry ground depression or open-pit mine, and wherein the at least partially constructed lower reservoir is connected to the upper reservoir via a penstock so that the lower reservoir is configured to be used in such a way that via the at least one turbine and one pump or via the at least one pump turbine electrical energy is generated when water is admitted into the lower reservoir from the upper reservoir and electrical energy is used when water is pumped from the lower reservoir into the upper reservoir for energy storage.

* * * * *